US009819273B2

(12) United States Patent
Furukawa

(10) Patent No.: US 9,819,273 B2
(45) Date of Patent: Nov. 14, 2017

(54) POWER CONVERSION APPARATUS

(71) Applicant: NF CORPORATION, Yokohama, Kanagawa (JP)

(72) Inventor: Osamu Furukawa, Yokohama (JP)

(73) Assignee: NF CORPORATION, Yokohama (JP)

(*) Notice: Subject to any disclaimer, the term of this patent is extended or adjusted under 35 U.S.C. 154(b) by 0 days.

(21) Appl. No.: 14/605,435

(22) Filed: Jan. 26, 2015

(65) Prior Publication Data
US 2015/0131338 A1 May 14, 2015

Related U.S. Application Data

(62) Division of application No. 13/423,348, filed on Mar. 19, 2012, now abandoned.

(30) Foreign Application Priority Data

Mar. 30, 2011 (JP) .................................. 2011-074782

(51) Int. Cl.
*H02M 3/335* (2006.01)
*H02M 3/337* (2006.01)
(Continued)

(52) U.S. Cl.
CPC ..... *H02M 3/33546* (2013.01); *H02M 3/3378* (2013.01); *H02M 3/33584* (2013.01);
(Continued)

(58) Field of Classification Search
CPC .. H02M 3/335; H02M 3/33584; H02M 3/337; H02M 3/3376; H02M 3/3378;
(Continued)

(56) References Cited

U.S. PATENT DOCUMENTS 3,903,468 A * 9/1975 Rudert ................. H02M 3/155
363/26
4,034,280 A * 7/1977 Cronin et al. ................. 363/25
(Continued)

FOREIGN PATENT DOCUMENTS

CN 1545194 A 11/2004
CN 1545200 A 11/2004
(Continued)

OTHER PUBLICATIONS

Office Action dated Feb. 3, 2015, issued in corresponding Japanese Patent Application No. 2011-074782, with English translation of relevant portions (13 pages).
(Continued)

*Primary Examiner* — Timothy J Dole
*Assistant Examiner* — Ivan Laboy Andino
(74) *Attorney, Agent, or Firm* — Westerman, Hattori, Daniels & Adrian, LLP

(57) ABSTRACT

An isolated power conversion apparatus has an isolation transformer, a series circuit including a load and an inductor connected in series with each other, the series circuit being disposed on a secondary side of the isolation transformer, and one or a plurality of switching means disposed between the series circuit and the secondary side of the isolation transformer, the switching means being bidirectional. This apparatus sends out power from a DC power supply of a primary side of the isolation transformer toward the load as DC power or AC power of an arbitrary polarity, or regenerates and supplies the DC power or AC power from the load to the DC power supply.

12 Claims, 77 Drawing Sheets

(51) Int. Cl.
*H02M 7/48* (2007.01)
*H02M 7/797* (2006.01)
*H02M 1/00* (2006.01)

(52) U.S. Cl.
CPC ......... *H02M 7/4807* (2013.01); *H02M 7/797* (2013.01); *H02M 3/337* (2013.01); *H02M 2001/009* (2013.01)

(58) Field of Classification Search
CPC ............ H02M 7/538; H02M 7/53803; H02M 7/53806; H02M 3/33546; H02M 7/4807; H02M 7/797; H02M 2001/009
USPC .... 363/22–26, 20–21.18; 323/271, 282–285, 323/351
See application file for complete search history.

(56) References Cited

U.S. PATENT DOCUMENTS

| | | | |
|---|---|---|---|
| 4,322,817 A * | 3/1982 | Kuster | 363/26 |
| 4,342,075 A * | 7/1982 | Hiromitsu | 363/23 |
| 4,371,918 A * | 2/1983 | Schierjott | 363/22 |
| 4,479,175 A | 10/1984 | Gille et al. | |
| 4,849,869 A * | 7/1989 | Tanuma | H02M 3/33523 363/21.13 |
| 5,155,672 A | 10/1992 | Brown | |
| 5,285,365 A | 2/1994 | Yamato et al. | |
| 5,317,496 A * | 5/1994 | Seiersen | H02M 3/3378 323/266 |
| 5,815,384 A | 9/1998 | Hammond et al. | |
| 5,856,712 A | 1/1999 | Suzuki et al. | |
| 6,025,999 A * | 2/2000 | Farrington et al. | 363/16 |
| 6,496,059 B1 | 12/2002 | Nguyen | |
| 7,893,558 B2 * | 2/2011 | Lee | 307/10.1 |
| 2003/0103361 A1 * | 6/2003 | Krein | H02M 7/5395 363/21.1 |
| 2005/0040711 A1 | 2/2005 | West | |
| 2007/0053213 A1 * | 3/2007 | Brune | H02M 5/4585 363/37 |
| 2008/0037290 A1 * | 2/2008 | Suzuki | H02M 7/4807 363/17 |
| 2008/0043506 A1 | 2/2008 | Ozaki et al. | |

FOREIGN PATENT DOCUMENTS

| | | |
|---|---|---|
| CN | 101394095 A | 3/2009 |
| CN | 101523710 A | 9/2009 |
| EP | 1 760 870 A2 | 3/2007 |
| JP | 62-213571 A | 9/1987 |
| JP | 04-197078 A | 7/1992 |
| JP | 2004-135408 A | 4/2004 |
| JP | 2004-336942 A | 11/2004 |
| JP | 2005-295634 A | 10/2005 |
| JP | 2008-48483 A | 2/2008 |
| JP | 2008-228399 A | 9/2008 |
| JP | 2010-119169 A | 5/2010 |
| WO | 2008/008143 A2 | 1/2008 |

OTHER PUBLICATIONS

U.S. Office Action dated Oct. 24, 2014, in parent U.S. Appl. No. 13/423,348.
Office Action dated Dec. 3, 2014, issued in corresponding Chinese Patent Application No. 201210089875.4, with English Translation (20 pages).
U.S. Non Final Rejection dated Jun. 19, 2015, issued in U.S. Appl. No. 14/605,449 (24 pages).
Office Action dated Jul. 1, 2015 issued in counterpart Chinese application No. 201210089875.4 (w/English translation) (19 pages).
Decision of Refusal dated Sep. 29, 2015, issued in counterpart Japanese Patent Application No. 2011-074782, w/English partial translation (10 pages).
Extended European Search Report dated Jan. 18, 2016, issued in counterpart European Patent Application No. 12160672.7. (7 pages).
Office Action dated Dec. 21, 2015, issued in counterpart Chinese Patent Application No. 201210089875.4, with English translation. (26 pages).
Office Action dated May 25, 2016, issued in counterpart Chinese Patent Application No. 201210089875.4, with partial English translation. (24 pages).
Office Action dated Feb. 14, 2017, issued in counterpart Chinese Application No. 201510174178.2. with English translation (20 pages).

* cited by examiner

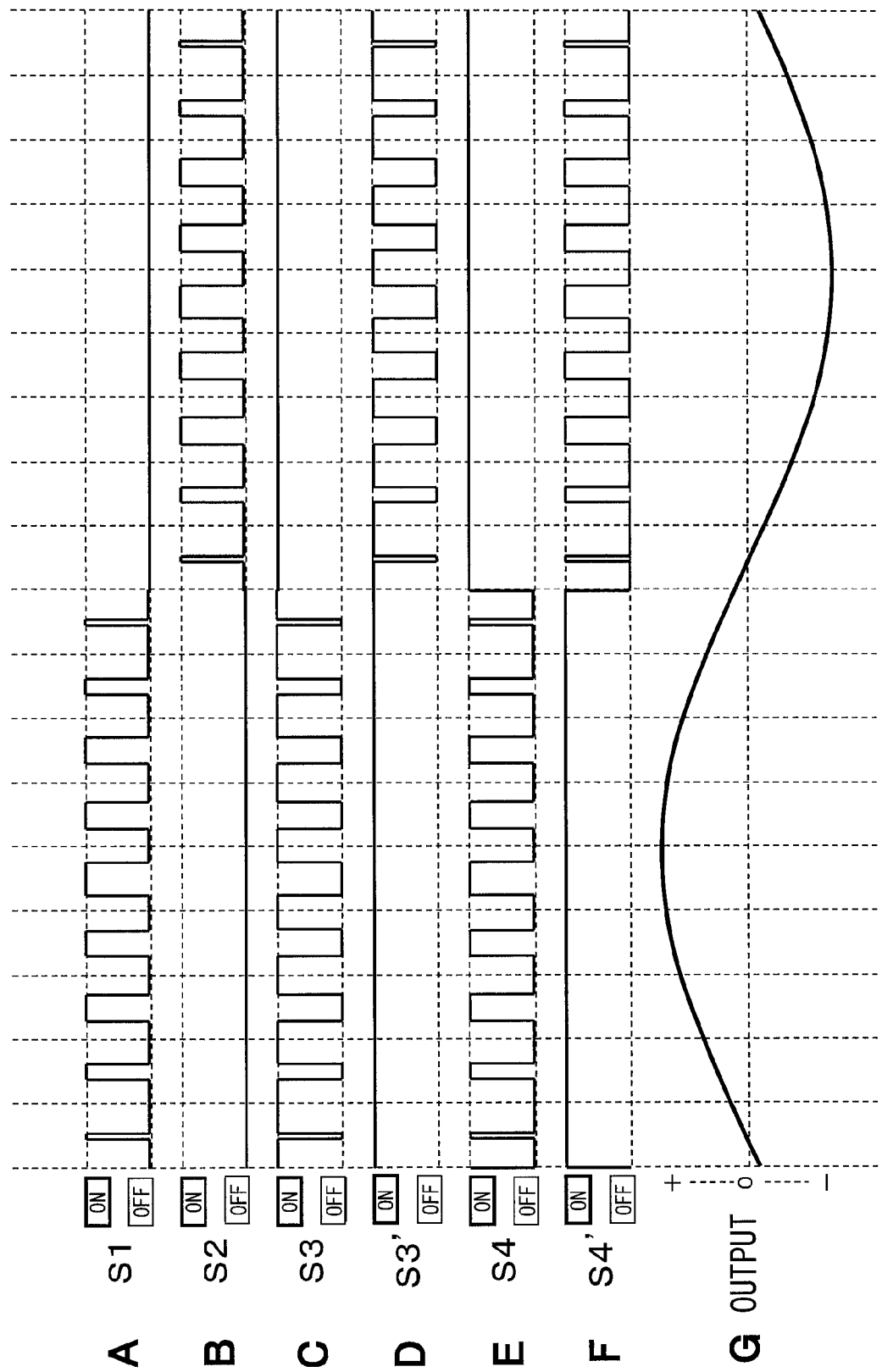

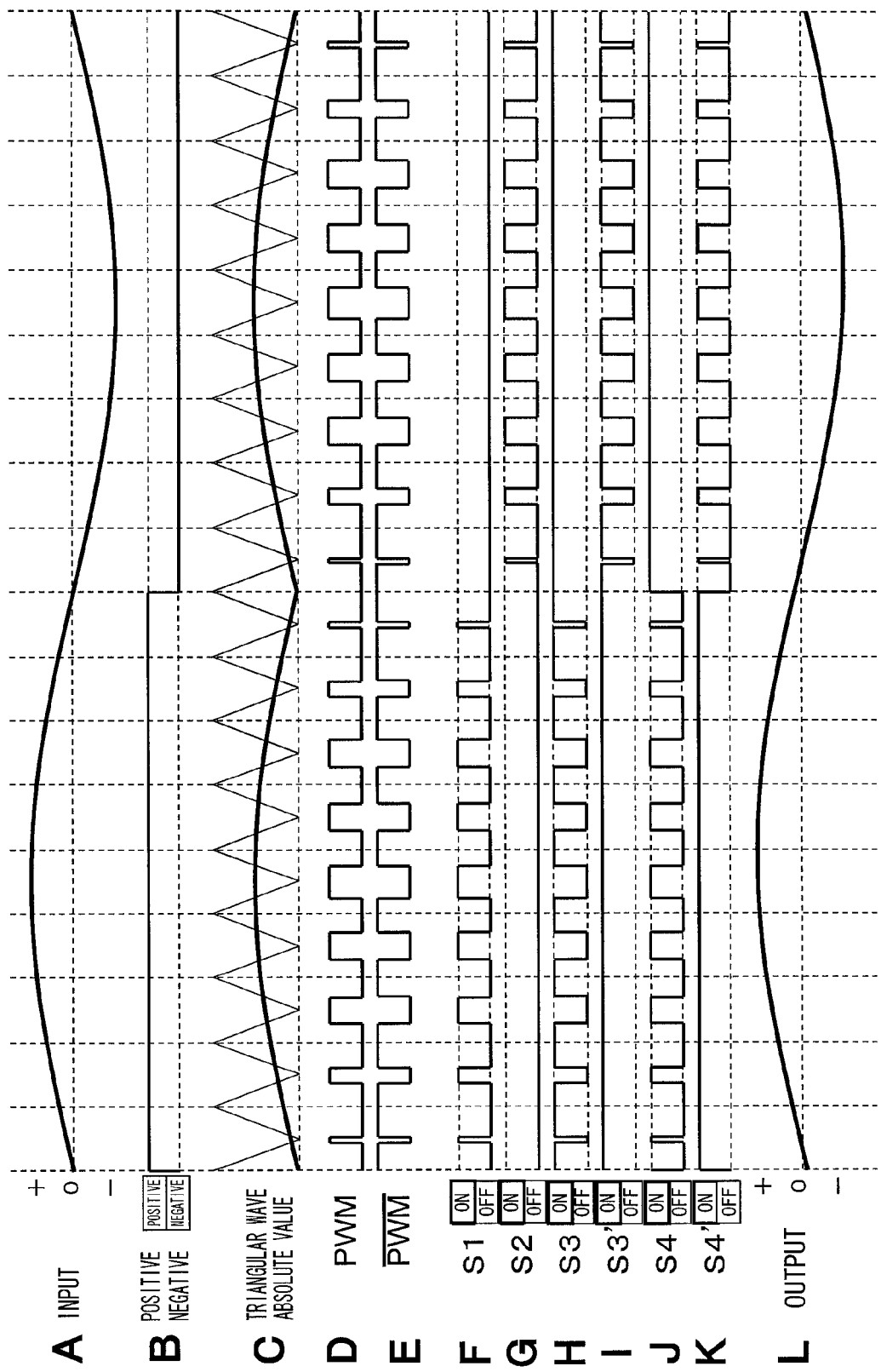

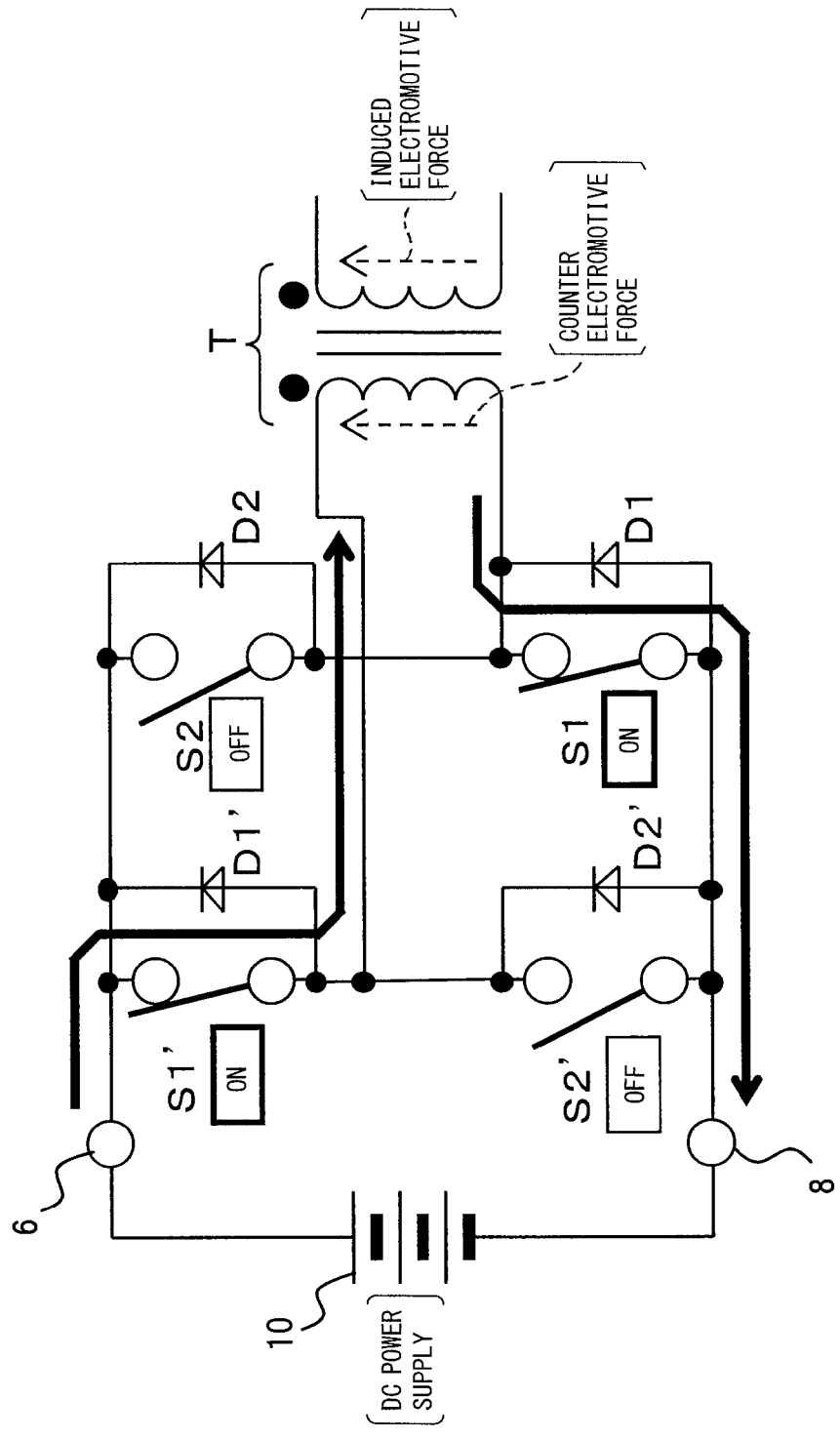

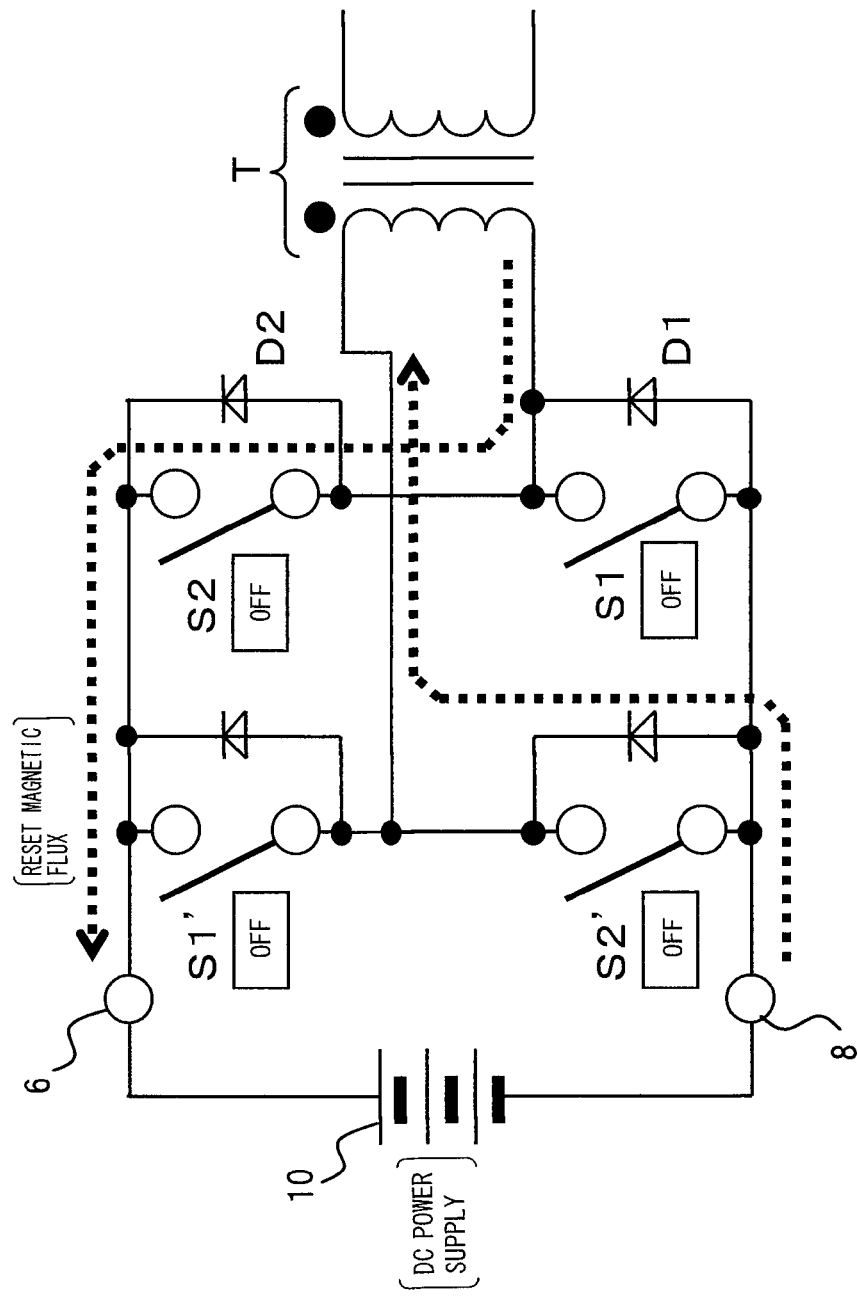

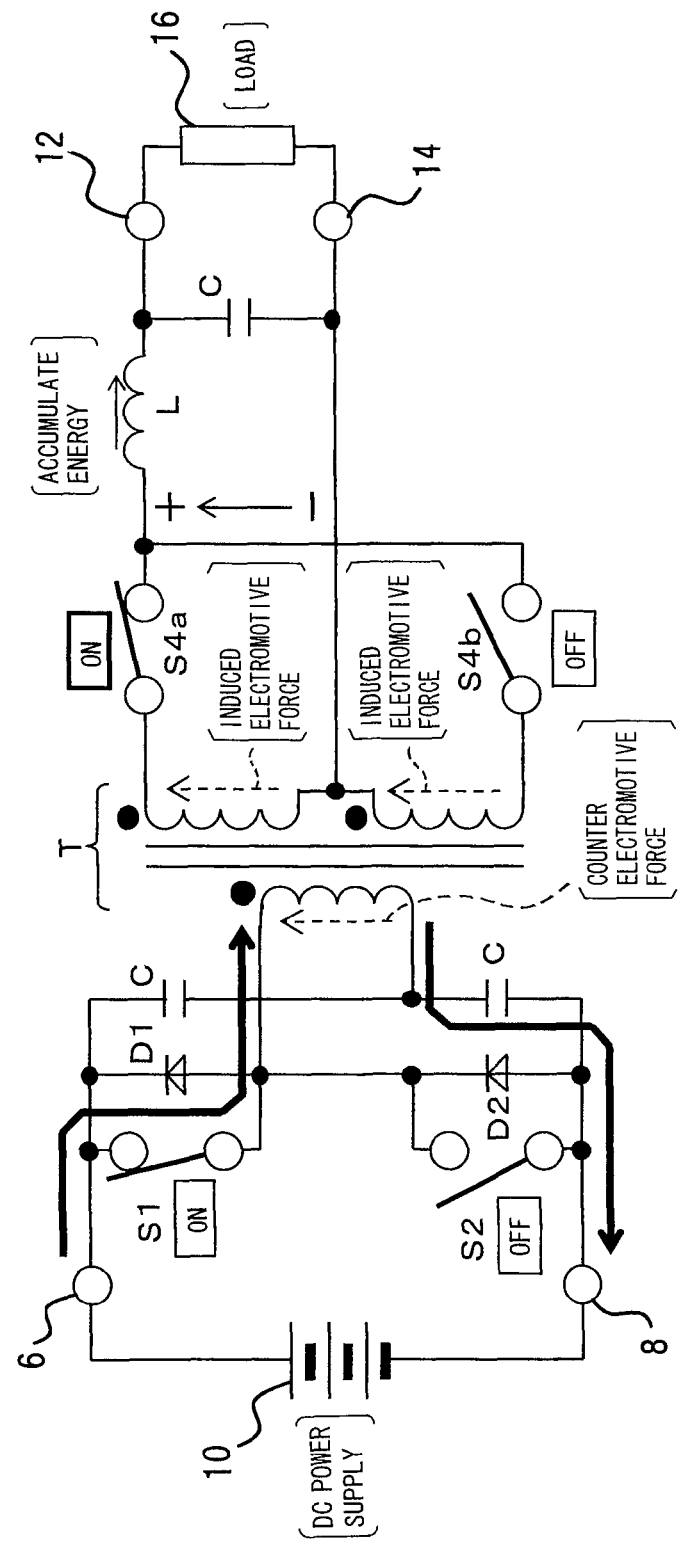

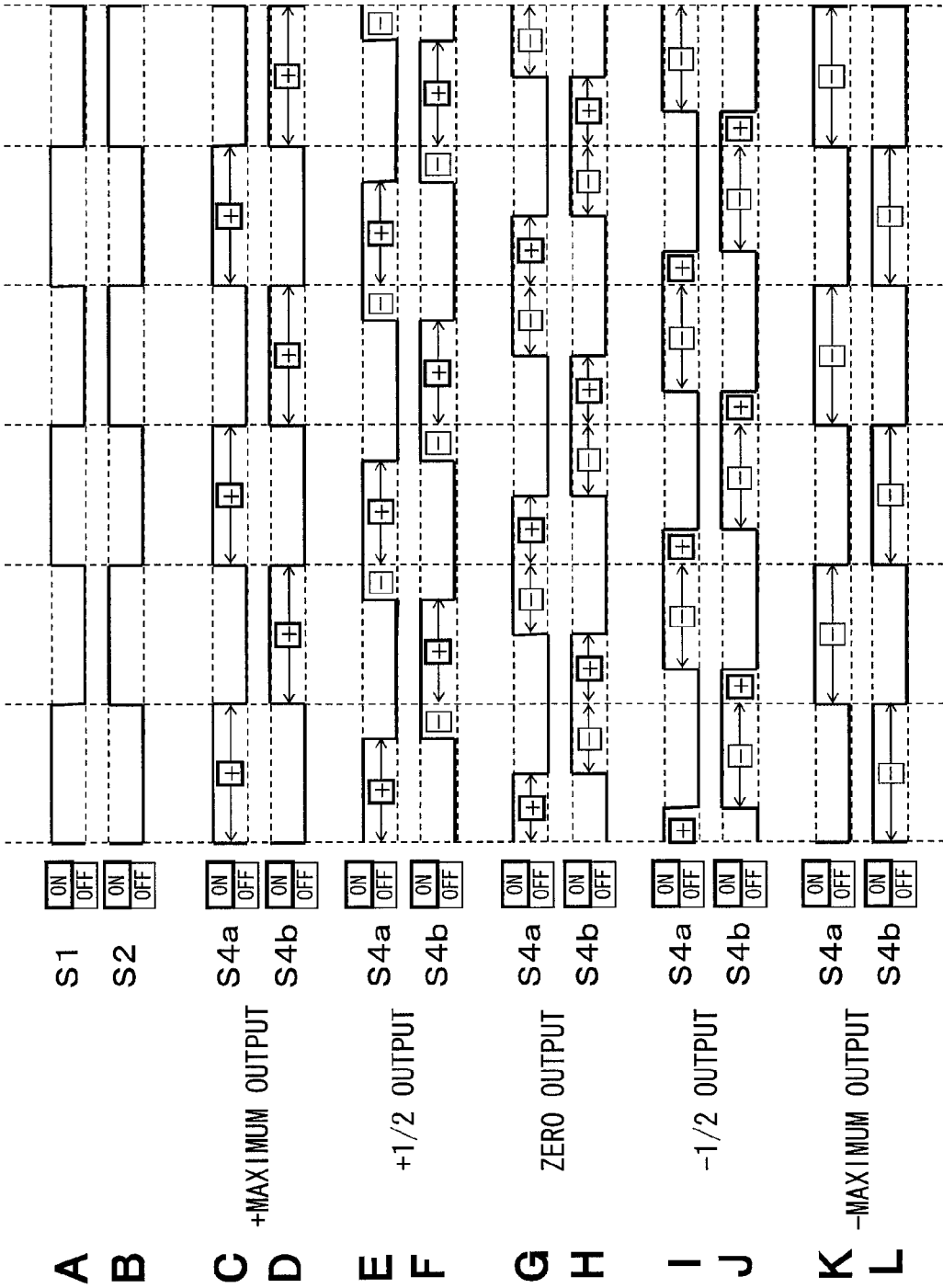

POWER CONVERSION APPARATUS

CROSS-REFERENCE TO RELATED APPLICATIONS

This application is a divisional of application Ser. No. 13/423,348, filed on Mar. 19, 2012, which is based upon and claims the benefit of priority of the prior Japanese Patent Application No. 2011-074782, filed on Mar. 30, 2011, the entire contents of which are incorporated herein by reference.

BACKGROUND OF THE INVENTION i) Field of the Invention

This invention relates to a power conversion technique for converting DC (Direct Current) input power into isolated DC output power or AC (Alternating Current) output power or for converting AC input power into isolated DC output power, and to an isolated power conversion apparatus used as a DC/DC converter and a DC/AC inverter which have a function of regenerating power to the input side and a positive/negative bipolar output function.

ii) Description of the Related Art

When DC power from a battery, etc., is converted into isolated DC power or AC power, an isolated power conversion apparatus, such as an isolated DC/DC converter and isolated DC/AC inverter, is used. With regard to the isolated power conversion apparatus, a forward converter is known as one form of the isolated DC/DC converter, and a combination of an isolated DC/DC converter and DC/AC inverter is known as the isolated DC/AC inverter. Such an isolated DC/AC inverter dispensing with a rectifying means (e.g., Japanese Laid-Open Patent Publication No. 2004-135408) is also known.

BRIEF SUMMARY OF THE INVENTION

A configuration depicted in FIG. 37 as a forward converter is an example in which an isolation transformer has two primary coils, that are windings. The isolation transformer may have one primary coil depending on a configuration of a drive circuit.

Referring to FIGS. 38A and 38B for an operation of this circuit, FIG. 38A depicts an operation that is carried out when a switching element switches on, and FIG. 38B depicts an operation that is carried out when the switching element switches off. By switching these two operation states alternately by a control means, the circuit works as an isolated DC/DC converter. A switching frequency at this switching action, for example, ranges from tens of kHz to several MHz.

As depicted in FIG. 38A, when the switching element switches on, a current starts flowing from a DC power supply into one primary coil of the isolation transformer, thus creating a counter electromotive force in the primary coil. As a result, an induced electromotive force is generated in the secondary coil of the isolation transformer. Thick arrows in attached Drawings, e.g., FIGS. 38A and 38B indicate the directions of currents. A current generated in the secondary coil of the isolation transformer passes through a diode and an inductor to supply power to a load and charge a capacitor. Meanwhile, energy is accumulated in the inductor.

As depicted in FIG. 38B, when the switching element switches off, a current flows through a diode into the other primary coil of the isolation transformer, and thus resets the magnetic flux of the isolation transformer. Thick dotted arrows in the attached Drawings, e.g., a thick dotted arrow in FIG. 38B indicates the direction of the current resetting magnetic flux. Across at the front of a thick arrow indicates that no current flows in the direction of the arrow. At the inductor, accumulated energy creates a counter electromotive force. As a result, a current passes through a diode to supply power to the load and charge the capacitor. When energy accumulated in the inductor has been discharged completely, power is supplied from the capacitor to the load.

Such a ratio of the on-period to the on/off cycle of a switching element (duty ratio) affects output power. The forward converter of FIG. 37 must be used at a duty ratio of 50% or less to avoid magnetic saturation at the isolation transformer. When the duty ratio is 50%, i.e., the on-period is equal to the off-period, the maximum output voltage is achieved, provided that two primary coils of the isolation transformer are identical in the number of turns of coils.

An output voltage from the forward converter is given by the following equation when the converter is in an ideal condition accompanying no loss, etc:

$$\text{output voltage} = \text{DC supply voltage} \times \text{duty ratio} \times (\text{number of turns of secondary coil of isolation transformer} \div \text{number of turns of primary coil of isolation transformer}) \quad (1)$$

In the forward converter of FIG. 37, a control circuit has a function of controlling on and off of the switching element. The control circuit thus causes the duty ratio to change from 0% (=0 V) to 50% (=maximum output voltage) in accordance with setting by a voltage setting unit.

In the ideal condition accompanying no loss, etc., an output voltage is determined by the equation (1). In an actual case, however, an output voltage becomes slightly lower than an output voltage achieved in the ideal condition because of loss, etc., caused by each unit.

The forward converter of FIG. 37 outputs unipolar DC voltage changing from 0 V to the maximum output voltage, and is incapable of bipolar output. Such a forward converter is incapable of regenerating output-side power to the DC power supply.

An isolated DC/AC inverter depicted in FIG. 39 is a combination of an isolated DC/DC converter and a DC/AC inverter. The isolated DC/DC converter of FIG. 39 is a push-pull type converter, but may be substituted by the above forward converter, etc. The DC/AC inverter portion is depicted as a full-bridge drive circuit, and is capable of outputting an arbitrary alternating current through PWM (Pulse Width Modulation), PFM (Pulse Frequency Modulation), etc. This isolated DC/AC inverter is incapable of regenerating output-side power to the DC power supply, and when power regeneration is necessary, must be provided with an additional circuit for power regeneration.

Constructed by combining together the isolated DC/DC converter and the DC/AC inverter, this isolated DC/AC inverter has a complicated circuit structure, thus disadvantageous in terms of mounting area and cost.

If a circuit on the secondary side of the isolation transformer of the previously mentioned isolated DC/AC inverter (FIG. 1 in Japanese Laid-Open Patent Publication No. 2004-135408) is compared with a circuit on the secondary side of the isolation transformer of FIG. 39, the following facts are understood:

a) Rectifying means (a diode bridge consisting of four diodes and a capacitor) and one of inductors are omitted. (The circuit of FIG. 39 has a pair of inductors but the circuit of Japanese Laid-Open Patent Publication No. 2004-135408 has a single inductor); and b) Bidirectional switching elements used in a full-bridge switching circuit on the secondary side of the isolation transformer are disadvantageous in terms of availability and cost.

The patent document of the above isolated DC/AC inverter (FIG. 1 in Japanese Laid-Open Patent Publication No. 2004-135408) does not include the description of regeneration of output-side power to the DC power supply on the primary side of the isolation transformer. The patent document includes the description of power regeneration by bidirectional switches and an electrolytic capacitor disposed on the secondary side of the isolation transformer. However, the electrolytic capacitor is able to accumulate a little energy, which makes impossible regeneration of a large volume of power that is required in the case of regenerating output-side power to the DC power supply.

Problems are as follows.

(1) The isolated DC/DC converter (forward converter, etc.) achieves only one of negative output and positive output.

(2) The isolated DC/DC converter (forward converter, etc.) must be provided with a separate reversely directed isolated DC/DC converter if regenerating output-side power to the DC power supply is intended. This poses a problem that the size of the converter is doubled.

(3) The isolated DC/AC inverter needs both of the isolated DC/DC converter that converts a DC voltage while isolating the DC power supply and the DC/AC inverter that converts a voltage-converted direct current into an alternating current. As a result, the isolated DC/AC inverter has a complicated configuration, large mounting area, heavy weight, and big volume, and is expensive.

(4) If regenerating output-side power to an input power supply is intended, the isolated DC/AC inverter must be provided with a separate reversely directed isolated AC/DC converter or isolated DC/DC converter for power regeneration (in the case of regenerating DC power from the DC/AC inverter portion to the DC power supply on the primary side of the isolation transformer). This poses a problem of an increase in the size of the isolated DC/AC inverter.

(5) The isolated DC/AC inverter of Japanese Laid-Open Patent Publication No. 2004-135408 is allowed to dispense with the rectifying means and one of the inductors, but needs four bidirectional switching elements difficult to acquire on the secondary side of the isolation transformer. This poses a problem that an extra mounting area is needed for the switching elements that cost much.

(6) Japanese Laid-Open Patent Publication No. 2004-135408 of the isolated DC/AC inverter does not include the description of regeneration of output-side power to the DC power supply. In the case where the isolated DC/AC inverter is provided with a separate reversely directed AC/DC converter for power regeneration to the DC power supply, the size of the DC/AC inverter becomes approximately twice the original size, which is a problem.

The present invention was conceived in view of the above problems, and it is therefore the object of the invention to provide an isolated power conversion apparatus having a function of regenerating power to a DC power supply and a positive/negative bipolar output function.

Configurations of the present invention for solving the above problems include the following configurations.

(1) An isolated power conversion apparatus having an isolation transformer includes a first switching means disposed between a DC power supply and a primary side of the isolation transformer, the first switching means driving the primary side of the isolation transformer in a forward direction; a second switching means disposed between the DC power supply and the primary side of the isolation transformer, the second switching means driving the primary side of the isolation transformer in a reverse direction; a series circuit including a load and an inductor connected in series with each other, the series circuit being disposed on a secondary side of the isolation transformer; and one or a plurality of fourth switching means disposed between the series circuit and the secondary side of the isolation transformer, the fourth switching means being bidirectional. The isolated power conversion apparatus sends out power from the DC power supply toward the load as DC power or AC power of an arbitrary polarity, or regenerates and supplies the DC power or AC power from the load to the DC power supply. This configuration corresponds to an eleventh embodiment (FIG. 31) to be described later.

(2) The isolated power conversion apparatus of (1) further includes one or a plurality of third switching means disposed in parallel with the series circuit, the third switching means being bidirectional.

(3) In the isolated power conversion apparatus of (1), the isolation transformer has a first and a second primary coils connected in series with each other, the first primary coil being connected to one end of the first switching means and the second primary coil being connected to one end of the second switching means, another end of each of the first switching means and the second switching means being connected to a common connection point. This configuration is provided as a configuration of a push-pull type isolated power conversion apparatus.

(4) In the isolated power conversion apparatus of (1), the isolation transformer has a primary coil, one end of the primary coil being connected to the DC power supply via the first switching means and the second switching means, and another end of the primary coil is connected to the DC power supply via a capacitor or to a point between two DC power supplies. This configuration is provided as a configuration of a half-bridge type isolated power conversion apparatus.

(5) In the isolated power conversion apparatus of (1), the isolation transformer has a primary coil, and the first switching means includes at least two switching elements, the second switching means includes at least two switching elements, and a bridge circuit is made up of the switching elements of the first switching means and the switching elements of the second switching means, the bridge circuit being connected to the primary coil. This configuration is provided as a configuration of a full-bridge type isolated power conversion apparatus.

(6) In the isolated power conversion apparatus of (1), either the first switching means or the second switching means or both the first and second switching means includes a field-effect transistor (MOS-FET), a junction field-effect transistor (J-FET), a bipolar transistor, or an insulated gate bipolar transistor (IGBT).

(7) In the isolated power conversion apparatus of (1), one or a plurality of the first switching means, the second switching means and the fourth switching means has a diode in parallel, the diode being a diode element connected to the switching means, a diode built in the switching means, or a parasitic diode, that is a body diode.

(8) In the isolated power conversion apparatus of (2), the third switching means has a diode in parallel, the diode being a diode element connected to the switching means, a diode built in the switching means, or a parasitic diode.

(9) In the isolated power conversion apparatus of (2), the third switching means includes two unidirectional switching elements connected in directions opposite to each other.

(10) In the isolated power conversion apparatus of (1), the fourth switching means includes two unidirectional switching elements connected in directions opposite to each other.

(11) In the isolated power conversion apparatus of (2), the third switching means includes a diode bridge and a unidirectional switching element connected between a connection point, to which anodes of diodes making up the diode bridge are connected, and a connection point, to which cathodes of the diodes making up the diode bridge are connected.

(12) In the isolated power conversion apparatus of (1), the fourth switching means includes a diode bridge and a unidirectional switching element connected between a connection point, to which anodes of diodes making up the diode bridge are connected, and a connection point, to which cathodes of the diodes making up the diode bridge are connected.

(13) In the isolated power conversion apparatus of (2), the third switching means includes any of a MOS-FET, a J-FET, a bipolar transistor, an IGBT, and a bidirectional switching element.

(14) In the isolated power conversion apparatus of (1), the fourth switching means includes any of a MOS-FET, a J-FET, a bipolar transistor, an IGBT, and a bidirectional switching element.

(15) In the isolated power conversion apparatus of (1), the isolation transformer has one or a plurality of separate coils on its secondary side, said one or each separate coil being provided with a rectifying means and a smoothing means, and said one or each separate coil, the rectifying means and the smoothing means serve as an isolated DC power source.

(16) In the isolated power conversion apparatus of (1), the isolated power conversion apparatus outputs power by multi-phase output, and wherein power is output at each phase in the multi-phase output from a separate secondary coil of the isolation transformer for each phase or from a common secondary coil of the isolation transformer.

(17) In the isolated power conversion apparatus of (1), the isolated power conversion apparatus outputs power by two-phase output, a waveform equivalent to a waveform generated by comparing an absolute value of an input waveform with a sawtooth wave is used as a drive waveform for the switching element at one phase in the two-phase output, and a waveform equivalent to a waveform generated by comparing the absolute value of the input waveform with a reverse sawtooth wave is used as a drive waveform for the switching element at the other phase in the two-phase output.

(18) In the isolated power conversion apparatus of (1), the isolated power conversion apparatus outputs power by three-phase output, a waveform equivalent to a waveform generated by comparing an absolute value of an input waveform with a sawtooth wave is used as a drive waveform for the switching element at a first phase in the three-phase output, a waveform equivalent to a waveform generated by comparing the absolute value of the input waveform with a reverse sawtooth wave is used as a drive waveform for the switching element at a second phase different from the first phase in the three-phase output, and a waveform equivalent to a waveform generated by comparing the absolute value of the input waveform with a triangular wave is used as a drive waveform for the switching element at a third phase different from the first and second phases in the three-phase output.

BRIEF DESCRIPTION OF THE SEVERAL VIEWS OF THE DRAWING

FIG. 6 depicts a DC/AC inverter operation;

FIG. 7 depicts control that is made when the DC/AC inverter operation is carried out;

FIGS. 16A to 16D depict drive operations carried out on the primary side;

FIG. 33 depicts an operation of controlling an output voltage;

DETAILED DESCRIPTION OF THE INVENTION

First Embodiment

A first embodiment describes the basic circuit of an isolated bipolar bidirectional DC/DC converter and an isolated bidirectional DC/AC inverter that are examples of an isolated power conversion apparatus. The first embodiment discloses a positive output operation, a negative output operation, a positive regenerating operation, and a negative regenerating operation, as operations by the DC/DC converter, and also discloses a DC/AC inverter operation.

Figure 1:
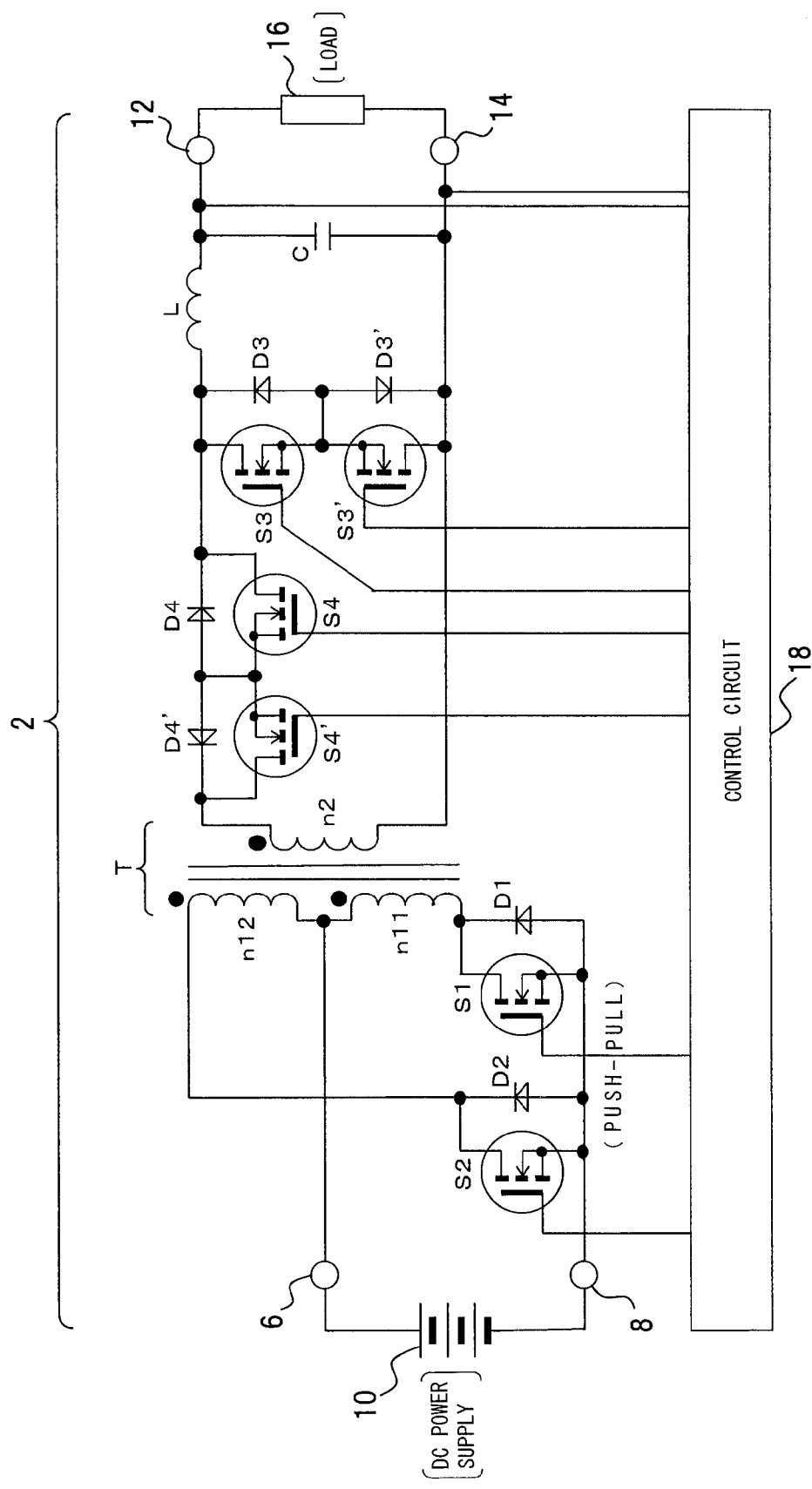
FIG. 1 depicts an example of an isolated power conversion apparatus according to a first embodiment.

FIG. 1 depicts an example of an isolated power conversion apparatus according to the first embodiment. The power conversion apparatus 2 of FIG. 1 is an example of the isolated power conversion apparatus of the present invention, and is an example of the basic circuit that is caused to work as the isolated bipolar bidirectional DC/DC converter (hereinafter, simply referred to as "DC/DC converter") or the isolated bidirectional DC/AC inverter (hereinafter, simply referred to as "DC/AC inverter").

This power conversion apparatus 2 includes an isolation transformer T, which has two primary coils n11 and n12. The primary coils n11 and n12 are connected in series with each other. A switching element S1 (hereinafter, simply referred to as "switch S1"), which is an example of a first switching means, is connected in series to the primary coil n11, while a switching element S2 (hereinafter, simply referred to as "switch S2"), which is an example of a second switching means, is connected in series to the primary coil n12. The switches S1 and S2 are connected in parallel to diodes D1 and D2, which are examples of rectifying means, respectively. One input terminal 6 is connected to a middle connecting point between the primary coils n11 and n12, and the other input terminal 8 is connected to a common connecting point of the switch S1, the switch S2, the anode of the diode D1, and the anode of the diode D2. Between the input terminals 6 and 8, a DC power supply 10 is connected with its positive electrode connected to the input terminal 6.

A circuit on the side of a secondary coil n2 of the isolation transformer T includes switching elements S3 and S3' (hereinafter, simply referred to as "switches S3 and S3'"), which are examples of third switching means, switching elements S4 and S4' (hereinafter, simply referred to as "switches S4 and S4'"), which are examples of fourth switching means, and diodes D3, D3', D4 and D4'.

The secondary coil n2 of the isolation transformer T is connected in series to two switches S3 and S3' whose sources are connected to each other. The series circuit consisting of these two switches S3 and S3' is connected in series to two switches S4 and S4' whose sources are connected to each other. The switch S3 is connected in parallel to the diode D3, the switch S3' is connected in parallel to the diode D3', the switch S4 is connected in parallel to the diode D4, and the switch S4' is connected in parallel to the diode D4'. Each of the diodes D3, D3', D4, and D4' is an example of a rectifying means.

The series circuit consisting of the switches S3 and S3' is connected in parallel to a series circuit consisting of an inductor L and a capacitor C. The capacitor C is provided with output terminals 12 and 14. These output terminals 12 and 14 are connected to a load 16. That is, the secondary side of the isolation transformer T is provided with a series circuit consisting of a load and an inductor, which are connected in series to each other.

The gate of each of the switches S1, S2, S3, S3', S4, and S4' is connected to a control circuit 18, to which output from the output terminals 12 and 14 is applied. Switching of the switches S1, S2, S3, S3', S4, and S4' is controlled by output from the control circuit 18.

The switches S1, S2, S3, S3', S4, and S4' of the isolated power conversion apparatus 2 are each indicated as a MOSFET (Field-Effect Transistor), but may be replaced with other types of switching elements, such as a J-FET (Junction Field-Effect Transistor), bipolar transistor, and IGBT (Insulated gate Bipolar Transistor).

Each of the diodes D1, D2, D3, D3', D4, and D4' may be replaced with a built-in diode (including a parasitic diode) of each of the switches S1, S2, S3, S3', S4, and S4'. Using the built-in diodes reduces a mounting area and cost. The diodes D1, D2, D3, D3', D4, and D4' may be omitted depending on the type, driving method, etc., of the switches S1, S2, S3, S3', S4, and S4'.

The capacitor C connected in parallel to the load 16 is provided for reducing noises generated on the end of the load by switching operations. However, the isolated power conversion apparatus 2 is basically operable without the capacitor C. The capacitor C, therefore, may be omitted. Hereinafter, this fact applies to all embodiments of the present invention.

Figure 39:
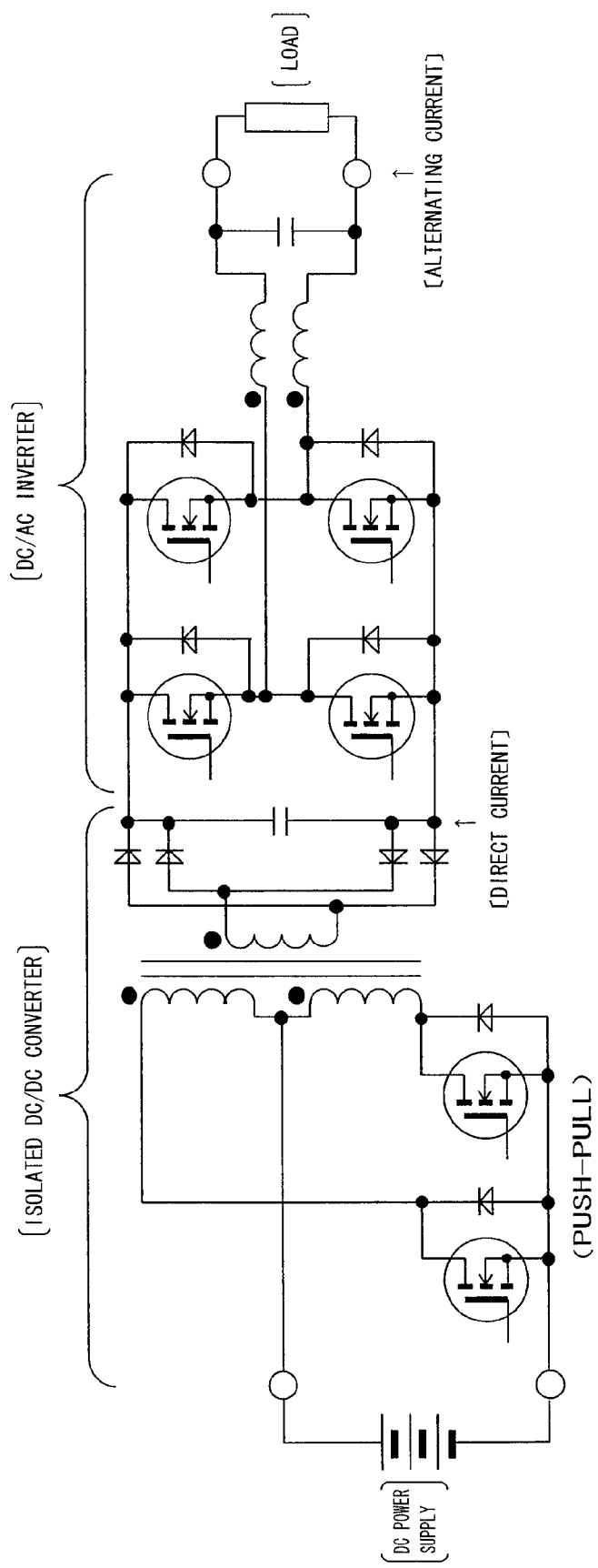
FIG. 39 depicts an isolated DC/AC inverter.

Comparing the isolated power conversion apparatus 2 with the above isolated DC/AC inverter (FIG. 39) reveals that the isolated power conversion apparatus 2 (FIG. 1) dispenses with rectifying means (a diode bridge consisting of four diodes and the capacitor C) and one of the inductor L. Specifically, the circuit of FIG. 39 needs a pair of inductors L, while the isolated power conversion apparatus 2 includes a single inductor L. In addition, the above isolated DC/AC inverter (FIG. 39) does not enable power regeneration from the output side to the DC power supply 10, which will hereinafter be described.

Comparison with a configuration including bidirectional switching elements in a full-bridge switching circuit on the secondary side of the isolation transformer T (Japanese Laid-Open Patent Publication No. 2004-135408) brings a conclusion that such bidirectional switching elements are unnecessary in the first embodiment. Japanese Laid-Open Patent Publication No. 2004-135408 of such a configuration does not include the description of power regeneration from the output side to the DC power supply 10, which will hereinafter be described.

Operations of the isolated power conversion apparatus 2 will be described with reference to FIGS. 2A to 6. In FIGS. 2A to 5B, the MOS-FET switches S1, S2, S3, S3', S4, and S4' are expressed as ordinary on-off switches in order to clearly indicate on/off states of the switches.

[Positive Output Operation]

A positive output operation will be described with reference to FIGS. 2A and 2B. When a positive voltage is output, the switch S2 is kept off and the switches S3' and S4' are kept on.

Figure 2A:
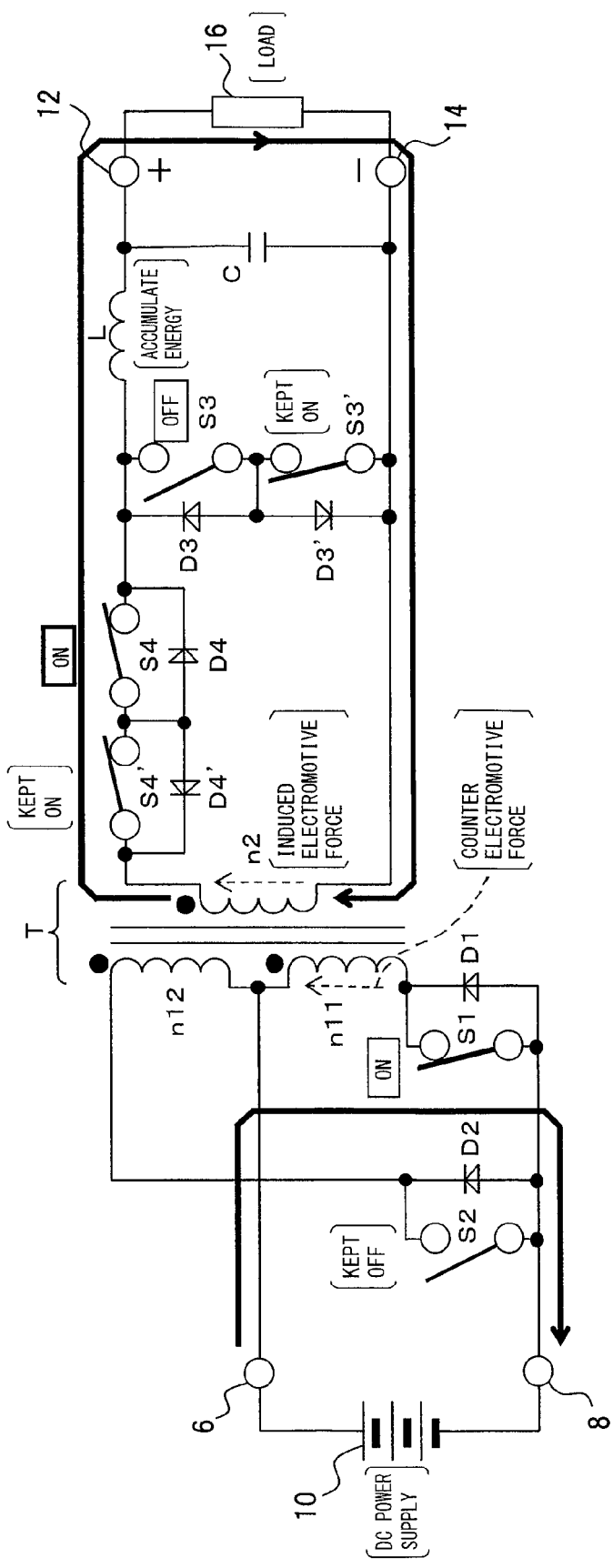
FIGS. 2A and 2B depict operations that the isolated power conversion apparatus of the first embodiment carries out when outputting positive power.

FIG. 2A depicts an operation that is carried out when both switches S1 and S4 switch on and the switch S3 switches off. FIG. 2B depicts an operation that is carried out when both switches S1 and S4 switch off and the switch S3 switches on. In FIGS. 2A and 2B, the control circuit 18 switches these two operation states alternately to cause the isolated power conversion apparatus 2 to work as a DC/DC converter. A switching frequency at this switching action, for example, ranges from tens of kHz to several MHz.

In FIG. 2A, when the switch 1 switches on, a current starts flowing from the DC power supply 10 into the primary coil n11, which is one of the primary coils of the isolation transformer T, thus creating a counter electromotive force. As a result, an induced electromotive force is generated in the secondary coil n2 of the isolation transformer T. A current generated in the secondary coil n2 of the isolation transformer T passes through the switch S4' (kept on), the switch S4 (on), and the inductor L to supply power to the load 16. Meanwhile, energy is accumulated in the inductor L. In the case where the capacitor C is connected in parallel to the load 16, the current supplies the load 16 with power and charges the capacitor C as well.

Figure 2B:
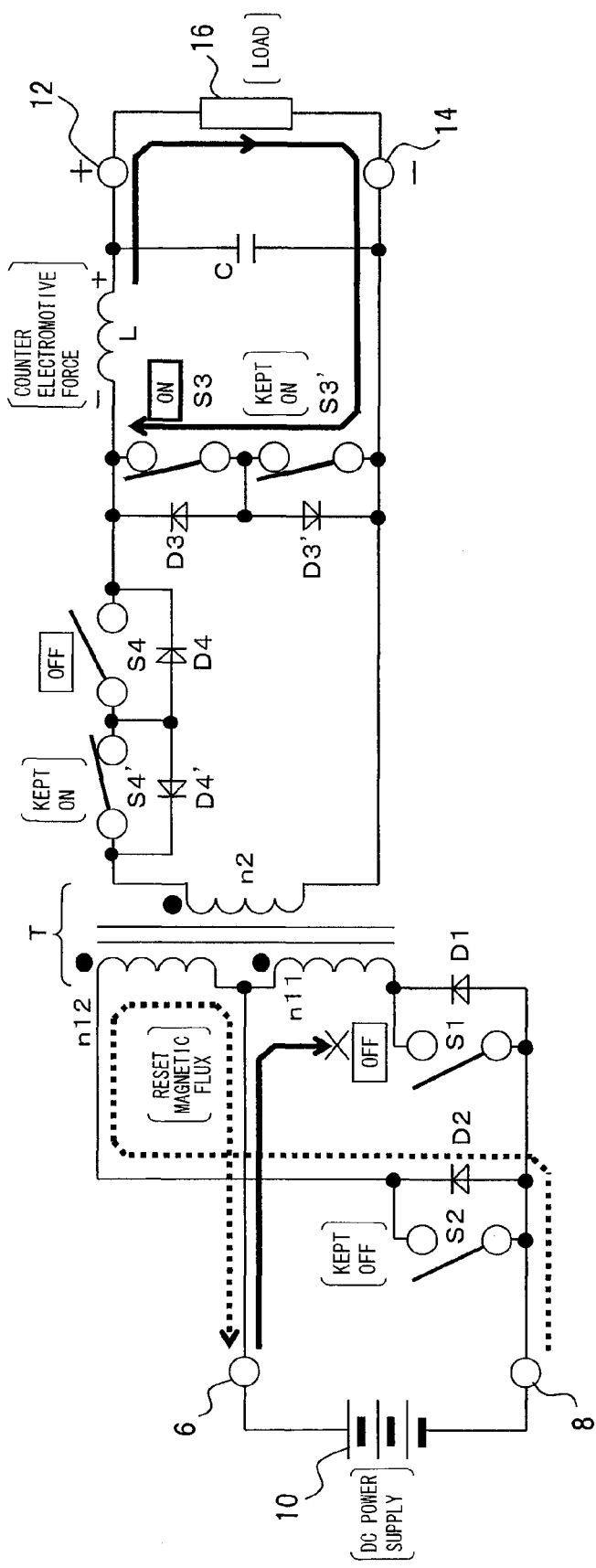

In FIG. 2B, when the switch S1 switches off, a current flows through the diode D2 connected in parallel to the switch S2 into the primary coil n12, which is the other of the primary coils of the isolation transformer T, thus resetting the magnetic flux of the isolation transformer T. At the inductor L, accumulated energy creates a counter electromotive force. As a result, a current passes through the switch S3' (kept on) and the switch S3 (on) to supply power to the load 16. In the case where the capacitor C is connected in parallel to the load 16, the current supplies the load 16 with power and charges the capacitor C as well. When energy accumulated in the inductor L has been discharged completely, power is supplied from the capacitor C to the load 16 (which applies to other embodiments below.) The switching action may be carried out in such a way that the switches S4 and S4' are off and the switches S3 and S3' are on as the switch S1 remains on and then the switch S1 is switched off.

In FIGS. 2A and 2B, the switch S4 switches on and off in synchronization with the switch S1 at the same polarity, while the switch S3 switches on and off at reverse polarity to the switch S4. Thick arrows represent current paths, which clearly indicate that even if the switch S4 or S3 remains off, a current flows through the diode D4 connected in parallel to the switch S4 or through the diode D3 connected in parallel to the switch S3, thus allowing the isolated power conversion apparatus 2 to operate. At this time, the isolated power conversion apparatus 2 operates in the same manner as a forward converter. Because closed switches, which are switches in an on-state, usually suffer less loss than forward diodes, the switches S3 and S4 are switched on at given timing to achieve a highly efficient operation. Besides, keeping the switches S4 and S3 off leads to a problem of impossibility of a regenerating operation, which will be described later. The switches S3' and S4' are kept on in FIGS. 2A and 2B. However, switching on and off the switch S3' at the same timing of switching on and off the switch S3 results in the same operation, and switching on and off the switch S4' at the same timing of switching on and off the switch S4 results in the same operation. The operations indicated in FIGS. 2A and 2B are examples in which less switching actions are required.

Figure 37:
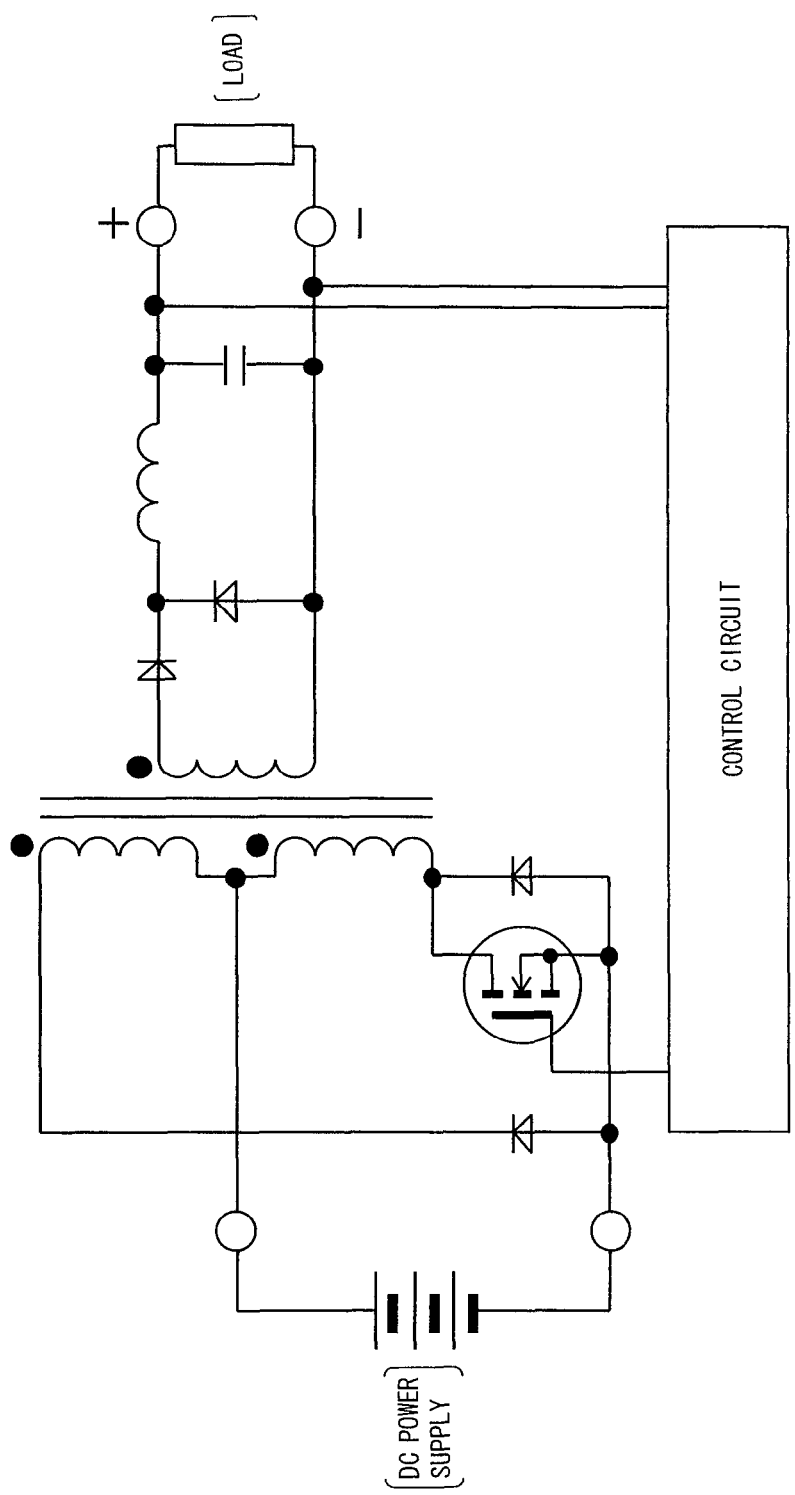
FIG. 37 depicts an isolated DC/DC converter (forward converter)
Figure 38A:
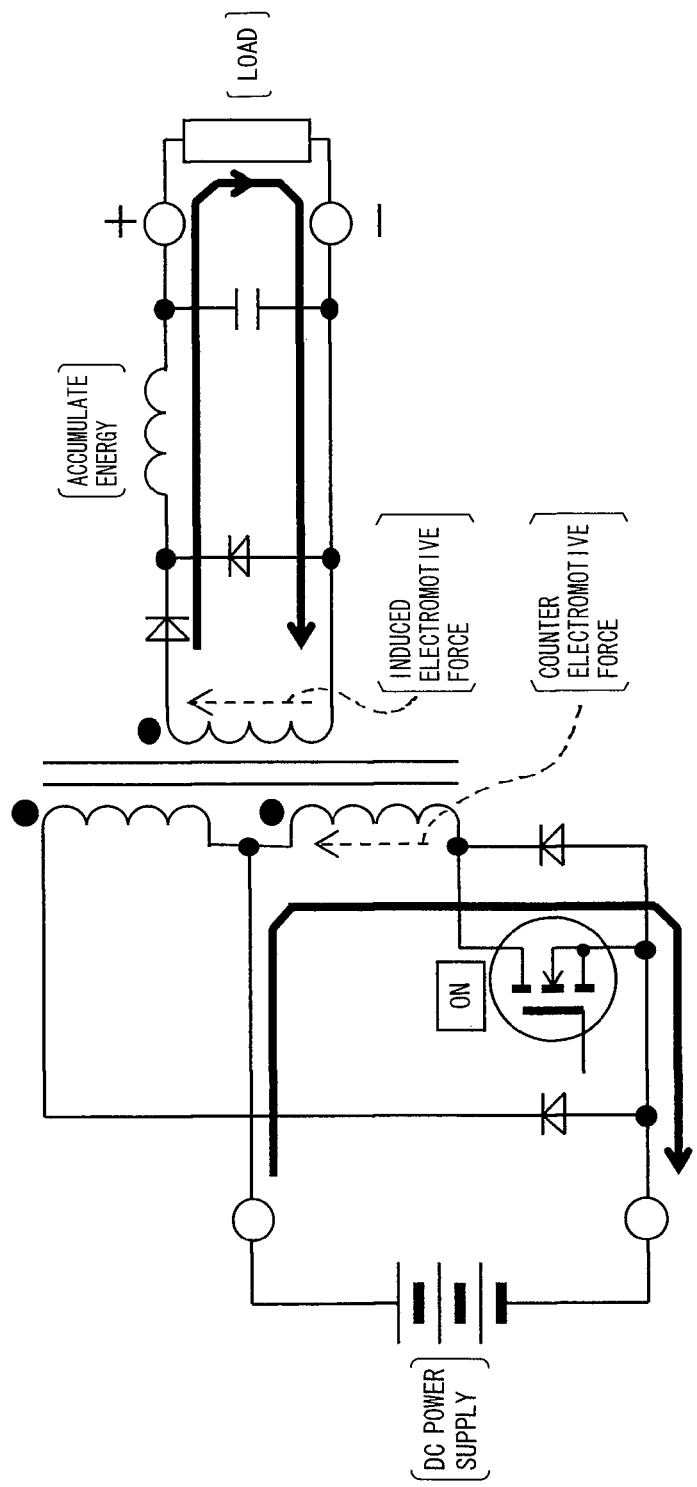
FIGS. 38A and 38B depict operations by the isolated DC/DC converter.
Figure 38B:
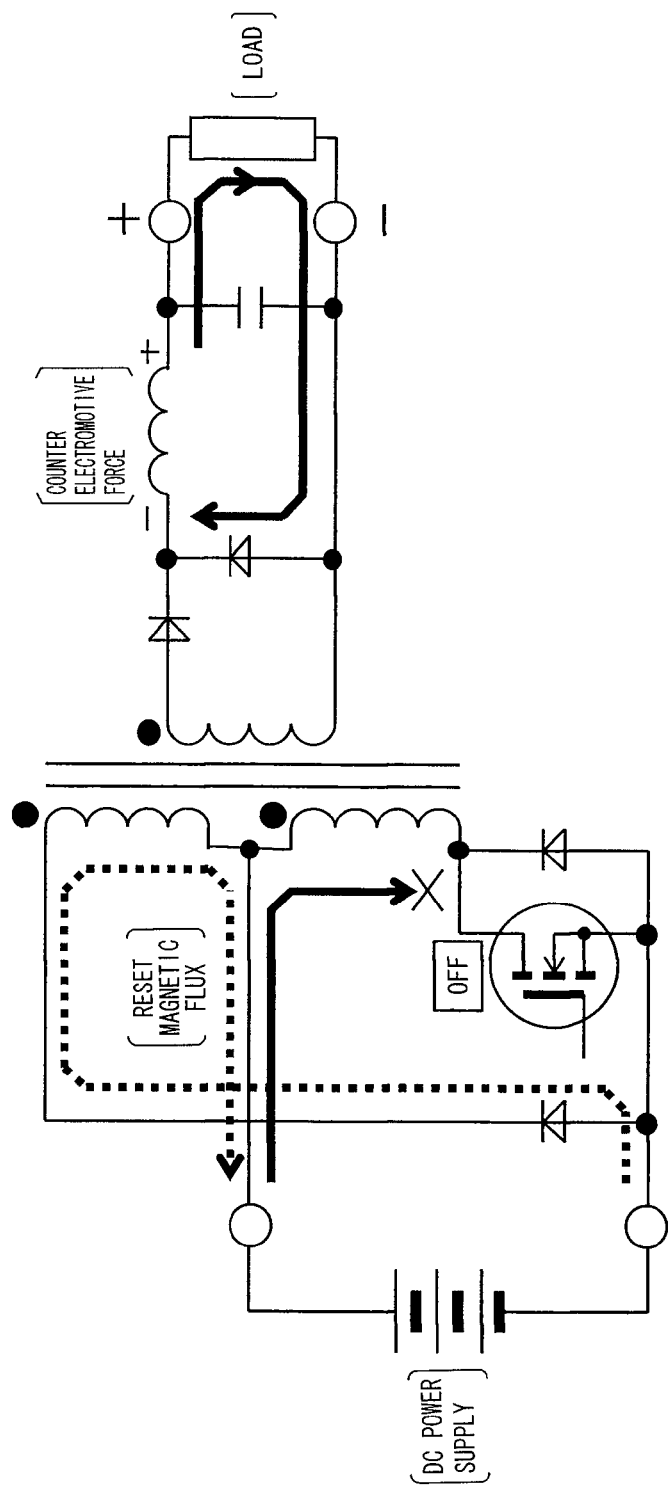

Comparing the operations of FIGS. 2A and 2B with operations of FIGS. 38A and 38B reveals that the operation of FIG. 2A corresponds to an operation of FIG. 38A and that the operation of FIG. 2B corresponds to an operation of FIG. 38B. The operations of FIGS. 2A and 2B are the same as the operation of the forward converter of FIGS. 37, 38A and 38B in that the maximum output voltage is achieved when the duty ratios of the switches S1 and S4 are 50% and that an output voltage in an ideal condition accompanying no loss, etc., is determined by the equation (1).

[Negative Output Operation]

Figure 3A:
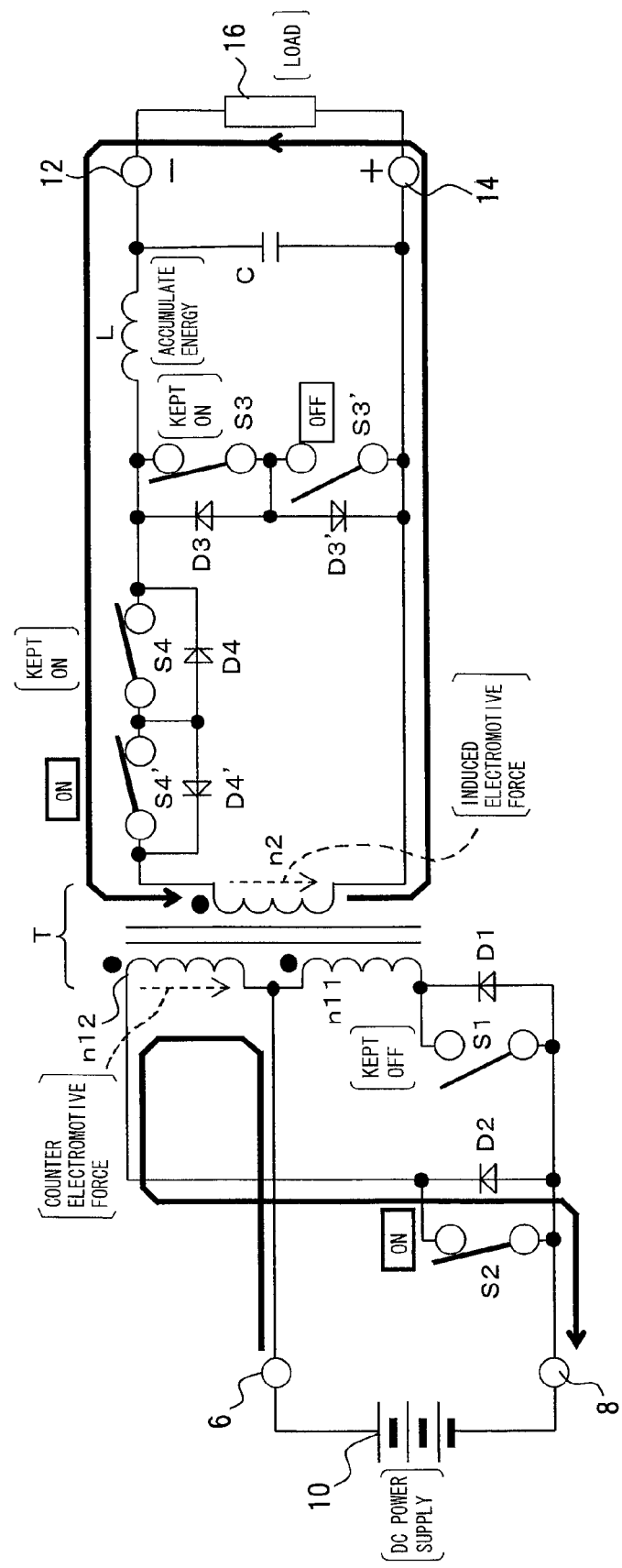
FIGS. 3A and 3B depict operations that are carried out when negative power is output.
Figure 3B:
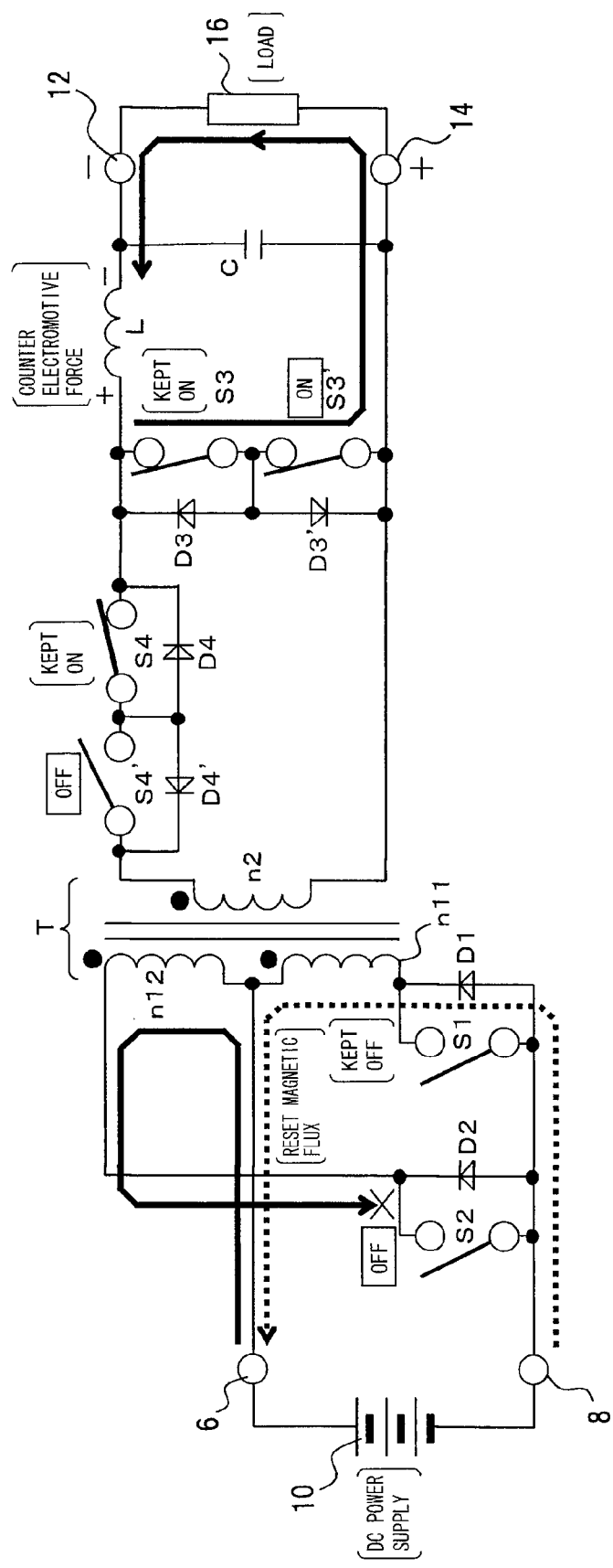

A negative output operation will be described with reference to FIGS. 3A and 3B, which depict operations of outputting a negative voltage. When a negative voltage is output, the switch S1 is kept off and the switches S3 and S4 are kept on. FIG. 3A depicts an operation that is carried out when the switches S2 and S4' switch on and the switch S3' switches off. FIG. 3B depicts an operation that is carried out when the switches S2 and S4' switch off and the switch S3' switches on.

In FIG. 3A, when the switch 2 switches on, a current starts flowing from the DC power supply 10 into the primary coil n12, which is one of the primary coils of the isolation transformer T, thus creating a counter electromotive force. As a result, an induced electromotive force is generated in the secondary coil n2 of the isolated transformer T. A voltage generated by this induced electromotive force is reverse in polarity to the induced voltage in the case of FIG. 2A. A current generated in the secondary coil n2 of the isolation transformer T passes through the switch S4' (on), the switch S4 (kept on), and the inductor L to supply power as negative voltage to the load 16. Meanwhile, energy is accumulated in the inductor L.

In FIG. 3B, when the switch S2 switches off, a current flows through the diode D1 connected in parallel to the switch S1 into the primary coil n11, which is the other of the primary coils of the isolation transformer T, thus resetting the magnetic flux of the isolation transformer T. At the inductor L, accumulated energy creates a counter electromotive force. As a result, a current passes through the switch S3' (on) and the switch S3 (kept on) to supply power as negative voltage to the load 16. The switching action may be carried out in such away that the switches S4 and S4' are off and the switches S3 and S3' are on as the switch S2 remains on and then the switch S2 is switched off.

In FIGS. 3A and 3B, the switch S4' switches on and off in synchronization with the switch S2 at the same polarity, while the switch S3' switches on and off at reverse polarity to the switch S4'. Current paths represented by thick arrows clearly indicate that even if the switch S4' or S3' remains off, a current flows through the diode D4' connected in parallel to the switch S4' or through the diode D3' connected in parallel to the switch S3', thus allowing the isolated power conversion apparatus 2 to operate without a problem. In the same manner as in the case of FIGS. 2A and 2B, switches are switched on at given timing to achieve a more efficient operation and enable power regeneration. The switches S3 and S4 are kept on in FIGS. 3A and 3B. However, switching on and off the switch S3 at the same timing of switching on and off the switch S3' results in the same operation, and switching on and off the switch S4 at the same timing of switching on and off the switch S4' results in the same operation. The circuit of FIGS. 3A and 3B requires less switching actions, as the circuit of FIGS. 2A and 2B is.

Comparing the circuit operations of FIGS. 2A and 2B, with the circuit operations of FIGS. 3A and 3B reveals that operations of both are reverse in direction to each other as a positively directed operation and a negatively directed operation.

The circuit of FIGS. 3A and 3B is the same as the circuit of FIG. 37 and of FIGS. 2A and 2B in that the maximum output voltage in the negative direction is achieved when the duty ratios of the switches S2 and S4' are 50% and that a (negative) output voltage in an ideal condition accompanying no loss, etc., is determined by the equation (1).

[Positive Regenerating Operation]

Figure 4A:
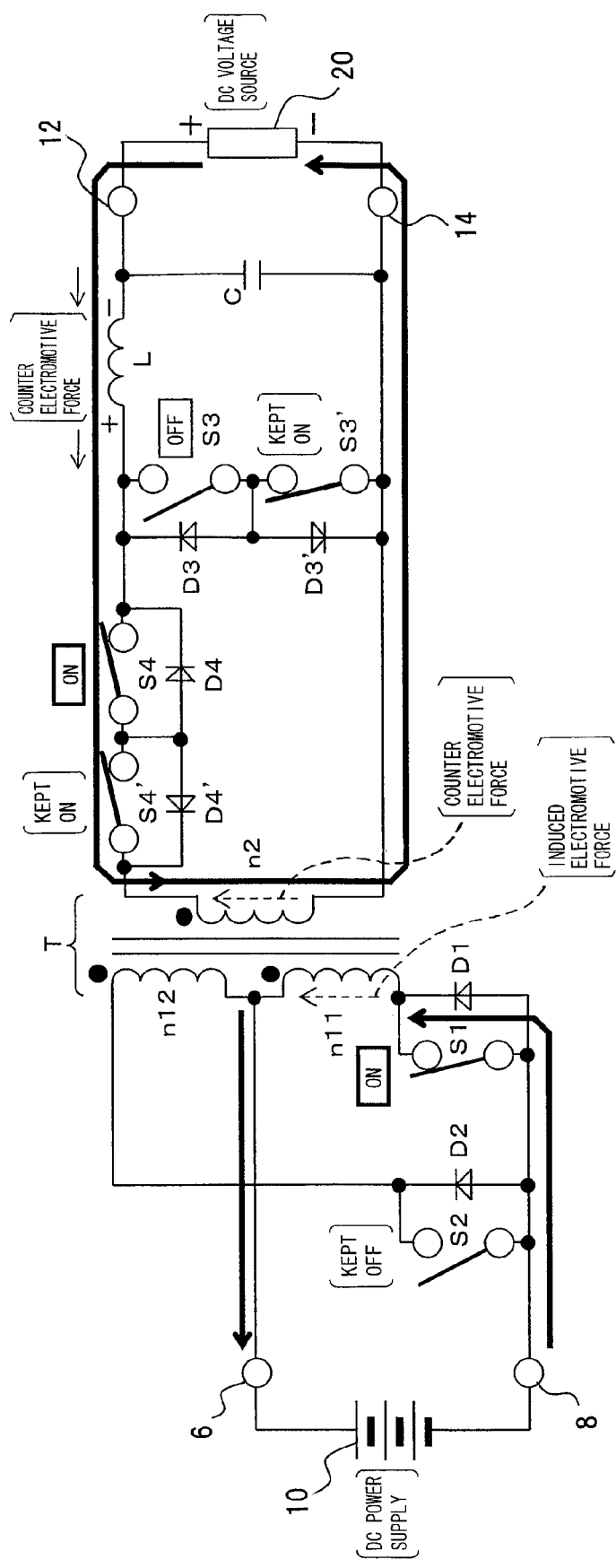
FIGS. 4A and 4B depict operations of regenerating positive power.
Figure 4B:
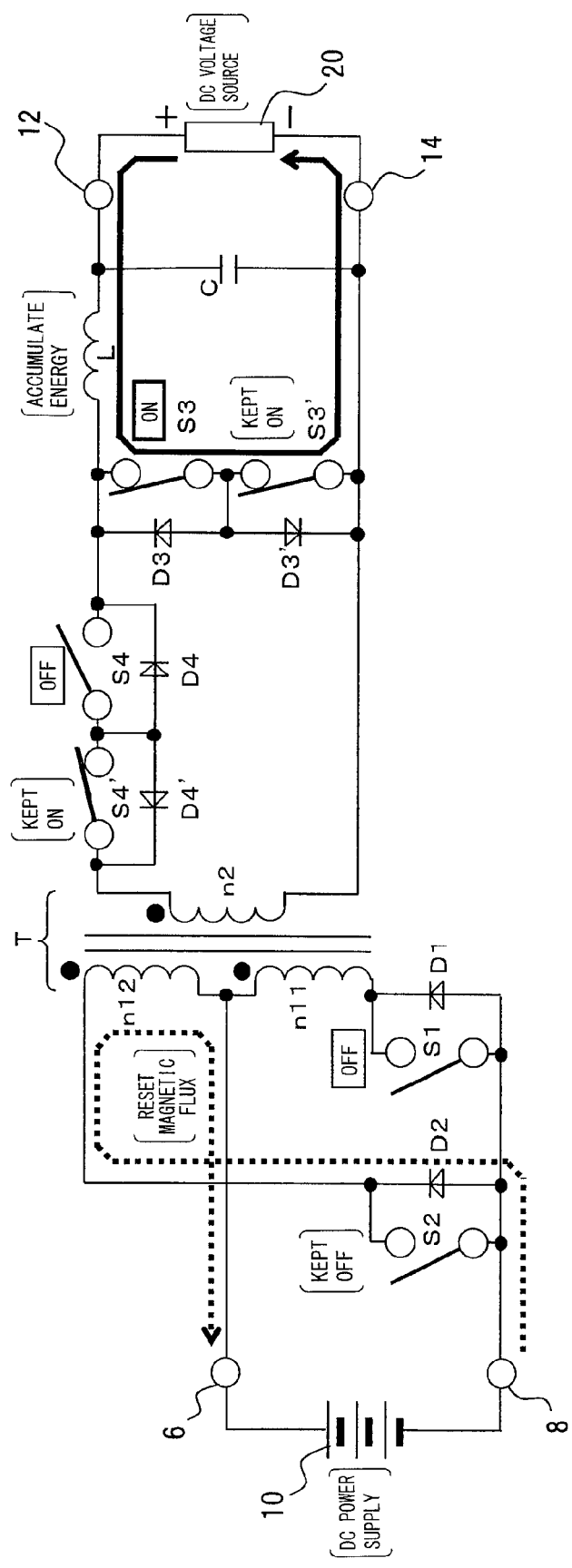

FIGS. 4A and 4B depict power regenerating operations of positive voltage. Actions by switches, etc., are the same as in the circuit of FIGS. 2A and 2B. In the circuit of FIGS. 4A and 4B, however, power is supplied from the output side, so that the direction of current is reverse to the direction of current in the circuit of FIGS. 2A and 2B. Specifically, the operations of FIGS. 2A and 2B are carried out in the case where power is consumed at the output side, while the operations of FIGS. 4A and 4B are carried out in the case where power is supplied from the output side. This indicates that so-called bidirectional operation is possible.

In FIG. 4A, when the switch S3 switches off and the switches S4 and S1 switch on, a current starts flowing from a DC voltage source 20 on the secondary side of the isolation transformer T and passes through the inductor L, the switch S4 (on), and the switch S4' (kept on) to flow into the secondary coil n2 of the isolation transformer T, thus creating a counter electromotive force. As a result, an induced electromotive force is generated in the primary coil n11 of the isolation transformer T. Energy accumulated in the inductor L emerges as a counter electromotive force, and is released by joining energy from the DC voltage source 20 on the secondary side of the isolation transformer T. A current generated in the primary coil of the isolated transformer T flows into the DC power source 10 on the primary side of the isolation transformer T to supply the DC power source 10 with power as the current passes through the switch S1.

In FIG. 4B, when the switch S3 switches on and the switches S4 and S1 switch off, a current flows from the DC voltage source 20 on the secondary side of the isolation transformer T and passes through the inductor L, the switch S3 (on), and the switch S3' (kept on). As a result, energy is accumulated in the inductor L. Switching off of the switch S1 causes a current to pass through the diode D2 connected in parallel to the switch S2 and flow into the other primary coil n12 of the isolation transformer T, where its magnetic flux is reset. The current flowing into the DC power supply 10 on the primary side of the isolation transformer T supplies the DC power supply 10 with power.

The size of the current from the DC voltage source 20 on the secondary side of the isolation transformer T is determined by the voltage and output impedance of the DC voltage source 20 on the secondary side of the isolation transformer T and by a voltage to be output from the DC/DC converter and its output impedance. Because both output impedances are low, a difference between the voltage of the DC voltage source 20 on the secondary side of the isolation transformer T and the voltage to be output from the DC/DC converter may lead to the generation of an unexpectedly large current flow. It is necessary, therefore, to control the voltage to be output from the DC/DC converter or control current into constant current so that the output impedance of the DC/DC converter increases, in adjustment to the volume of power or current to be regenerated. (This necessity applies to all embodiments of the present invention including a DC/AC inverter that will be described later.)

[Negative Regenerating Operation]

Figure 5A:
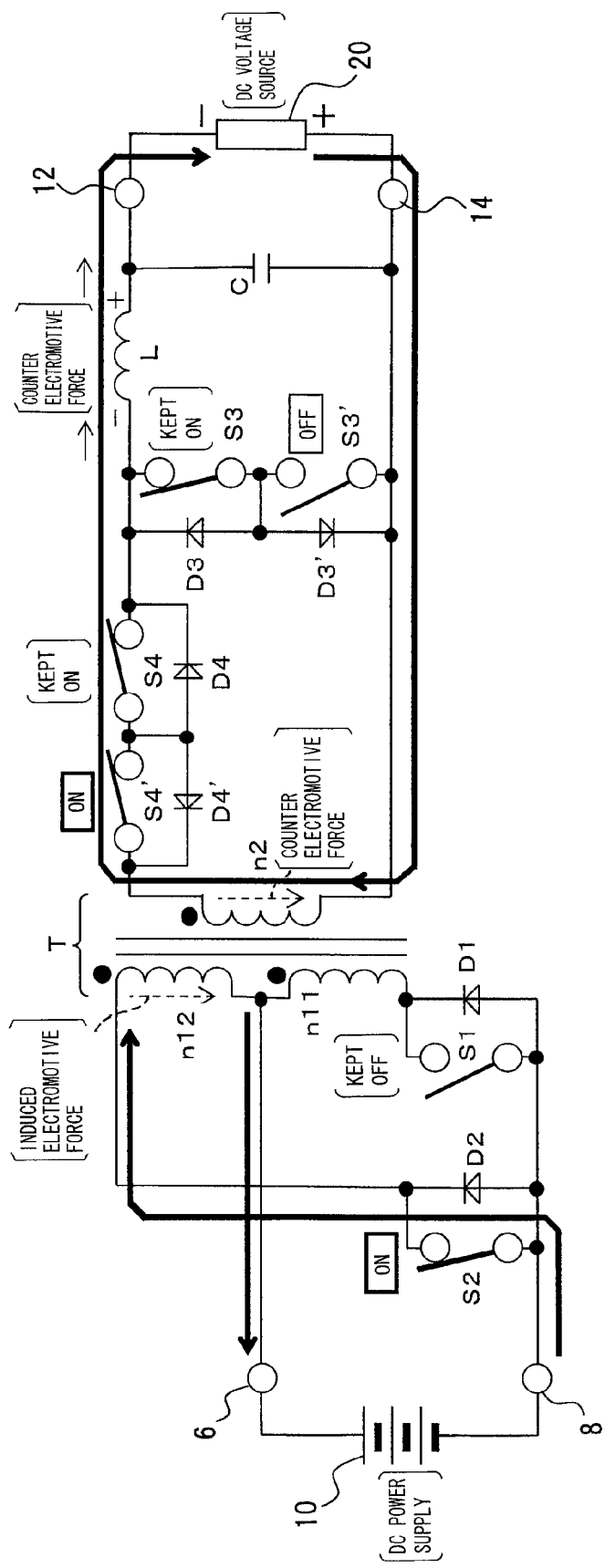
FIGS. 5A and 5B depict operations of regenerating negative power.
Figure 5B:
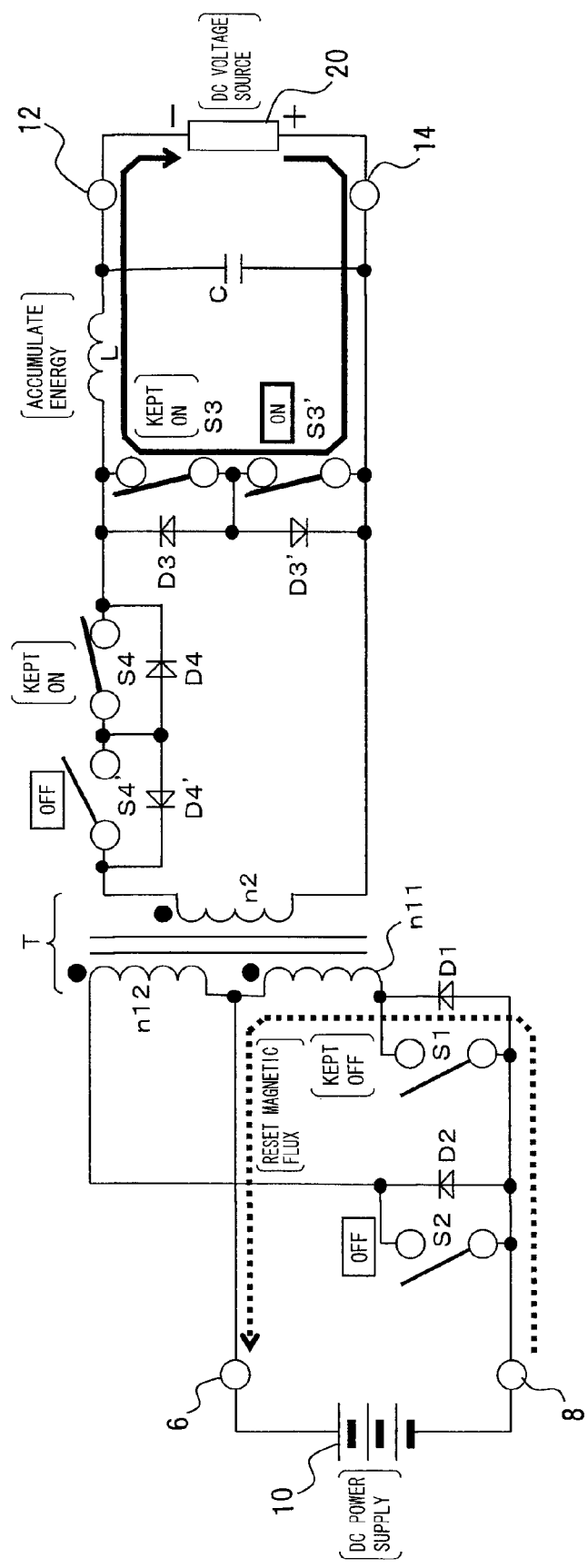

A negative regenerating operation will be described with reference to FIGS. 5A and 5B. FIGS. 5A and 5B depict power regenerating operations of negative voltage. In FIGS. 5A and 5B, actions by the switches, etc., are the same as in FIGS. 3A and 3B, but power as negative voltage is supplied from the output side through a current flow reverse in direction to the current flow in FIGS. 3A and 3B. Specifically, in the case where power as negative voltage is consumed at the output-side load 16, the operations of FIGS. 3A and 3B are carried out. In the case where power as negative voltage is supplied from the output side, the operations of FIGS. 5A and 5B are carried out. This indicates that so-called bidirectional operation is possible.

In FIG. 5A, when the switch S3' switches off and the switches S4' and S2 switch on, a current starts flowing from the DC voltage source 20 and passes through the switch S4' (on), the switch S4 (kept on), and the inductor L to flow into the secondary coil n2 of the isolation transformer T, thus creating a counter electromotive force. As a result, an induced electromotive force is generated in one primary coil of the isolation transformer T. Energy accumulated in the inductor L emerges as a counter electromotive force, and is released by joining energy from the DC voltage source 20 on the secondary side of the isolation transformer T. A current generated in the primary coil of the isolation transformer T flows into the DC power source 10 on the primary side of the isolation transformer T to supply the DC power source 10 with power as the current passes through the switch S2.

In FIG. 5B, when the switch S3' switches on and the switches S4' and S2 switch off, a current flows from the DC voltage source 20 on the secondary side of the isolation transformer T and passes through the switch S3' (on), the switch S3 (kept on), and the inductor L. As a result, energy is accumulated in the inductor L. Switching off of the switch S2 causes a current to pass through the diode D1 connected in parallel to the switch S1 and flow into the other primary coil n11 of the isolation transformer T, where its magnetic flux is reset. The current flowing into the DC power supply 10 on the primary side of the isolation transformer T supplies the DC power supply 10 with power.

[DC/AC Inverter Operation]

A DC/AC inverter operation will be described with reference to FIG. 6, which depicts an example of the DC/AC inverter operation.

As described above, the circuit depicted in FIG. 1 operates as the DC/DC converter capable of positive and negative output and is able to regenerate output-side power to the input side, i.e., to the DC power supply 10. The circuit is capable of positive and negative output by switching actions and is able to control the absolute value of an output voltage through duty ratios at the switching actions. By using these properties, the circuit can be configured and operated as an isolated bidirectional DC/AC inverter.

In the circuit of FIGS. 2A to 5B, switching actions are made at a substantially constant duty ratio under control by the control circuit 18 to achieve a constant output voltage, i.e., DC output. According to the operation of FIG. 6, an output voltage is changed by sequentially changing on/off setting of switches and duty ratios at switching actions in correspondence to instantaneous values of a desired output voltage. Through this process, a desired waveform, i.e., AC output is achieved.

In FIG. 6, S1, S2, S3, S3', S4, and S4' represent the actions (on/off actions) of switches S1, S2, S3, S3', S4, and S4' of FIGS. 1 to 5B, respectively, and "output" represents an output voltage waveform.

In a period of the first half of the output waveform, a positive voltage is output. In this period, therefore, the switch S2 is kept off and the switches S3' and S4' are kept on, as in the case of FIGS. 2A, 2B, 4A and 4B. The switch S4 switches on and off in synchronization with the switch S1 at the same polarity, while the switch S3 switches on and off in reverse in polarity to the switch S4. A low-voltage part of the output waveform corresponds to a period in which the duty ratio of the switch S4 is close to 0% (the on-time is shorter than the off-time), while a high-voltage part of the output waveform corresponds to a period in which the duty ratio of the switch S4 is close to 50%. (the on-time is close to the off-time)

In a period of the latter half of the output waveform, a negative voltage is output. In this period, therefore, the switch S1 is kept off and the switches S3 and S4 are kept on, as in the case of FIGS. 3A, 3B, 5A and 5B. The switch S4' switches on and off in synchronization with the switch S2 at the same polarity, while the switch S3' switches on and off in reverse in polarity to the switch S4'. A part of the output waveform that is close to 0 V corresponds to a period in which the duty ratio of the switch S4' is close to 0% (the on-time is shorter than the off-time), while a part of the output waveform that indicates a large negative voltage corresponds to a period in which the duty ratio of the switch S4' is close to 50%. (the on-time is close to the off-time)

In this manner, if on/off setting of switches and duty ratios at switching actions are changed sequentially in correspondence to instantaneous values of the output waveform, a desired waveform, i.e., AC output is achieved.

Switches kept on or off may be switched on and off at given timing, as described in the explanation of the positive output operation and negative output operation.

To achieve a desired output waveform, an externally generated analog waveform signal or digital waveform data may be given to the control circuit 18, the control circuit 18 may be caused to generate a desired waveform signal, or waveform data may be generated by a calculation process, etc.

The above operation is carried out in the same manner in the case where power is supplied from the output side to the load 16 and in the case where, on contrary to the above case, output-side power is regenerated to the DC power supply 10. This is clearly understood by comparing FIGS. 2A and 2B with FIGS. 4A and 4B, and FIGS. 3A and 3B with FIGS. 5A and 5B. Hence the DC/AC inverter capable of regenerating output-side power to the DC power supply 10 is realized.

Figure 8:
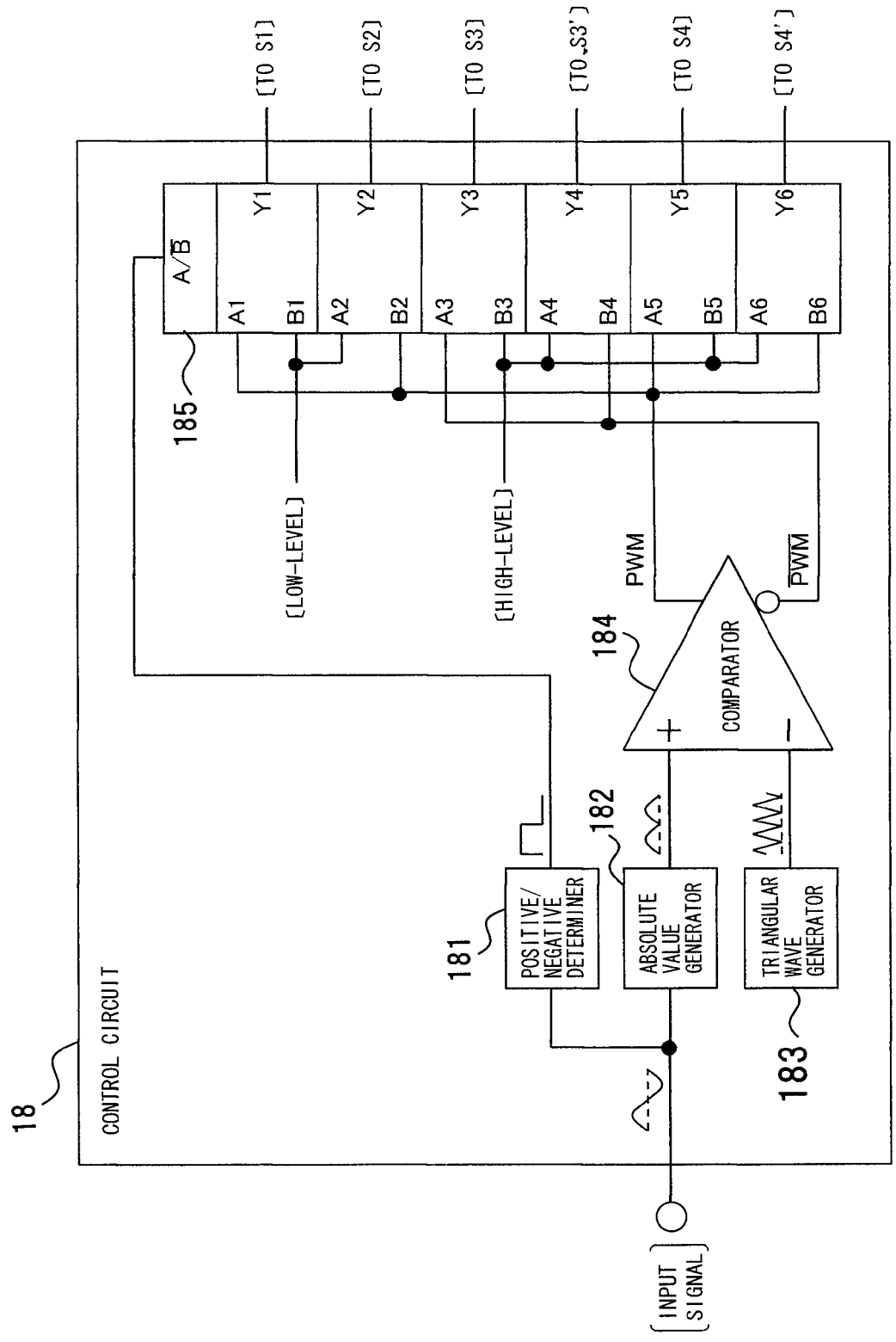
FIG. 8 depicts an example of a control circuit for carrying out the DC/AC inverter operation.

In FIG. 6, a switching frequency is determined to be 18 times an output frequency. However, the switching frequency is not limited to such a frequency, and does not need to be integer times the output frequency. FIGS. 7 and 8 depict examples of a method of generating control signals S1, S2, S3, S3', S4, and S4' for the switches S1, S2, S3, S3', S4, and S4' of FIG. 6. While PWM is indicated in first to eleventh embodiments and other embodiments for facilitating understanding, other modulation methods, such as PFM, may be used in place of PWM.

FIG. 7 depicts generation of a signal indicative of the positive or negative of an input signal and an absolute value signal indicative of the absolute value of the input signal (i.e., a signal given as the as-is input signal when the input signal is positive and given as an inverted signal when the input signal is negative), out of the input signal. By comparing the size of a separately generated triangular wave signal (whose frequency is equivalent to the switching frequency) with the size of the absolute value signal, a PWM signal and an inverted PWM signal are generated. The amplitude of the triangular wave signal is determined to be twice or more the amplitude of the absolute value signal so that the duty ratio stays within the range of 50% or less. Other than the triangular wave, a sawtooth wave, a reverse sawtooth wave, and a ramp wave having asymmetric rising edges and falling edges may be used. The signal indicative of the positive or negative of the input signal, the PWM signal, and the inverted PWM signal are generated in this manner, and the control signals for the switches S1, S2, S3, S3', S4, and S4' are generated out of the those signals.

The control circuit 18 will then be described with reference to FIG. 8, which depicts an example of the control circuit. According to this control circuit 18, an input signal is input to a positive/negative determiner 181, which is a positive/negative determining unit or positive/negative determining circuit, to generate a signal indicative of the positive or negative of the input signal. The input signal is input also to an absolute value generator 182, which is an absolute value generating unit or absolute value generating circuit, to generate an absolute value signal. A triangular wave signal generated by a triangular wave generator 183, which is a triangular wave generating unit or triangular wave generating circuit, and the absolute value signal are input to a comparator 184 to generate a PWM signal and an inverted PWM signal. Input of the PWM signal and the inverted PWM signal and high-level input and low-level input are switched, using a selector 185 that selects either A input (A1, A2, A3, A4, A5, A6) or B (B1, B2, B3, B4, B5, B6) input in input switching based on the signal (A/B) indicative of the positive or negative of the input signal, to generate the control signals for the switches S1, S2, S3, S3', S4, and S4'.

The control circuit 18 of FIG. 8 includes the positive/negative determiner 181, the absolute value generator 182, the triangular wave generator 183, and the comparator 184, and processes the analog input signal by analog signal processing. However, the control circuit 18 may process a digital input signal by digital processing. For example, in the case where an input signal is digital waveform data in the form of two's complement, inverting the most significant bit (MSB) gives a signal indicative of the positive or negative of the input signal, and taking the exclusive logical sum (exclusive-OR) of each of bits other than the MSB and the MSB gives absolute value waveform data. A triangular waveform can be generated by a counter, etc., based on a clock signal, and a PWM signal and an inverted PWM signal can be generated by a digital comparator, etc. It is possible that part or the whole of these digital processes is realized by software.

Second Embodiment

Figure 9:
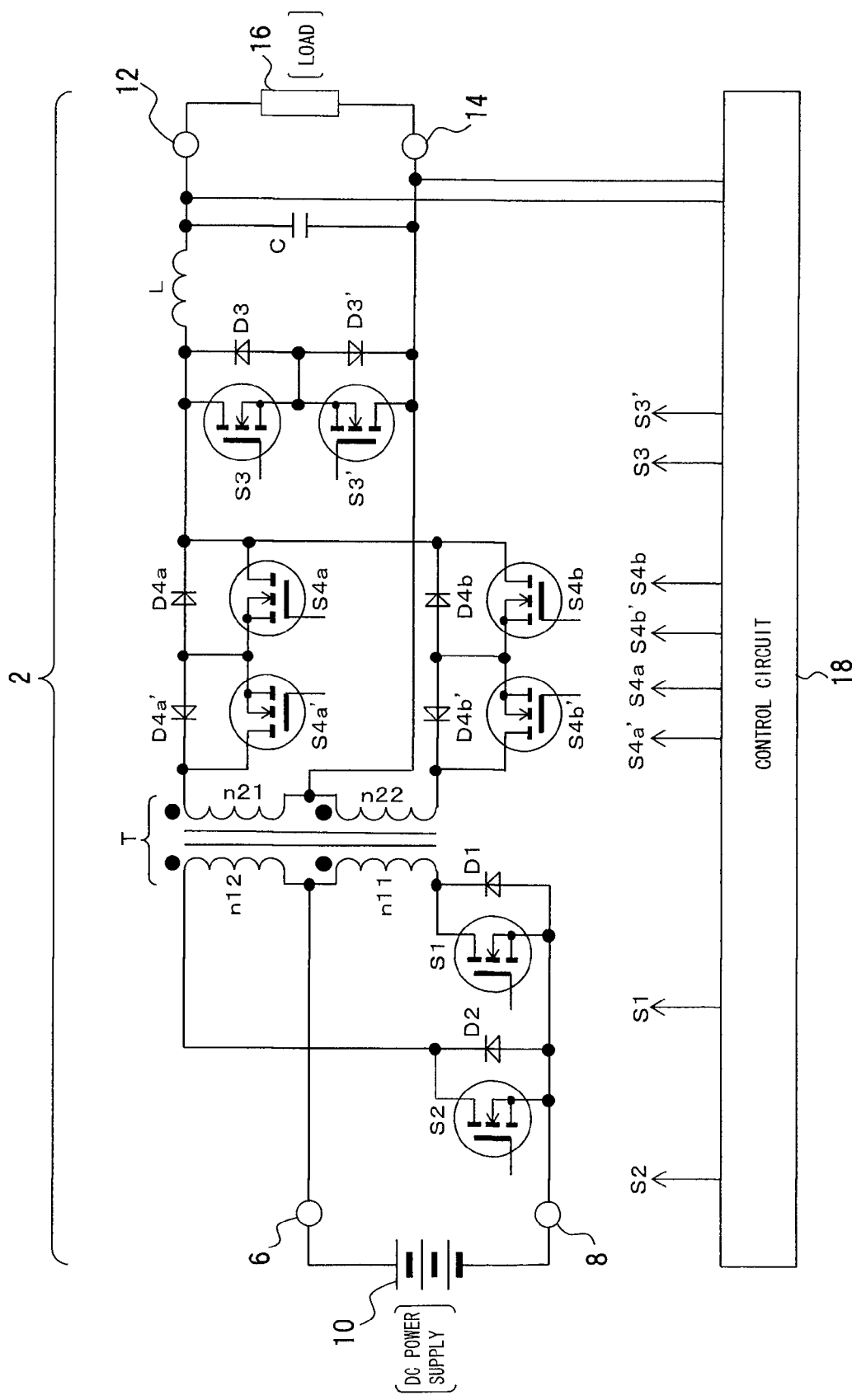
FIG. 9 depicts an example of an isolated power conversion apparatus according to a second embodiment.

A second embodiment discloses a configuration in which the isolation transformer T has two secondary coils and diodes and switches are provided on both sides of the two secondary coils. FIG. 9 depicts an isolated power conversion apparatus according to the second embodiment.

In the above first embodiment, the switches S4 and S4' switch on once during every one cycle of the switching frequency. In the second embodiment, in contrast, switches S4a and S4a' switch on during one half cycle of the switching frequency and switches S4b and S4b' switch on during the other half cycle. Hence a switching-on action is made twice during every one cycle of the switching frequency. In other words, the circuit of the first embodiment carries out an operation similar to half-wave rectification, while the circuit of the second embodiment carries out an operation similar to full-wave rectification (hereinafter, these operations will be referred to as half-wave rectification type and full-wave rectification type, respectively.). Operations by the power conversion apparatus 2 of FIG. 9 are shown in FIGS. 10A to 12.

[Positive Output Operation]

Figure 10A:
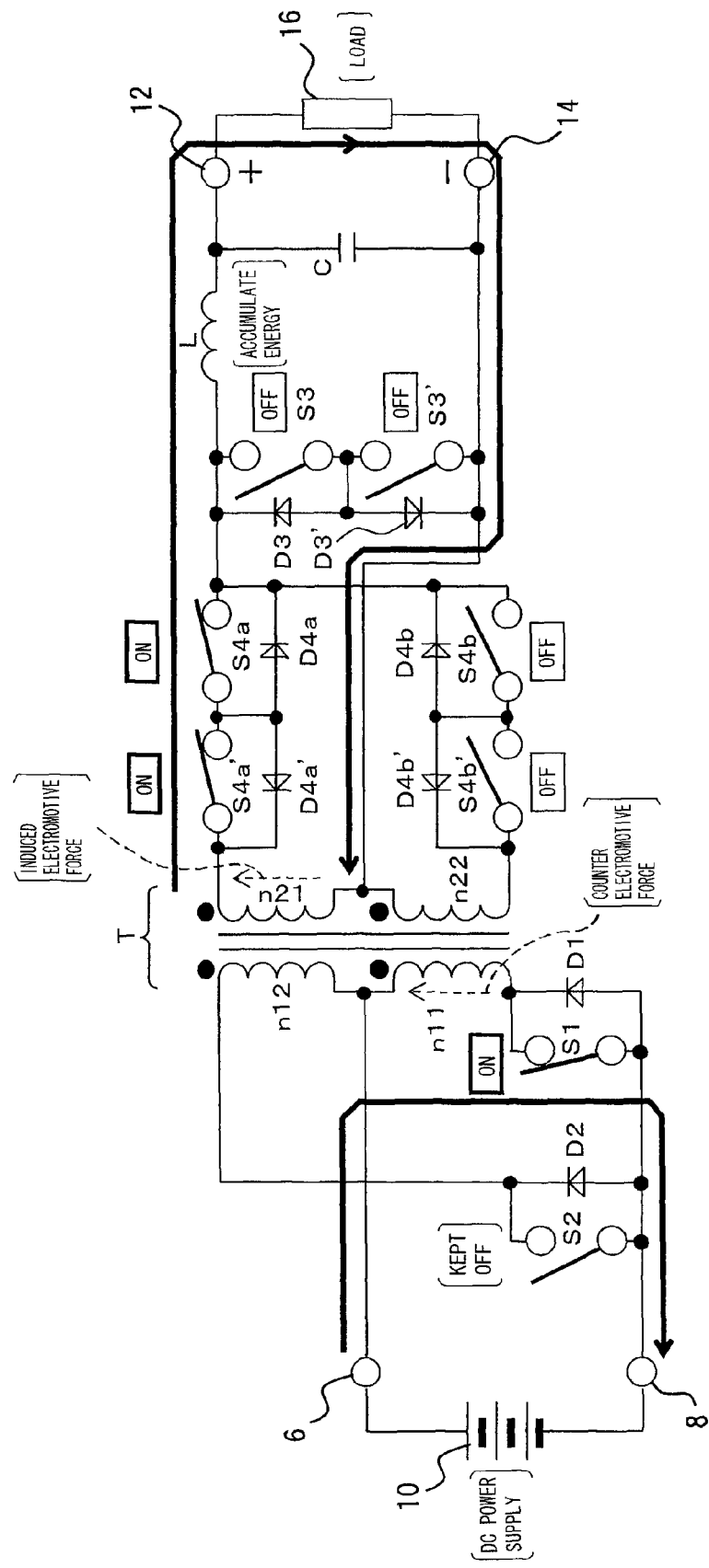
FIGS. 10A to 10D depict operations that are carried out when positive power is output.
Figure 10B:
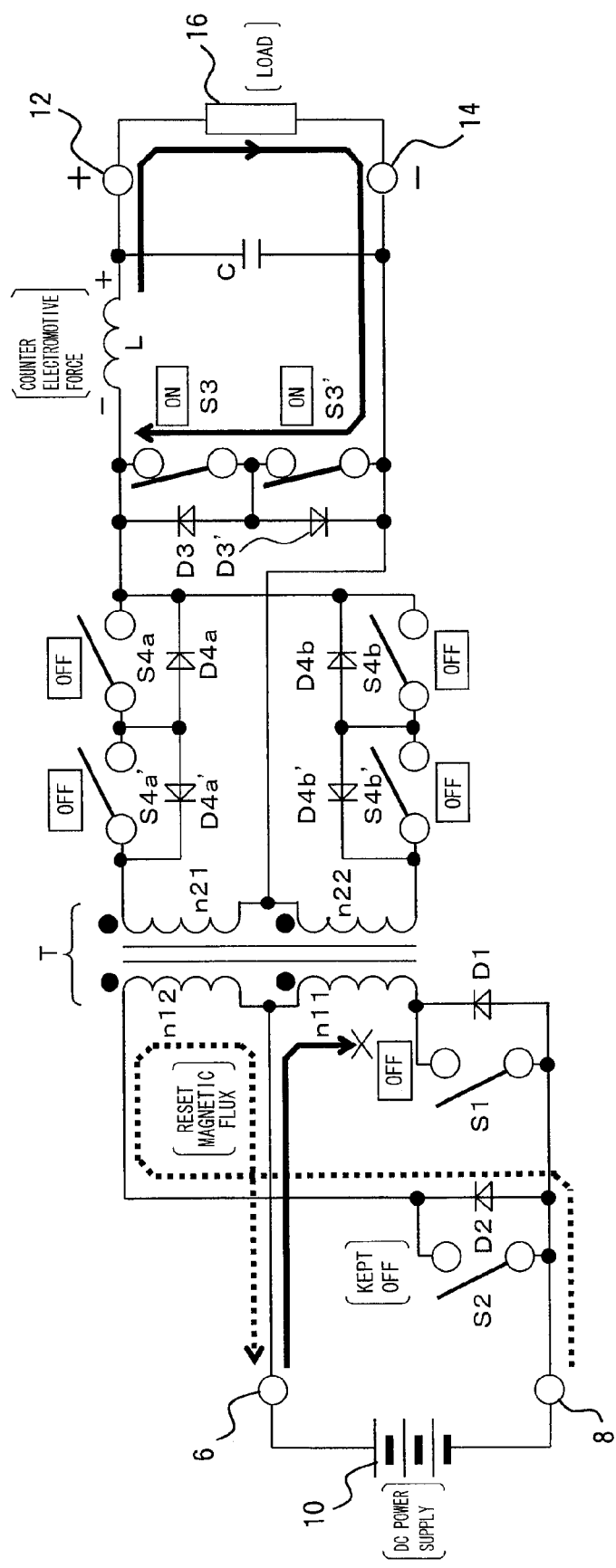
Figure 10C:
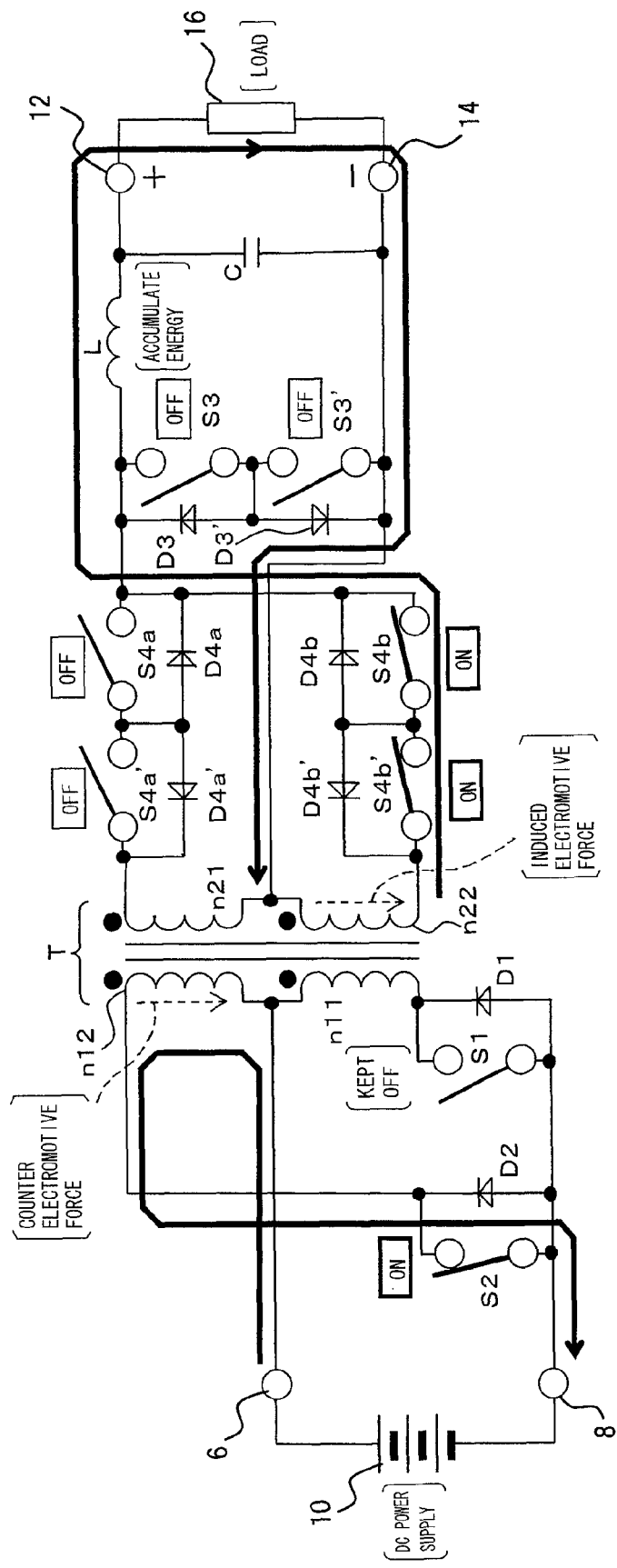
Figure 10D:
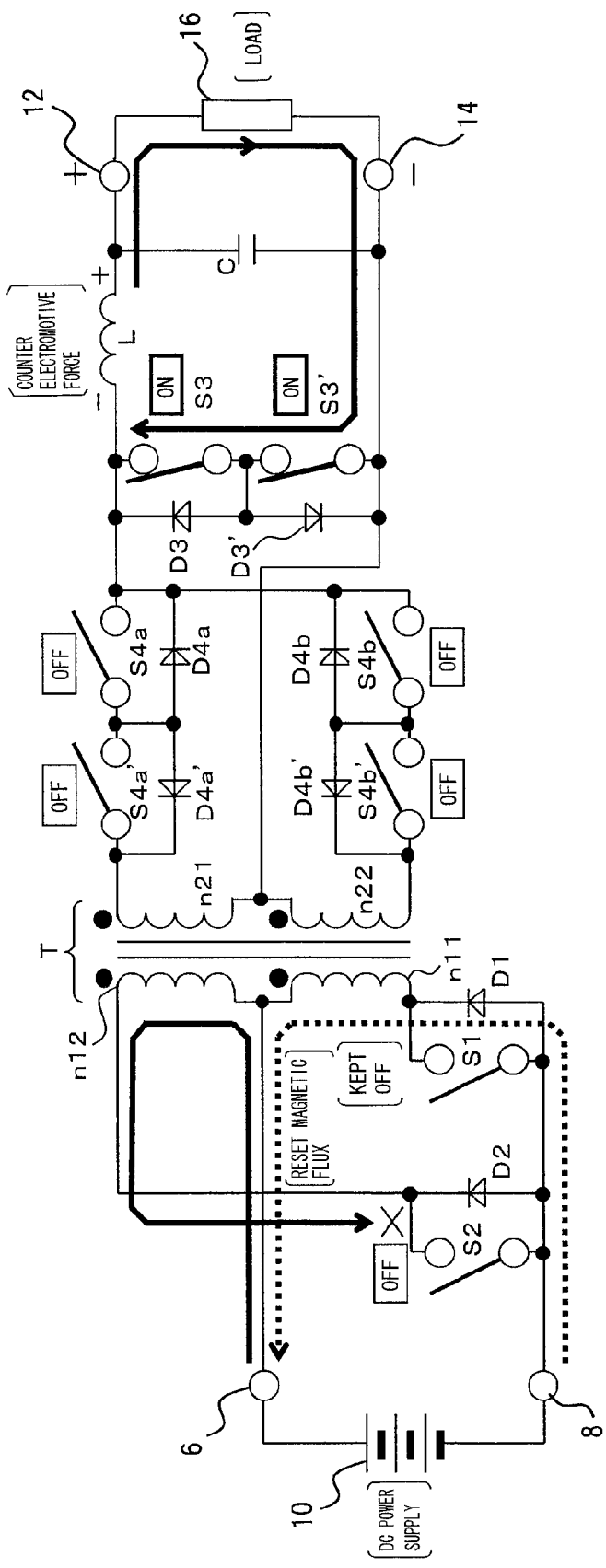

FIGS. 10A to 10D depict operations that are carried out when a positive voltage is output. FIG. 10A depicts an operation that is carried out when the switches S1, S4a, and S4a' switch on and the other switches switch off. FIG. 10C depicts an operation that is carried out when the switches S2, S4*b*, and S4*b*' switch on and the other switches switch off. FIGS. 10B and 10D depict operations that are carried out when the switches S3 and S3' switch on and the other switches switch off.

In FIG. 10A, when the switch 1 switches on, a current starts flowing from the DC power supply 10 into the primary coil n11 of the isolation transformer T that is connected to the switch S1, thus creating a counter electromotive force. As a result, an induced electromotive force is generated in the secondary coils n21 and n22 of the isolation transformer T. A current generated in the secondary coil n21 of the isolation transformer T that is connected to the switch S4*a*' passes through the switch S4*a*' (on), the switch S4*a* (on), and the inductor L to supply power to the load 16. Meanwhile, energy is accumulated in the inductor L.

In FIG. 10B, when the switches S4*a* and S4*a*' switch off and the switches S3 and S3' switch on, a counter electromotive force is generated at the inductor L by energy accumulated therein. As a result, a current passes through the switch S3 and the switch S3' to supply power to the load 16. When the switch S1 switches off, a current passes through the diode connected in parallel to the switch S2 to flow into the primary coil n12 of the isolation transformer T, where its magnetic flux is reset. Switching actions may be carried out in such a way that the switches S4*a* and S4*a*' are off and the switches S3 and S3' are on as the switch S1 remains on, and then the switch S1 is switched off.

In FIG. 10C, when the switch S2 switches on, a current starts flowing from the DC power supply 10 into the primary coil n12 of the isolation transformer T that is connected to the switch S2, thus creating a counter electromotive force. As a result, an induced electromotive force is generated in the secondary coils n21 and n22 of the isolation transformer T. A current generated in the secondary coil n22 of the isolation transformer T that is connected to the switch S4*b*' passes through the switch S4*b*' (on), the switch S4*b* (on), and the inductor L to supply power to the load 16. Meanwhile, energy is accumulated in the inductor L.

In FIG. 10D, when the switches S4*b* and S4*b*' switch off and the switches S3 and S3' switch on, a counter electromotive force is generated at the inductor L by energy accumulated therein. As a result, a current passes through the switch S3 and the switch S3' to supply power to the load 16. When the switch S2 switches off, a current passes through the diode connected in parallel to the switch S1 to flow into the primary coil n11 of the isolation transformer T, where its magnetic flux is reset. Switching actions may be carried out in such a way that the switches S4*b* and S4*b*' are off and the switches S3 and S3' are on as the switch S2 remains on, and then the switch S2 is switched off.

The above operations are the same as the operations of the forward converter of FIGS. 37, 38A and 38B in that the maximum output voltage is achieved when the duty ratio of each of the switches S4*a*, S4*a*', S4*b*, and S4*b*' is 50%. In the same manner as the first embodiment, the switches S4*a*', S4*b*', and S3' may be kept on in positive output. "(duty ratio)" in the output voltage equation (equation (1)) used in an ideal condition accompanying no loss, etc., is given as "(duty ratios of switches S4*a* and S4*a*'+duty ratios of switches S4*b* and S4*b*')". Hence a calculated output voltage is twice as large as an output voltage calculated by the equation (1) for the forward converter.

[Negative Output Operation]

Figure 11A:
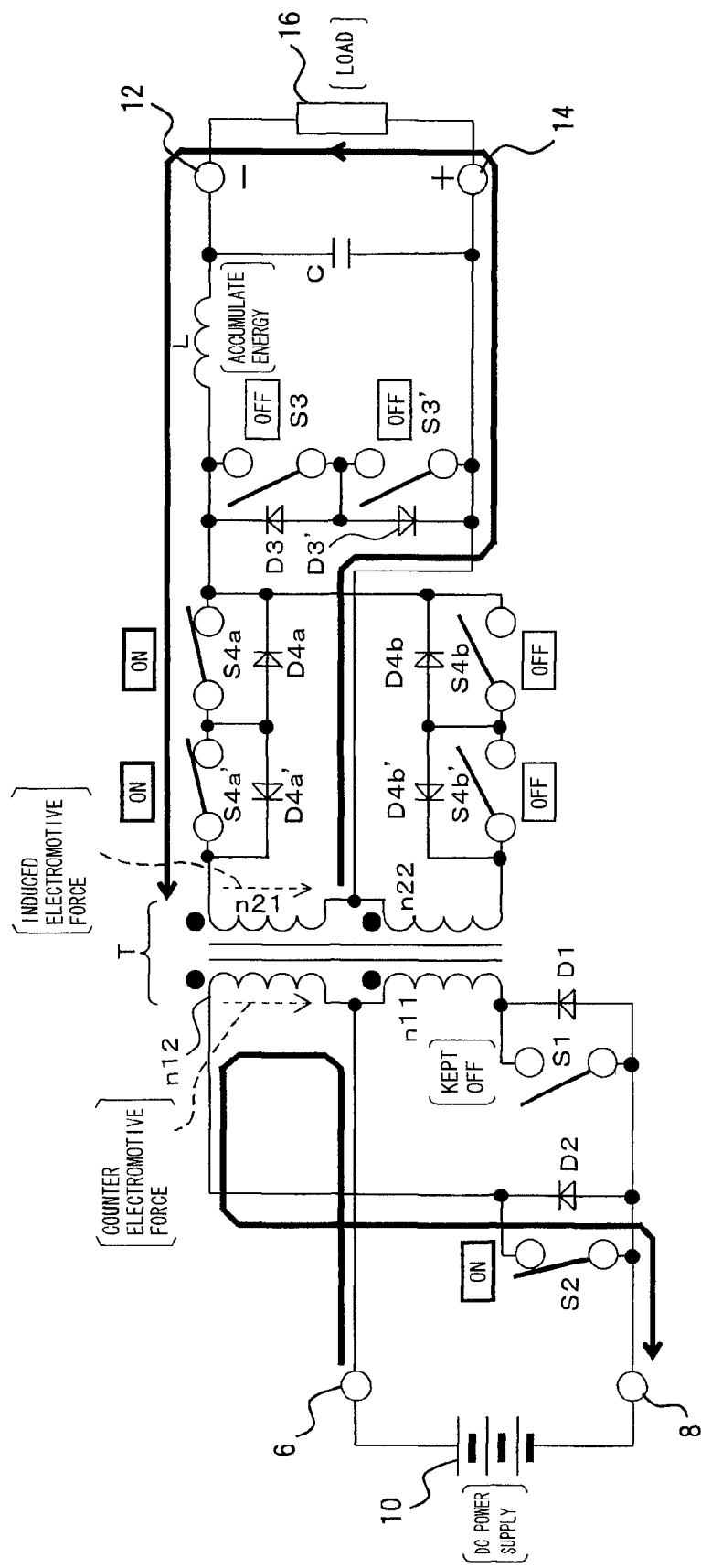
FIGS. 11A to 11D depict operations that are carried out when negative power is output.
Figure 11B:
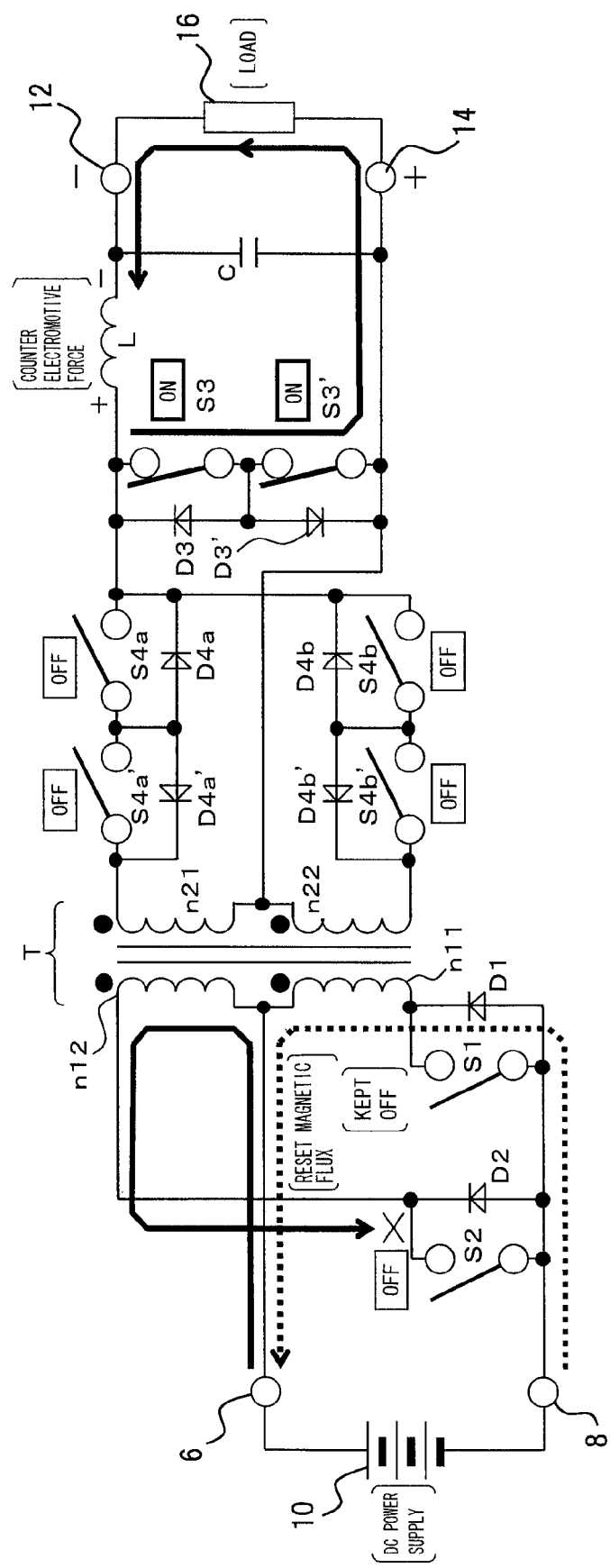
Figure 11C:
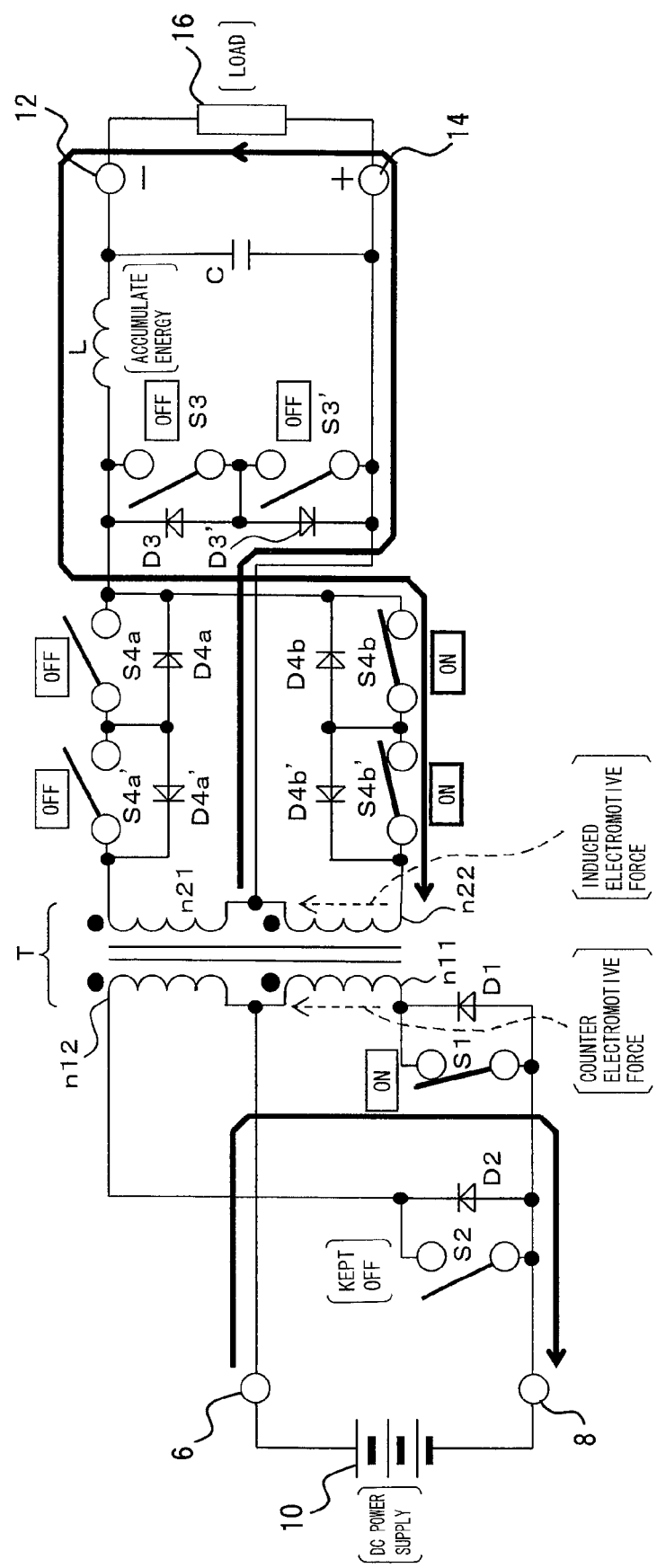
Figure 11D:
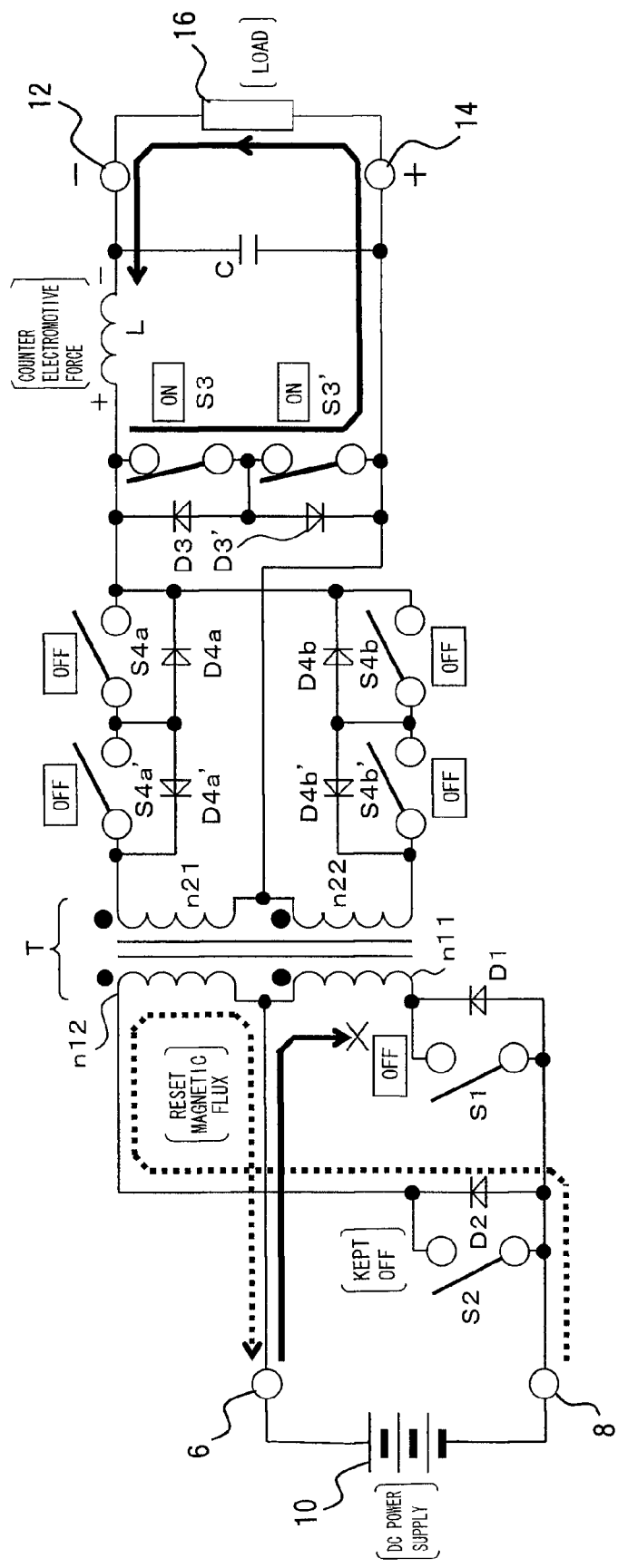

FIGS. 11A to 11D depict operations that are carried out when a negative voltage is output. FIG. 11A depicts an operation that is carried out when the switches S2, S4*a*, and S4*a*' switch on and the other switches switch off. FIG. 11C depicts an operation that is carried out when the switches S1, S4*b*, and S4*b*' switch on and the other switches switch off. FIGS. 11B and 11D depict operations that are carried out when the switches S3 and S3' switch on and the other switches switch off.

Comparing FIGS. 11A to 11D, with FIGS. 10A to 10D reveals that in FIGS. 10A to 10D, the switches that switch on in correspondence to switching on of the switches S1 and S2 are a set of the switches S4*a* and S4*a*' and a set of the switches S4*b* and S4*b*', respectively, but in FIGS. 11A to 11D, the same are the set of the switches S4*b* and S4*b*' and the set of the switches S4*a* and S4*a*', respectively, which is reverse in switching combination to the case of FIGS. 10A to 10D. Hence the circuit of FIGS. 11A to 11D carries out a negative output operation, but is the same as the circuit of FIGS. 10A to 10D in the other operations. In the same manner as in the first embodiment, the switches S4*a*, S4*b* and S3 may be kept on when the negative output operation is carried out.

[Regenerating Operation]

In the second embodiment, an output operation is carried out in the case where power is consumed at the output side, while a regenerating operation is carried out in the case where power is supplied from the output side. Hence the bidirectional operation is possible. At the regenerating operation, actions by switches, etc., are the same as actions at the output operation, but power is supplied from the output side, so that the direction of current is reversed. This relation between both operations is clearly understood by comparing FIGS. 2A and 2B with FIGS. 4A and 4B, and FIGS. 3A and 3B with FIGS. 5A and 5B of the first embodiment. Drawings and detailed descriptions of the second embodiment are therefore omitted.

[Operation as DC/AC Inverter]

Figure 12:
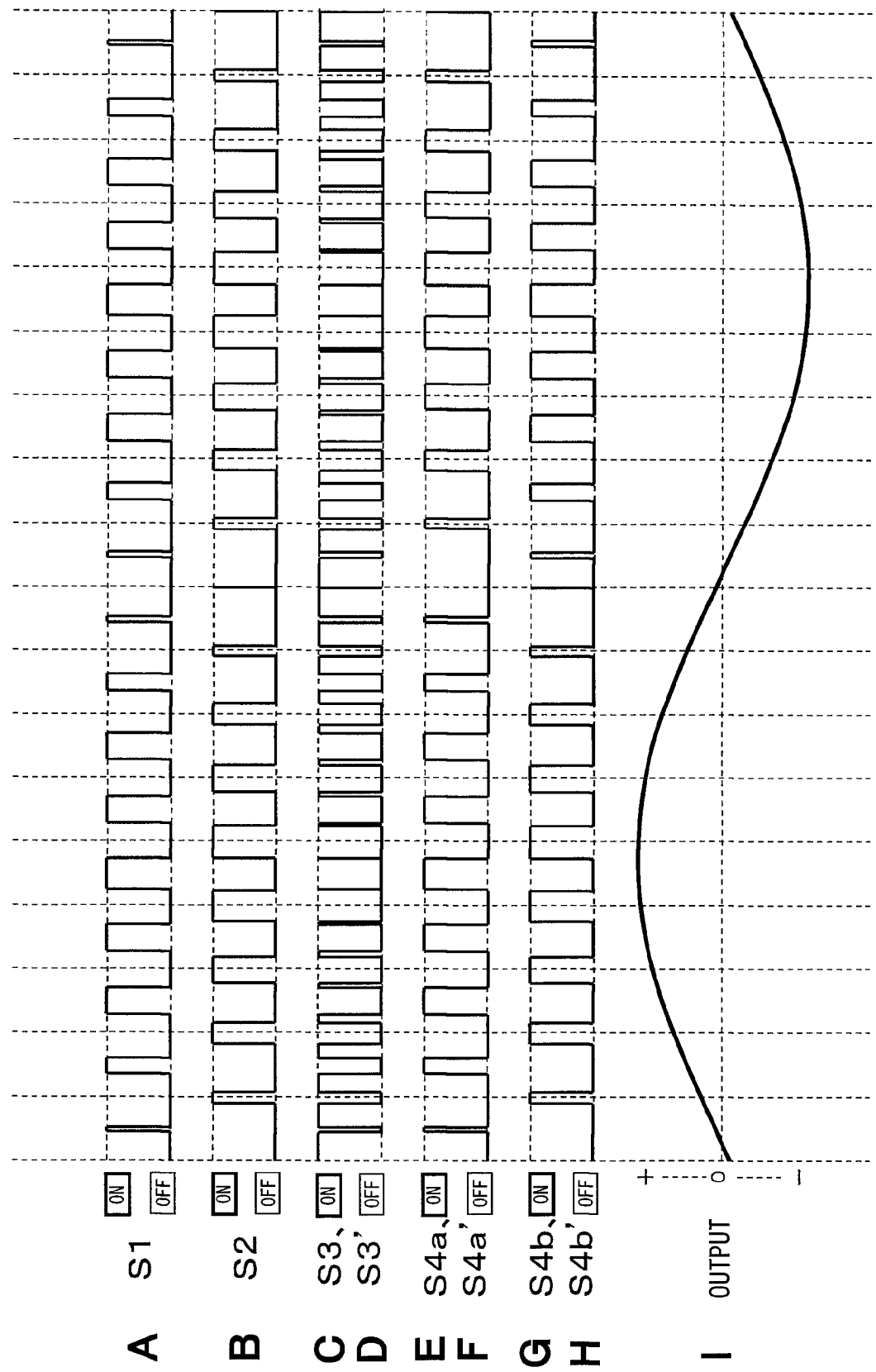
FIG. 12 depicts a DC/AC inverter operation.

The power conversion apparatus 2 of FIG. 9 is able to operate also as a DC/AC inverter, of which the operation is depicted in FIG. 12.

FIG. 12 indicates that an output voltage is changed by sequentially changing on/off setting of switches and duty ratios at switching actions in correspondence to instantaneous values of a desired output voltage, to achieve a desired waveform, i.e., AC output.

In a period of the first half of an output waveform, a positive voltage is output. In this period, the switches S4*a* and S4*a*' are on when the switch S1 is on, and S4*b* and S4*b*' are on when the switch S2 is on. In a period of the latter half of the output waveform, a negative voltage is output. In this period, the switches S4*a* and S4*a*' are on when the switch S2 is on, and S4*b* and S4*b*' are on when the switch S1 is on.

The switches S3 and S3' are off when any one of the switches S4*a*, S4*a*', S4*b*, and S4*b*' is on, and are on when the switches S4*a*, S4*a*', S4*b*, and S4*b*' are all off.

Observing the voltage value of the output waveform reveals that at a part of the output waveform where the voltage absolute value is low, the duty ratios of the switches S4*a*, S4*a*', S4*b* and S4*b*' are close to 0% (the on-time is shorter than the off-time), while at a part of the same where the voltage absolute value is high, the duty ratios are close to 50% (the on-time is close to the off-time). In other words, the absolute value of an output voltage is determined by the duty ratios of the switches S4*a*, S4*a*', S4*b* and S4*b*', and the positive or negative of the output voltage is determined by with which of the switch S1 and the switch S2 a set of the switches S4*a* and S4*a*' and a set of the switches S4*b* and S4*b*' synchronize, respectively, in switching on and off.

In this manner, on/off setting of switches and duty ratios at switching actions are changed sequentially in correspondence to instantaneous values of a desired output voltage to achieve a desired waveform, i.e., AC output. This operation is the same as the output operation depicted in FIG. 6 of the first embodiment.

Comparing the full-wave rectification type with the half-wave rectification type reveals that there is a difference in the use efficiency of the isolation transformer between both. In the half-wave rectification type, the power conversion apparatus operates in one direction (half-wave) of drive of the isolation transformer while in the full-wave rectification type, the power conversion apparatus operates in both directions (full-wave) of drive of the isolation transformer. Thus, the full-wave rectification type offers an advantage of an improvement in the use efficiency of the isolation transformer. The full-wave rectification type, however, requires two secondary coils of the isolation transformer and the switches S4, S4*a*, S4*b*, etc., and switches S4', S4*a*', S4*b*', etc., twice as many as those of the half-wave rectification type.

Third Embodiment

While the first and second embodiments disclose the drive circuit on the primary side of the isolation transformer T as a push-pull type circuit, an third embodiment discloses the drive circuit on the primary side of the isolation transformer T as a half-bridge type circuit.

Figure 13A:
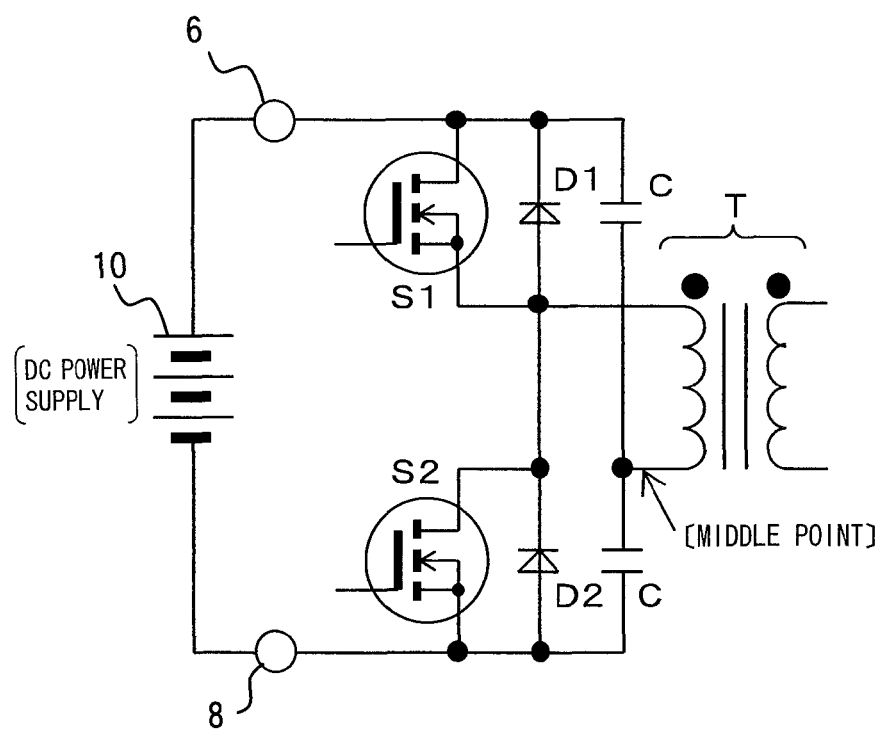
FIGS. 13A to 13E depict examples of an isolated power conversion apparatus according to a third embodiment.
Figure 13B:
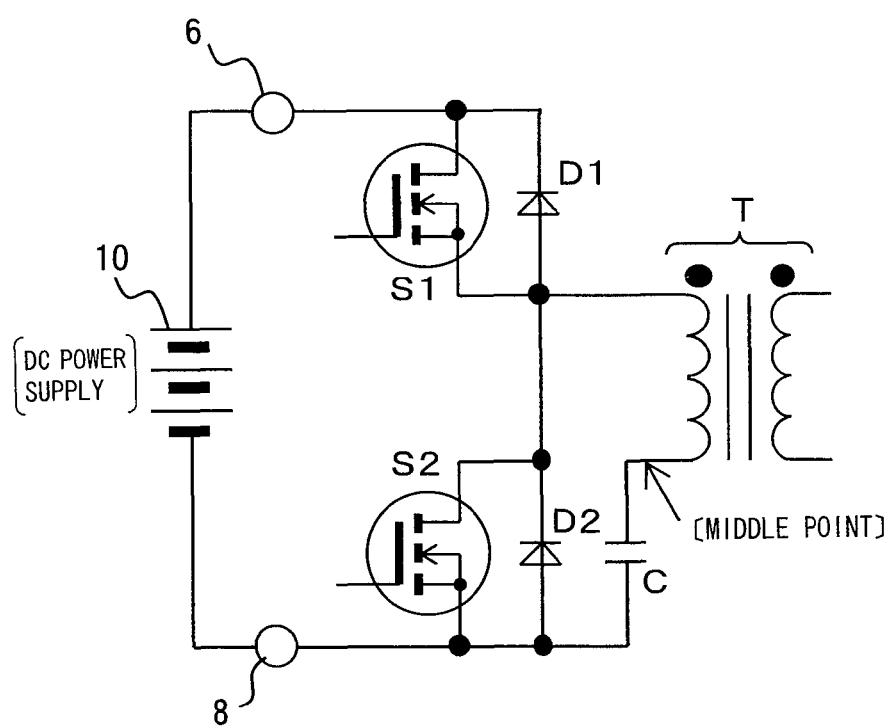
Figure 13C:
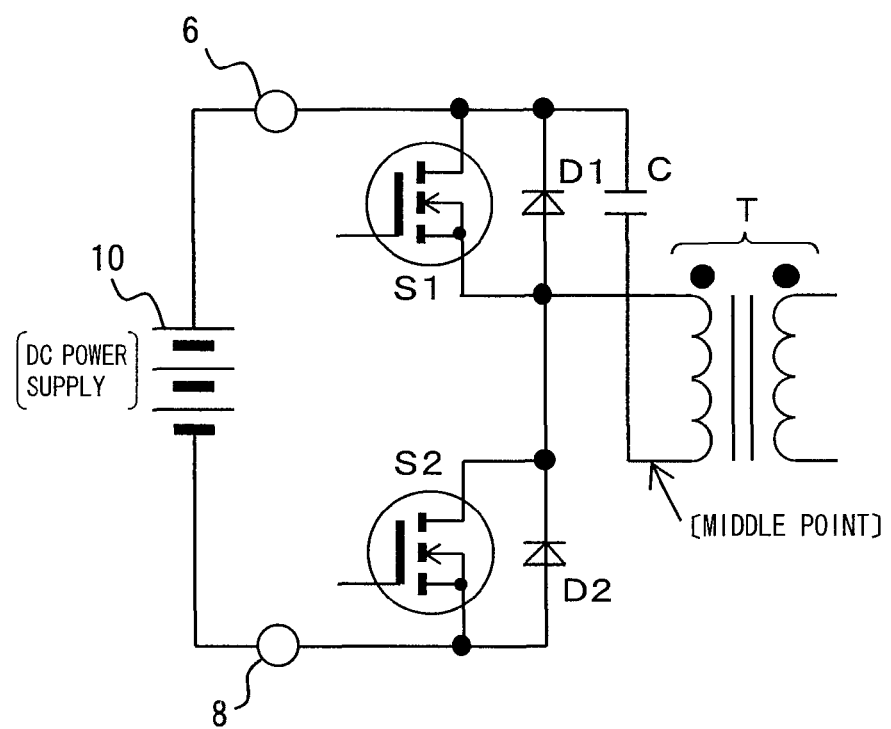
Figure 13D:
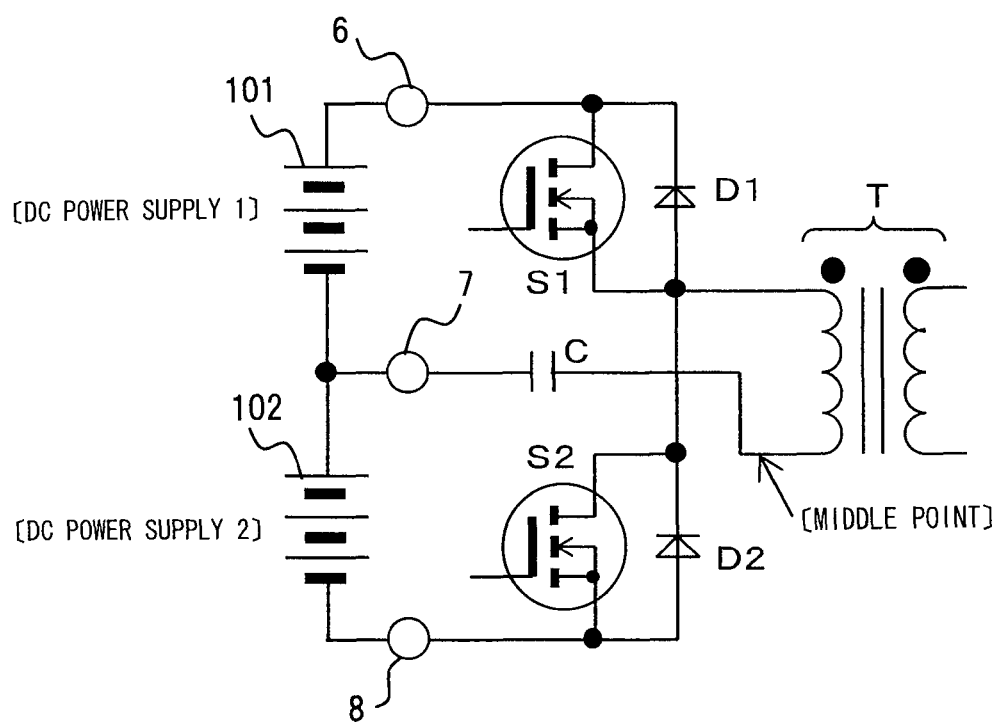
Figure 13E:
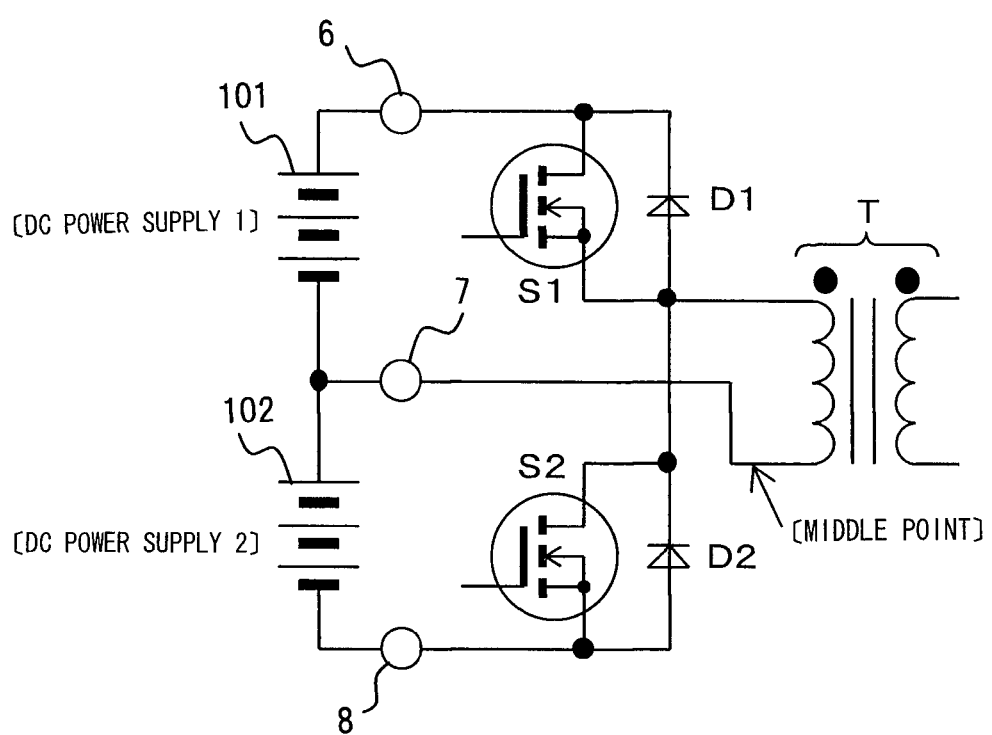

FIGS. 13A, 13B, 13C, 13D, and 13E depict configuration examples of the third embodiment. Comparing the half-bridge type circuit with the push-pull type circuit reveals that the half-bridge type circuit has an advantage of requiring only one primary coil of the isolation transformer T but needs a middle point to which one end of the primary coil of the isolation transformer T is connected, as depicted in FIGS. 13A to 13E. This middle point may be formed by the addition of the capacitor C, as depicted in FIGS. 13A to 13C, may be substituted by a middle point between two DC power supplies 101 and 102, as depicted in FIG. 13E, and may be substituted by the middle point between the DC power supplies 101 and 102, to which middle point the capacitor C is connected, as depicted in FIG. 13D. In the cases of FIGS. 13D and 13E, the middle point for the isolation transformer T is provided with an input terminal 7.

Figure 14A:
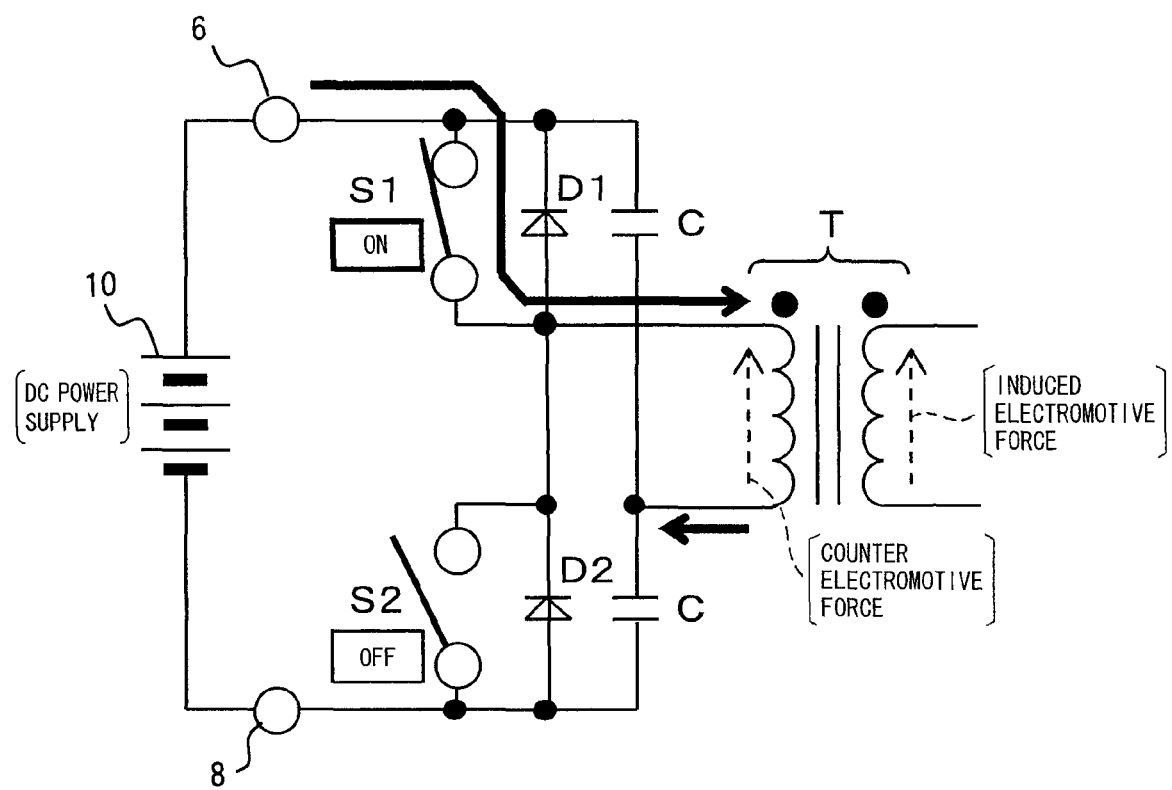
FIGS. 14A to 14D depict drive operations carried out on the primary side.
Figure 14B:
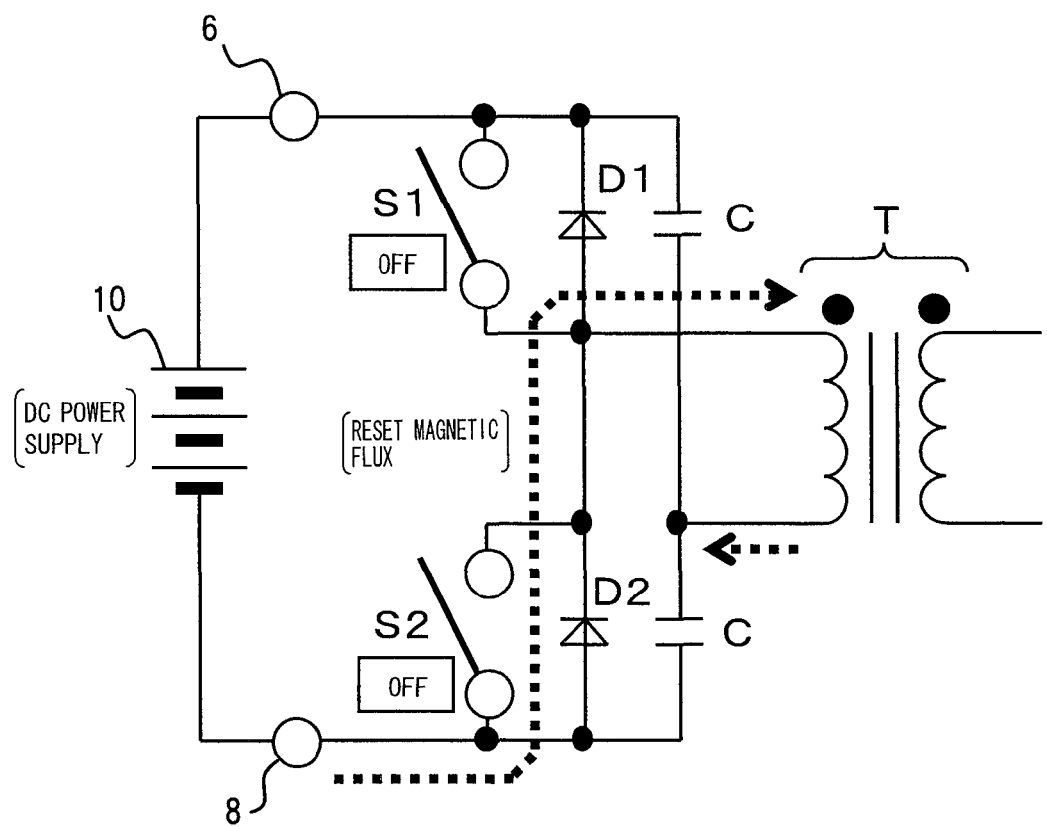
Figure 14C:
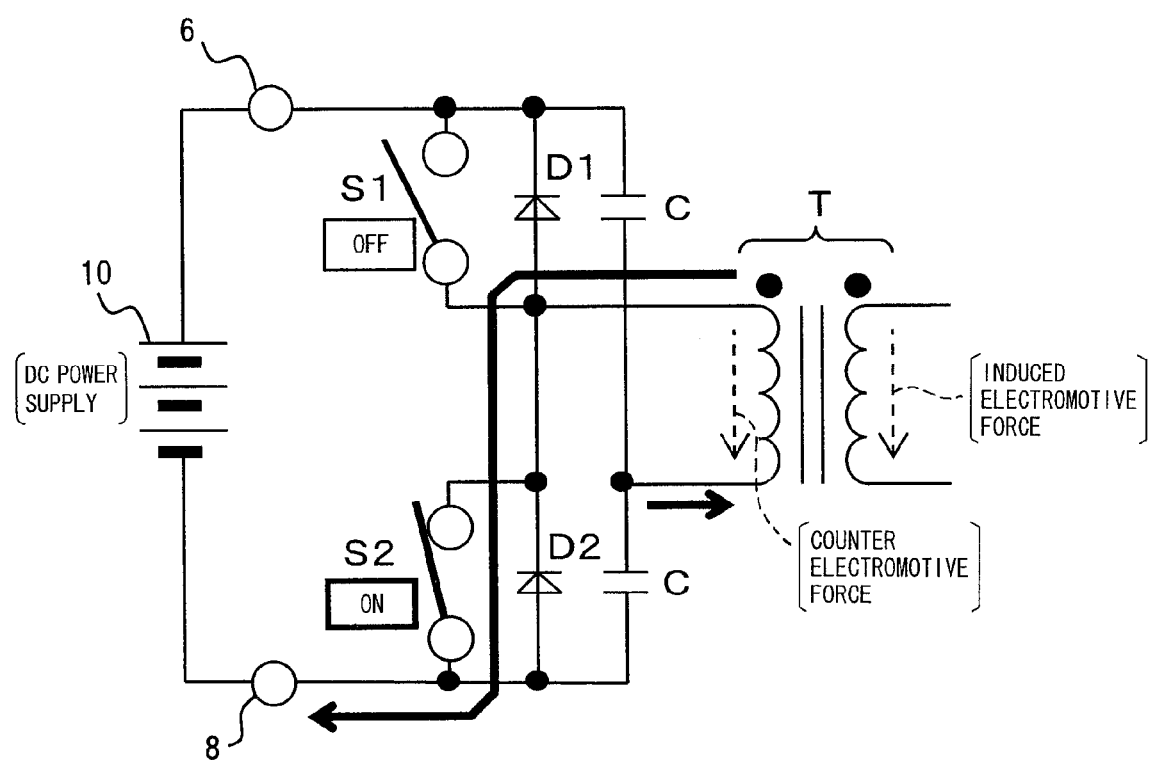
Figure 14D:
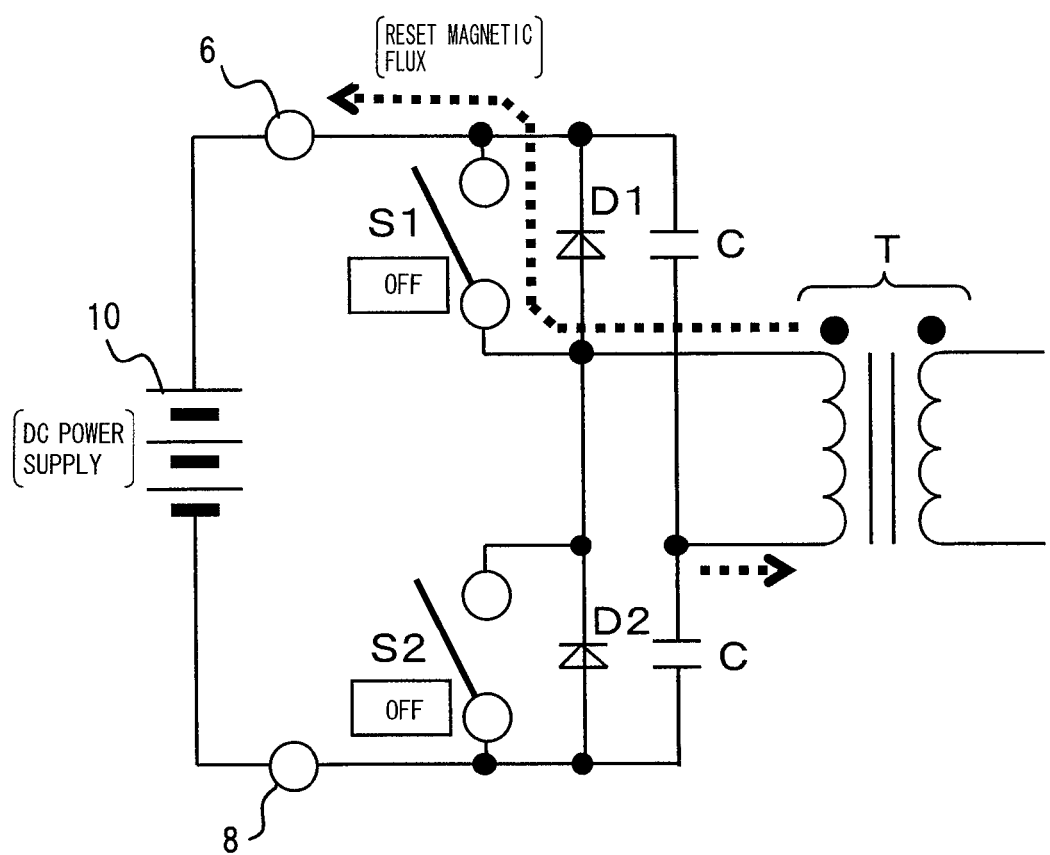

In the third embodiment, FIGS. 14A to 14D depict operations of the circuit of FIG. 13A. When the switch S1 switches on, a current starts flowing from the DC power supply 10 into the primary coil of the isolation transformer T, thus creating a counter electromotive force in a certain direction. As a result, an induced electromotive force is generated in the secondary coil of the isolation transformer T in the same direction of the counter electromotive force (FIG. 14A). When the switch S1 switches off, a current flows through the diode connected in parallel to the switch S2 into the primary coil of the isolation transformer T, where its magnetic flux is reset (FIG. 14B). Subsequently, when the switch S2 switches on, a reversely directed current starts flowing from the DC power supply 10 into the primary coil of the isolation transformer T, thus creating a counter electromotive force in the reverse direction. As a result, an induced electromotive force is generated in the secondary coil of the isolation transformer T in the same direction of the counter electromotive force created in the primary coil (FIG. 14C). When the switch S2 switches off, a current flows through the diode connected in parallel to the switch S1 into the primary coil of the isolation transformer T, where its magnetic flux is reset (FIG. 14D).

In the case where the middle point is formed by the capacitor C in half-bridge type circuits (FIGS. 13A to 13D), one end of the primary coil of the isolation transformer T is connected to the capacitor C, so that no direct current flows through the isolation transformer T. This gives the circuit a feature that the isolation transformer T never becomes magnetically saturated. It is possible in such a case that only the operations depicted in FIGS. 14A and 14C are repeated alternately with the duty ratio at each operation determined to be 50%. Even if the duty ratios of the switches S1 and S2 are not completely identical, a potential at a point at which one end of the primary coil of the isolation transformer T is connected to the capacitor C is automatically adjusted. This offers an advantage of realization of an operation that prevents magnetic saturation of the isolation transformer T.

The case of using the middle point between two DC power supplies 101 and 102, as depicted in FIG. 13E, are applicable to both half-wave rectification type and full-wave rectification type. The case of forming the middle point by the capacitor C (FIGS. 13A to 13D) is not applicable to the half-wave rectification type as depicted in the first embodiment, but is applicable to the full-wave rectification type as depicted in the second embodiment. This is because that in the case where direct current is output in the half-wave rectification type, a primary current at the isolation transformer T becomes biased to one of positive polarity and negative polarity, charging the capacitor C in one direction, thereby makes normal operation impossible. Except this restrictive case, every embodiment allows the primary drive circuit to be combined with an arbitrary circuit or operation on the secondary side of the isolation transformer T.

Fourth Embodiment

A fourth embodiment discloses a full-bridge type circuit as another configuration example of the drive circuit on the primary side of the isolation transformer T.

Figure 15:
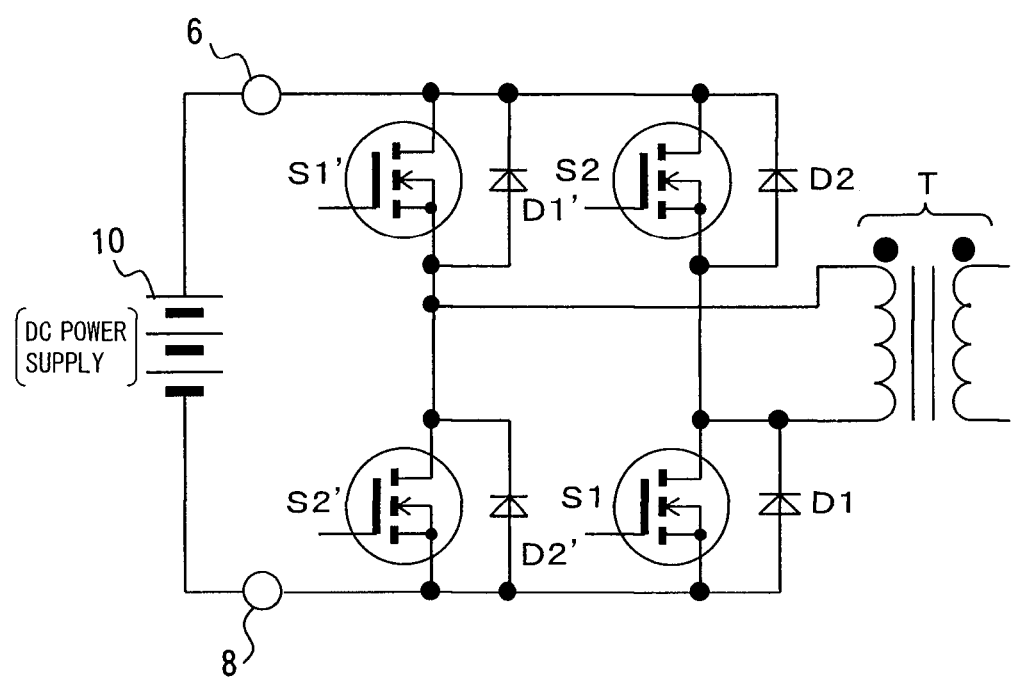
FIG. 15 depicts an example of an isolated power conversion apparatus according to a fourth embodiment.

FIG. 15 depicts a configuration example of the fourth embodiment. Comparing this full-bridge type circuit with the push-pull type circuit reveals that the full-bridge type circuit offers an advantage of requiring only one primary coil of the isolation transformer T, and of requiring only as much as a voltage from the DC power supply 10 for a withstand voltage to the switches S1, S1', S2, and S2' (the push-pull type circuit needs a withstand voltage twice as large as the voltage from the DC power supply 10) while requiring additional two switching elements.

Figure 16C:
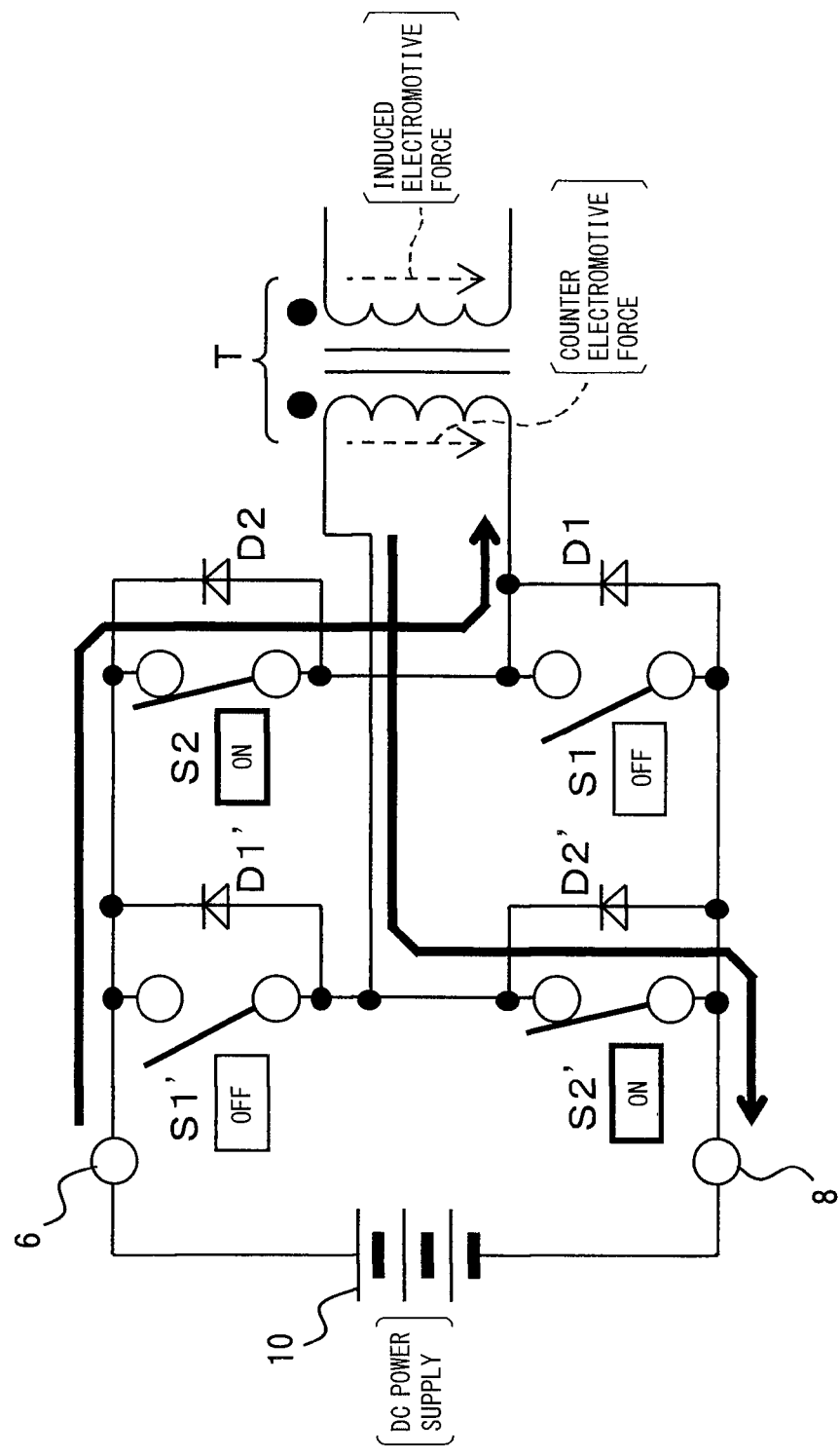
Figure 16D:
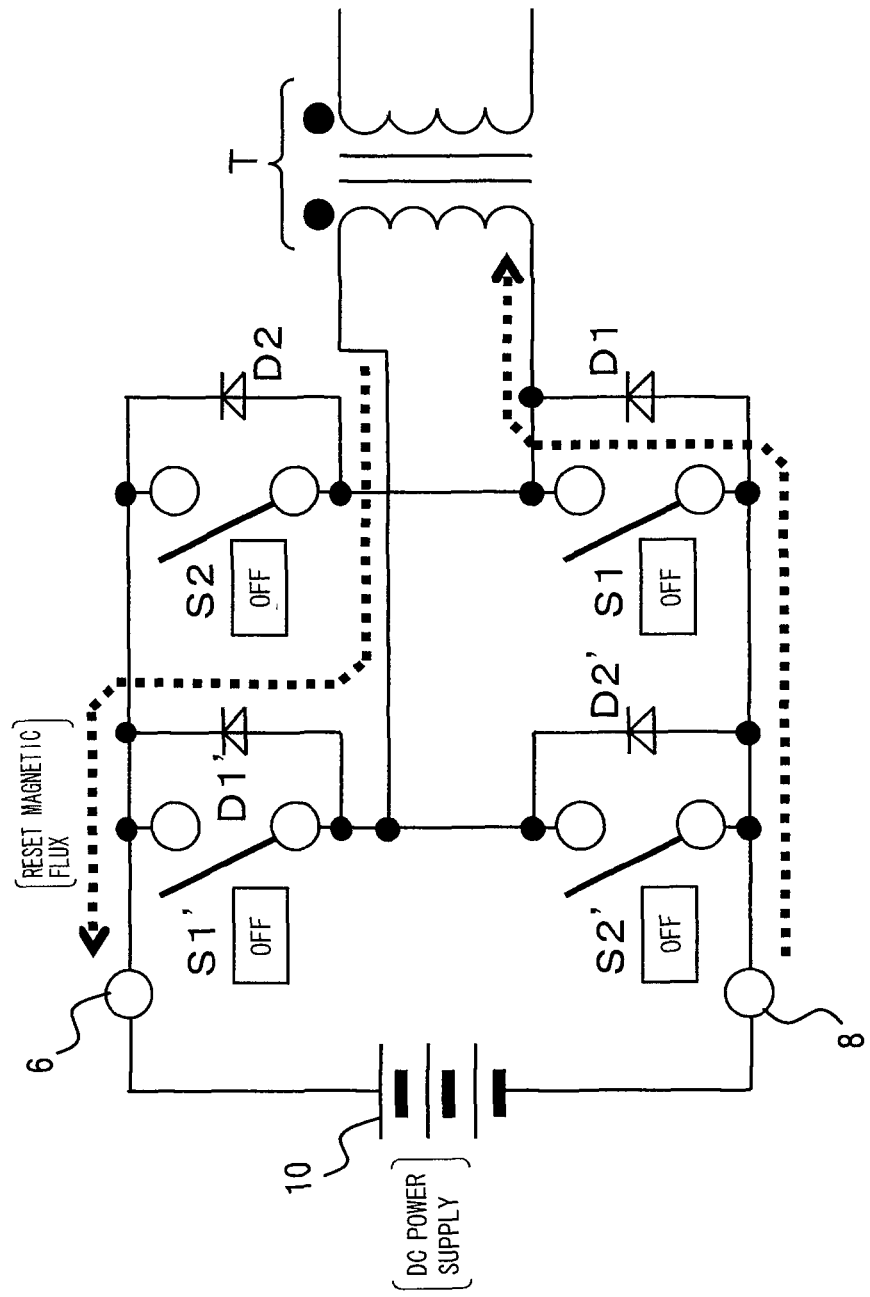

Operations of the circuit of the fourth embodiment are depicted in FIGS. 16A to 16D. When the switches S1 and S1' switch on, a current starts flowing from the DC power supply 10 into the primary coil of the isolation transformer T, thus creating a counter electromotive force in a certain direction. As a result, an induced electromotive force is generated in the secondary coil of the isolation transformer T in the same direction of the counter electromotive force (FIG. 16A). When the switches S1 and S1' switch off, a current flows through the diodes connected in parallel to the switches S2 and S2' into the primary coil of the isolation transformer T, where its magnetic flux is reset (FIG. 16B). Subsequently, when the switches S2 and S2' switch on, a reversely directed current starts flowing from the DC power supply 10 into the primary coil of the isolation transformer T, thus creating a counter electromotive force in the reverse direction. As a result, an induced electromotive force is generated in the secondary coil of the isolation transformer T in the same direction of the counter electromotive force (FIG. 16C). When the switches S2 and S2' switch off, a current flows through the diodes connected in parallel to the switches S1 and S1' into the primary coil of the isolation transformer T, where its magnetic flux is reset (FIG. 16D).

The full-bridge type circuit may be combined with an arbitrary circuit or operation on the secondary side of the isolation transformer T. For example, in the case where the full-bridge type circuit is applied to the half-wave rectification type of the first embodiment, the operations of FIGS. 16A and 16B are repeated for positive output or positive power regeneration, and the operations of FIGS. 16C and 16D are repeated for negative output or negative power regeneration. In the case where the full-bridge type circuit is applied to the full-wave rectification type of the second embodiment, the operations of FIGS. 16A to 16D are repeated in sequence.

The full-bridge type circuit improves the use efficiency of the primary coil of the isolation transformer T to offer the use efficiency higher than that of the push-pull type. This allows a reduction in an occupation rate of the primary coil, thus enabling miniaturization of the isolation transformer T.

The push-pull type circuit, half-bridge type circuit, and full-bridge type circuit have been described as examples of the drive circuit on the primary side of the isolation transformer T according to the present invention. Any type of a circuit may be applicable if the circuit can be driven in both forward and backward directions on the primary side of the isolation transformer T. The primary drive circuit is, therefore, not limited to the above circuits described so far.

Fifth Embodiment

Figure 17:
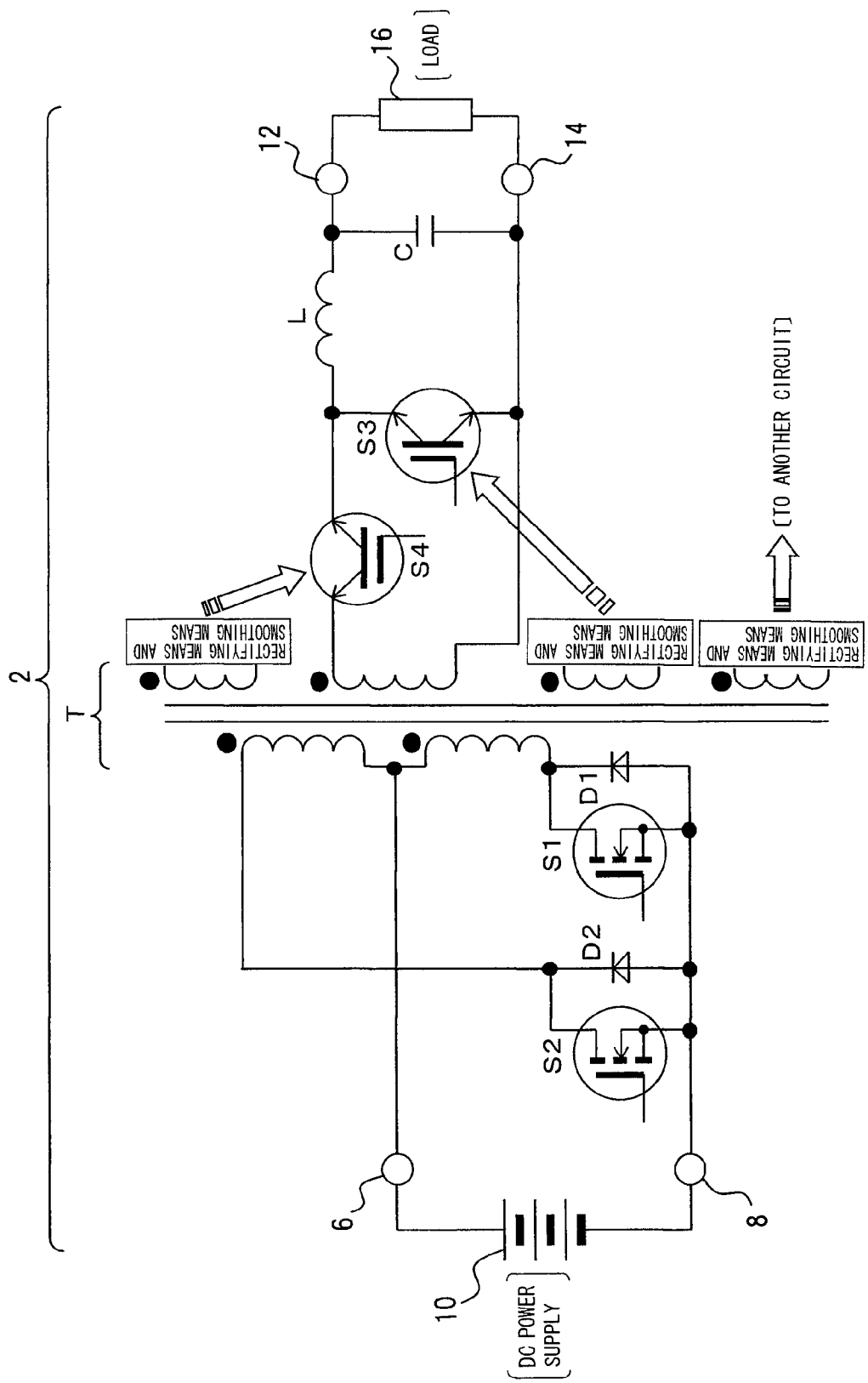
FIG. 17 depicts an example of an isolated power conversion apparatus according to a fifth embodiment.

A fifth embodiment discloses modifications of the first embodiment. FIG. 17 depicts an example of the fifth embodiment. Modifications (A) to (C) below may be adopted independently, so that no restriction is placed on combinations of the modifications.

(A) Application of Bidirectional Switching Elements

The number of switching elements can be reduced by replacing the switching elements on the secondary side of the isolation transformer T with bidirectional switching elements. (Other modifications of a sixth embodiment to be described later may be used as the bidirectional switching elements.)

(B) Addition of an Isolated DC Source

Separate coils are added to the secondary side of the isolation transformer T, and are each provided with a rectifying means and a smoothing means to offer an isolated DC source. As depicted in FIG. 17, these DC sources are used as a drive circuit for driving the switching elements on the secondary side of the isolation transformer T or may be used as another component, such as a control circuit.

(C) Waveforms of Control Signals

With regard to the configuration of the fifth embodiment of FIG. 17, the waveforms of control signals and modifications thereof are depicted in FIGS. 18 to 21. FIG. 22 depicts an example of a control circuit that generates control signals depicted in FIG. 21.

The modification (A) will be described based on FIG. 17 as comparative reference is made to FIG. 1 of the first embodiment.

According to the circuit of FIG. 1, two switching elements, i.e., the opposed switches S3 and S3' connected in series with each other are connected in parallel to the series circuit consisting of the inductor L and the load 16. Two switching elements, i.e., the opposed switches S4 and S4' connected in series with each other are connected between the series circuit consisting of the inductor L and the load 16 and the secondary coil of the isolation transformer T. FIGS. 2A to 8 depict instances where each of the set of switches S3 and S3' and of the set of switches S4 and S4' switches on and off independently. However, it is stated in the description of the first embodiment that the set of switches S3 and S3' and the set of switches S4 and S4' can be switched on and off simultaneously on a set-by-set basis.

In the case where the switches S3 and S3' of FIG. 1 are switched on and off simultaneously, if these two switching elements are replaced with one bidirectional switching element, the replacing switching element is provided as a switch S3 as depicted in FIG. 17. In the case where the switches S4 and S4' of FIG. 1 are switched on and off simultaneously, if these two switching elements are replaced with one bidirectional switching element, the replacing switching element is provided as a switch S4 as depicted in FIG. 17. It is unnecessary to replace both sets of switches simultaneously, and one of them may be replaced.

In the case where two switching elements adjacent and opposed to each other can be switched on and off simultaneously, therefore, the switching elements may be replaced with one bidirectional switching element. Such a configuration is applicable to all of the embodiments of the present invention.

The modification (C) will then be described, in which description the modification (B) will also be mentioned.

FIG. 22 depicts an example of the control circuit 18. This circuit of FIG. 22 is equivalent to the circuit of FIG. 8 of the first embodiment. Because the replacement by the bidirectional switching element is carried out according to the modification (A), control signal waveforms for the switches S3 and S4 are slightly different from the waveforms for the same depicted in FIG. 6.

An output voltage from the rectifying means and smoothing means of the DC source of the modification (B) turns out to be a voltage proportional to the duty ratio of the switch S1 or S2. In the case of the control signals of FIG. 18, the output voltage from the rectifying means and smoothing means takes a voltage waveform equivalent to a DC source output depicted in FIG. 18. Hence the output voltage fluctuates at a frequency lower than a switching frequency. Determining a time constant of the smoothing means to be sufficiently long avoids this voltage fluctuation, which case, however, leads to an increase in the size of the smoothing means.

Figure 19:
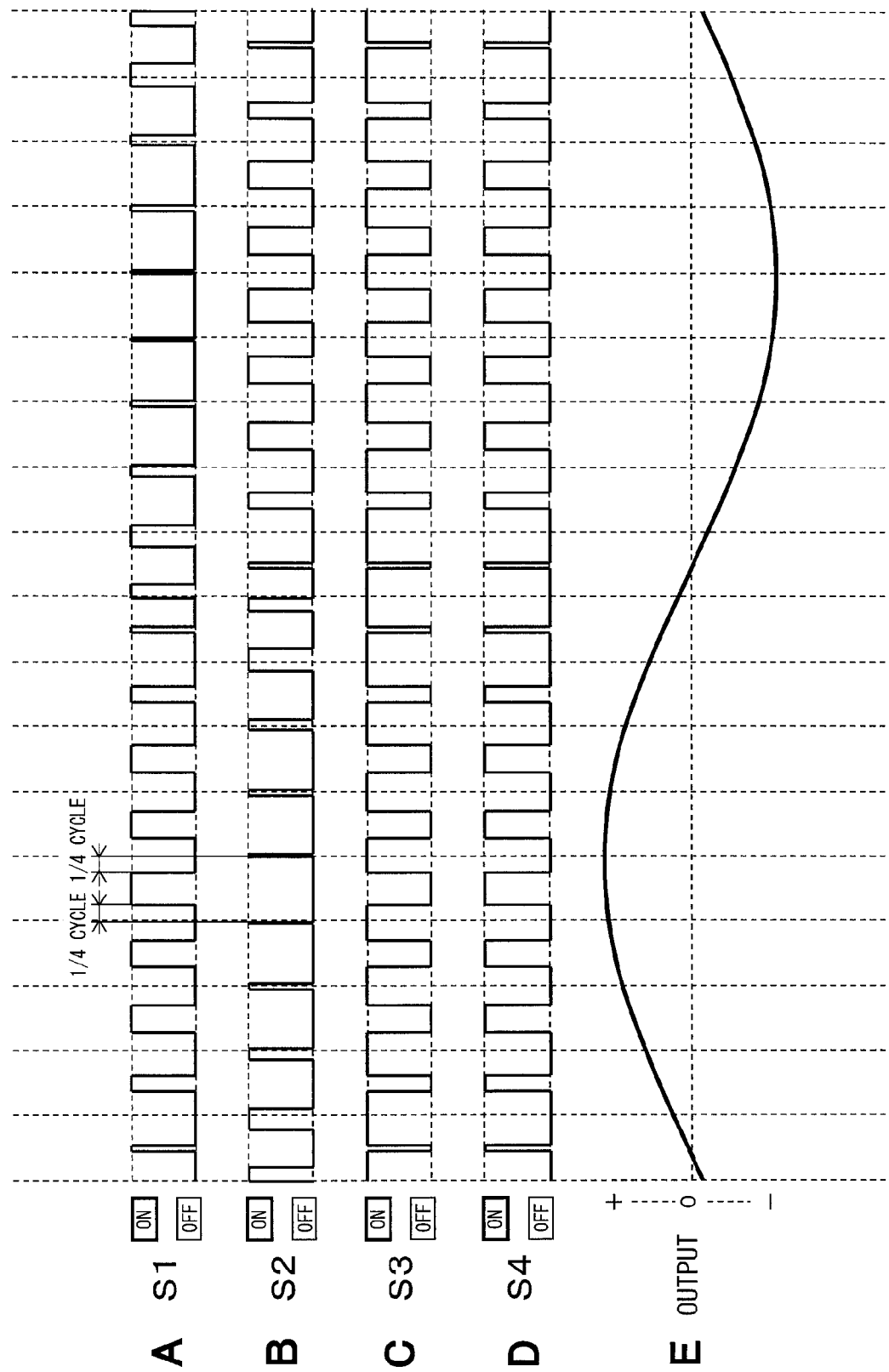
FIG. 19 depicts a drive modification 1.

For this reason, to avoid the voltage fluctuation, continuous drive is carried out so that the sum of the duty ratio of the switch S1 and the duty ratio of the switch S2 is kept constant. For example, in the case where the duty ratio of the switch S1 changes from 0% to 50% in a section during which output is positive, switching on the switch S2 before and after switching on of the switch S1 across each interval of ¼ cycle causes the duty ratio of the switch S2 to change from 50% to 0%. In the case where the duty ratio of the switch S2 changes from 0% to 50% in a section during which output is negative, switching on the switch S1 before and after switching on of the switch S2 across each interval of ¼ cycle causes the duty ratio of the switch S1 to change from 50% to 0%. By this method, the sum of the duty ratio of the switch S1 and the duty ratio of the switch S2 is kept constant (50% in this example) (FIG. 19). Hence an output voltage from the rectifying means and smoothing means of the DC source of the modification (B) does not fluctuate, thus acquiring a constant DC voltage.

Figure 18:
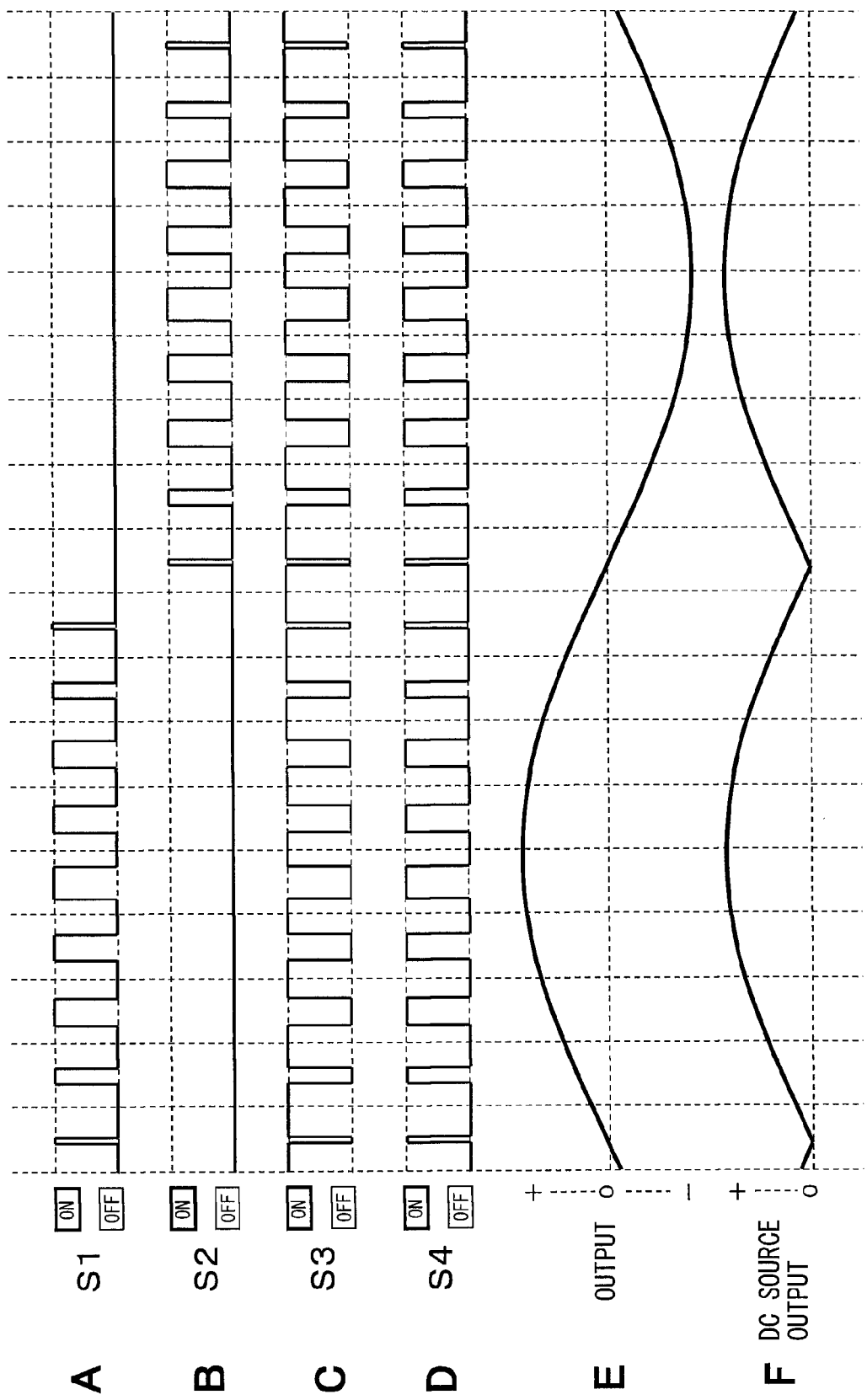
FIG. 18 depicts a DC/AC inverter operation.
Figure 20:
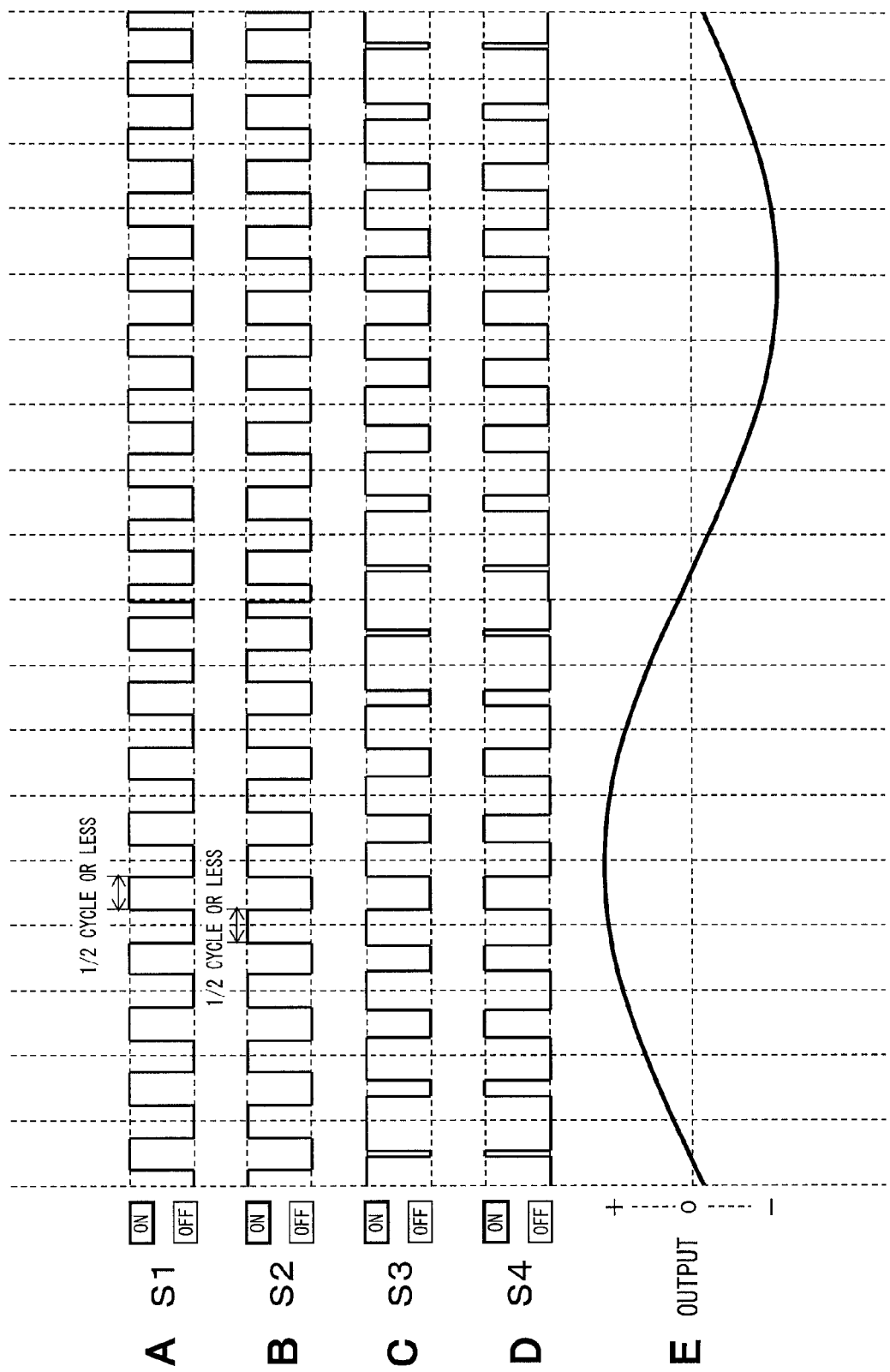
FIG. 20 depicts a drive modification 2.
Figure 21:
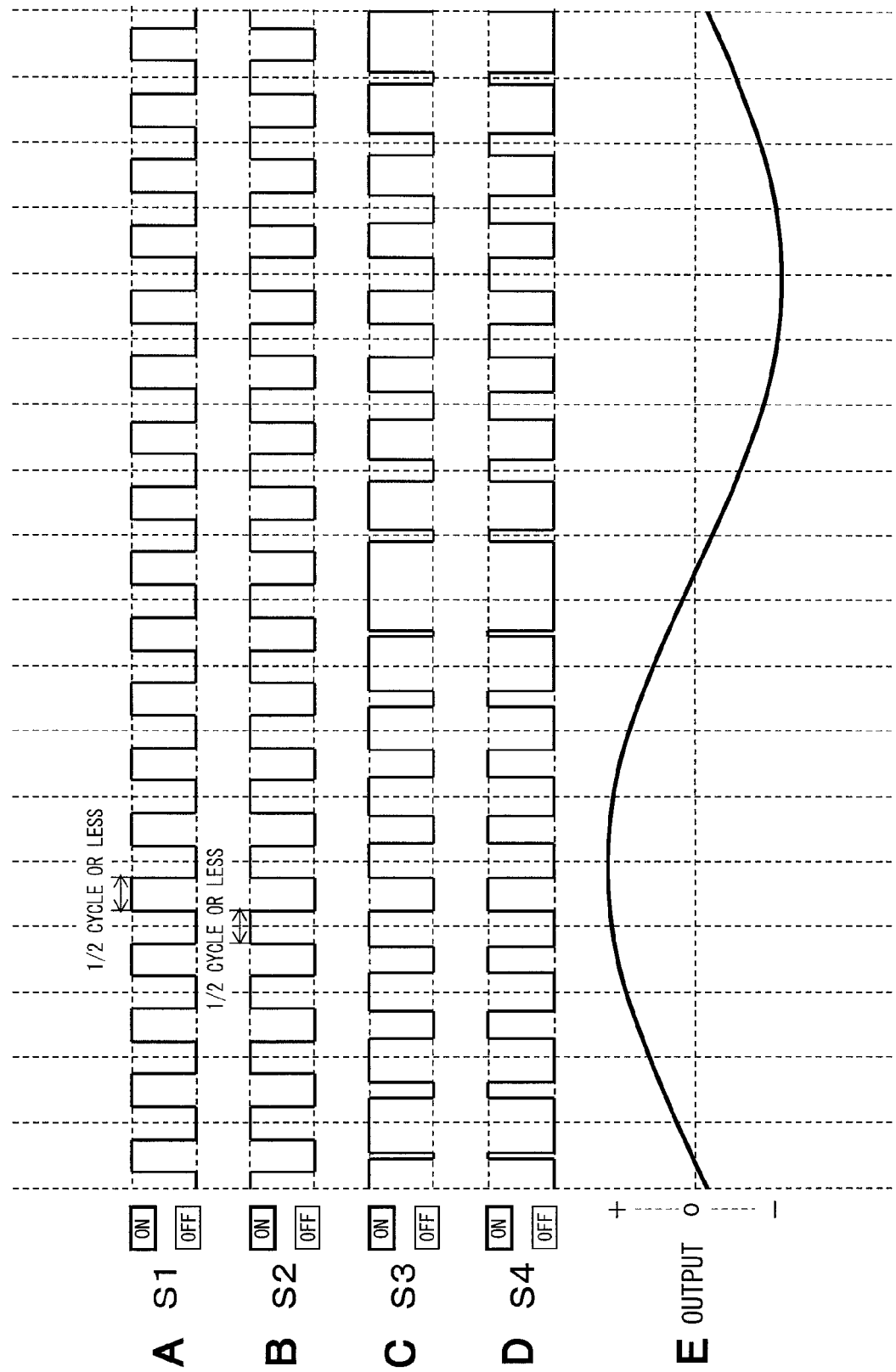
FIG. 21 depicts a drive modification 3.
Figure 22:
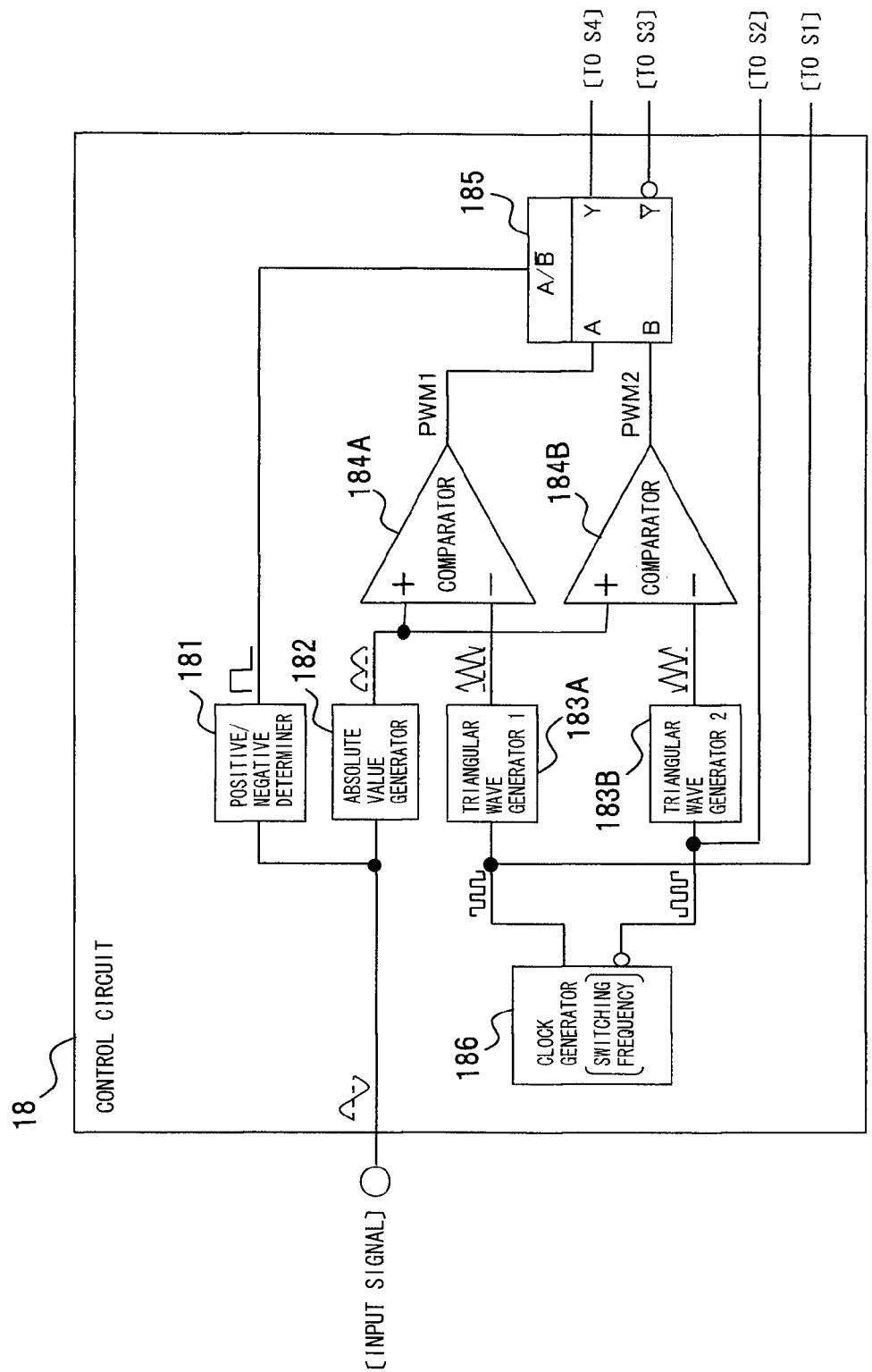
FIG. 22 depicts an example of a control circuit used in the drive modification 3.

While the duty ratios of the switches S1 and S2 are changed in connection with the duty ratio of the switch S4 in the examples of FIGS. 18 and 19, the switches S1 and S2 may be switched on and off by turns to each other as their duty ratios are kept constant, as depicted in FIGS. 20 and 21. In such a case, when a positive voltage is to be output, the switch S4 switches on when the switch S1 is on, and when a negative voltage is to be output, the switch S4 switches on when the switch S2 is on.

twice as large as the output voltage of FIG. 19 at maximum.

The appropriateness of combinations of these driving methods and modifications and circuit types on the primary side and secondary side of the isolation transformer T is indicated in a table 1.

TABLE 1

| | | CONFIGURATION ON SECONDARY SIDE | | | | | | | |
|---|---|---|---|---|---|---|---|---|---|
| | | HALF-WAVE RECTIFICATION TYPE | | | | FULL-WAVE RECTIFICATION TYPE | | | |
| | | CONFIGURATION ON PRIMARY SIDE | | | | | | | |
| | | PUSH-PULL | HALF-BRIDGE (CAPACITOR) | HALF-BRIDGE (DIRECTLY CONNECTED FIG. 13E) | FULL-BRIDGE (FIG. 15) | PUSH-PULL | HALF-BRIDGE (CAPACITOR) | HALF-BRIDGE (DIRECTLY CONNECTED FIG. 13E) | FULL-BRIDGE (FIG. 15) |
| PRIMARY-SIDE DRIVE (S1, S2) | ONE IS DRIVEN IN CONNECTION WITH SWITCH S4, AND ANOTHER IS KEPT OFF (FIGS. 6 AND 18) | O | X | O | O | X | X | X | X  —*2 |
| | BOTH ARE DRIVEN BY TURNS IN CONNECTION WITH SWITCH S4 (FIG. 12) | O | X | O | O | O | O | O | O |
| | ONE IS DRIVEN IN CONNECTION WITH SWITCH S4, AND ANOTHER IS DRIVEN SO THAT SUM OF DUTY RATIOS OF BOTH BECOMES CONSTANT (FIG. 19) | O | X | O | O | X | X | X | X  —*3 |
| | BOTH ARE DRIVEN BY TURNS IN CONSTANT DUTY RATIO (50% OR LESS) (FIGS. 20 AND 21) | O | X  *1 | O | O | O | O | O | O |

In the example of FIG. 20, the on/off polarity of the switch S1 and that of the switch S2 are reversed depending on which of a positive voltage and a negative voltage is to be output. In FIG. 21, the on/off cycles of the switches S1 and S2 are kept as they are, but which of the switch S1 and the switch S2 is to be synchronized with the switch S4 in timing of switching on is selected depending on which of a positive voltage and a negative voltage is to be output.

In the case where the circuit on the primary side of the isolation transformer T is the half-bridge type circuit in which a middle point is formed by the capacitor C, the switches S1 and S2 can be switched on and off by turns to each other even if the duty ratio of each of the switches S1 and S2 is not completely 50%. In the case of the push-pull type circuit or full-bridge type circuit, however, carrying out the magnetic flux resetting operation across an interval in which both switches S1 and S2 switch off is needed to avoid the magnetic saturation of the isolation transformer T due to accumulated errors of duty ratios. In the examples of FIGS. 20 and 21, an output voltage from the rectifying means and smoothing means of the DC source of the modification (B) does not fluctuate, thus acquiring a constant DC voltage In the table 1, "o" indicates that a combination is appropriate, while "x" indicates that a combination is inappropriate. In a "primary-side drive" space in the table 1, "switch S4" is written as a general term for "switches S4, S4', S4a, S4a', etc.".

In the case of the full-wave rectification type, an integrated value of a forward current and that of a reverse current are balanced with each other on the primary side of the isolation transformer T. In the case of the half-wave rectification type, in contrast, an integrated value of a forward current and that of a reverse current are usually unbalanced with each other on the primary side of the isolation transformer T, so that the half-bridge type circuit with the middle point formed by the capacitor C is not applicable (*1 in the table 1). In the case of the full-wave rectification type, the switches S1 and S2 switch on and off by turns to each other, because of which one of them cannot be kept off (*2 in the table 1). In the case of FIG. 19 where the circuit is driven so that the sum of the duty ratios of the switches S1 and S2 becomes constant, one switch's duty ratio approaching 50% leads to the other switch's duty ratio falling. In the case where the absolute value of an output voltage is large in the full-wave rectification type, duty ratios of both switches must approach 50%. The drive modification of FIG. 19, therefore, is not applicable to the full-wave rectification type (*3 in the table 1).

The control circuit 18 of FIG. 22 is an example of a configuration for generating control signals for the switches S1, S2, S3, and S4 (FIG. 21). As depicted in FIG. 22, this control circuit 18 includes the positive/negative determiner 181, the absolute value generator 182, a triangular wave generator 183A, a triangular wave generator 183B, comparators 184A and 184B, the selector 185, and a clock generator 186. In FIG. 22, the same component units as depicted in FIG. 8 are denoted by the same reference numerals.

Out of an input signal, the positive/negative determiner 181 generates a signal indicative of the positive or negative of the input signal. The absolute value generator 182 generates an absolute value signal out of the input signal. The clock generator 186 generates a clock signal for a switching frequency (=control signal S1) and an inverted signal to the clock signal (=control signal S2). The triangular wave generator 183A generates a triangular wave signal (triangular wave 1) using the clock signal. The triangular wave generator 183B generates a triangular wave signal (triangular wave 2) using the inverted signal (reverse phase signal) to the clock signal. The comparator 184A compares the triangular wave 1 with the absolute value signal, and the comparator 184B compares the triangular wave 2 with the absolute value signal. Specifically, the size of the absolute value is compared with the size of the triangular wave 1 and of the triangular wave 2, so that the comparator 184A generates a PWM1 signal while the comparator 184B generates a PWM2 signal. The selector 185 selects the PWM1 signal or PWM2 signal in signal switchover based on an output signal from the positive/negative determiner 181, i.e., the signal indicative of the positive or negative of the input signal, thus generating the control signals S3 and S4. Such a configuration and a method of generating switching control signals are not exclusively adopted. It is possible to generate similar control signals by using other methods and means, such as a digital circuit and software.

In each of the above modifications, the absolute value of an output voltage is determined by the duty ratio of the switch S4. The negative or positive polarity of the output voltage is determined by with which of the switch S1 and the switch S2, the switch S4 synchronizes in timing of switching on.

Sixth Embodiment

A sixth embodiment discloses configuration examples of bidirectional switches. FIGS. 23A to 23G depict configuration examples of bidirectional switches applicable to the switches S4, S4', S3, and S3' according to the sixth embodiment. These configuration examples are equivalent to the modification (A).

FIGS. 23 A to 23G depict examples of the switch S4 (switch S4'), and the same modifications as these examples can be used as modifications of the switch S3 (switch S3'). Any one of these modifications may be selected as a modification of the switch S4 (switch S4') and the switch S3 (switch S3').

While MOS-FETs are depicted as switching elements in FIGS. 23A to 23E, the MOS-FETs may be replaced with other types of switching elements, such as J-FETs, bipolar transistors, and IGBTs. N-channel elements or NPN elements may be substituted by P-channel elements or PNP elements, and both types of elements may be used in a mixed form. In the case where a diode is connected in parallel to a switching element, the diode may be substituted by a diode built in the switching element (including a parasitic diode), in which case a mounting area and cost are reduced.

Figure 23A:
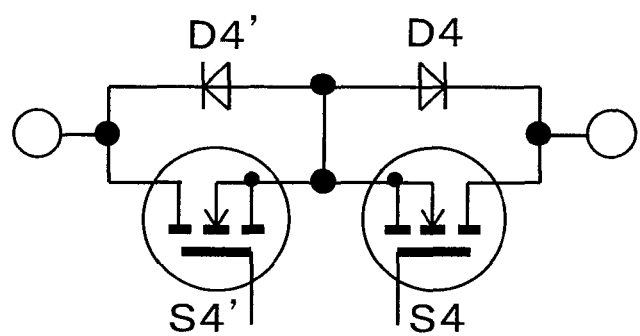
FIGS. 23A to 23G depict examples of bidirectional switches of an isolated power conversion apparatus according to a sixth embodiment.
Figure 23B:
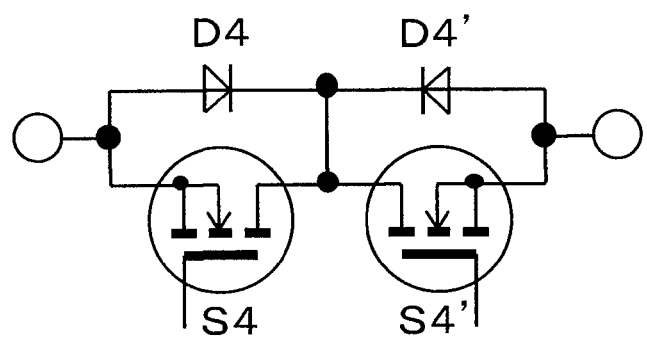

FIG. 23A depicts the same bidirectional switches as described in the first and second embodiments. In FIG. 23B, the arrangement order of the switches S4 and S4' is reversed.

In FIG. 23A, the case of switching on the switch S4' to cause a current to flow from the left to the right is assumed. In the switch S4', the current flows from the drain to the source, which current is a so-called forward current. Even if the switch S4 remains off, a current flows from the left to the right through the diode connected in parallel to the switch S4. However, switching on the switch S4 causes a current to flow through the switch S4 in the same direction, thereby reduces switching losses. In this case, the current flows from the source to the drain in the switch S4, which current is a so-called reverse current. In many cases, the electrical characteristics of the switching element do not include the details of reverse current. It is known, however, that the MOS-FET depicted in FIGS. 23A to 23E and J-FET allow current to flow in both directions when switched on. It is also known that the bipolar transistor and IGBT allow current to flow in both directions when switched on and that they have a low reverse withstand voltage. In this embodiment, the diode is connected in parallel to the switching element, so that a reverse voltage applied to the switching element is equivalent to a forward voltage of the diode. A low reverse withstand voltage, therefore, hardly constitutes a problem. According to the present invention, power can be supplied to the load 16, or regenerated power can be supplied from the output-side power supply to the DC power supply 10 on the primary side of the isolation transformer T, in which case the direction of current is reversed. In the case of sending a current flow through the switches S4 and S4', therefore, both switches are switched on so that the current flows in both directions.

Figure 23C:
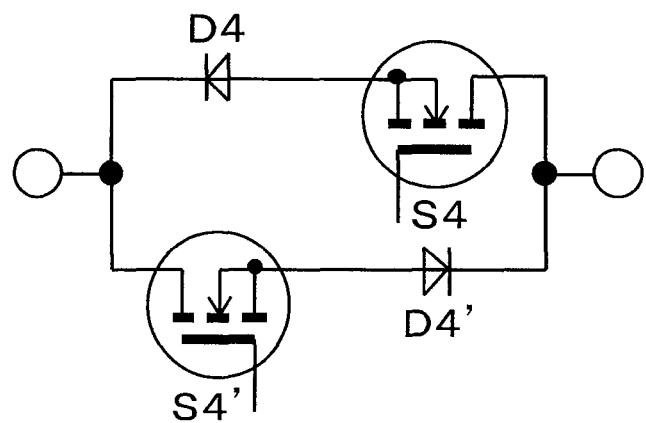
Figure 23D:
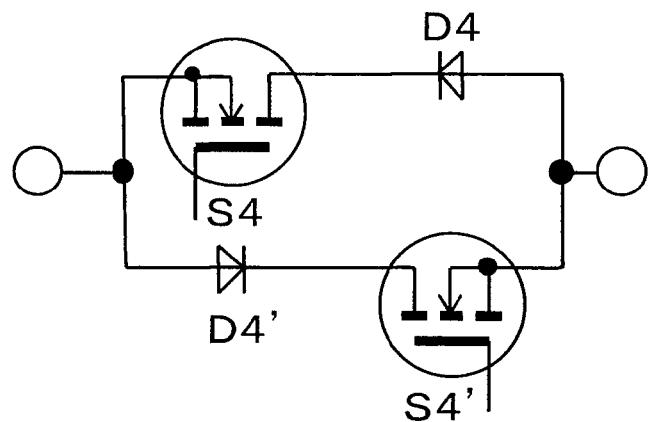

FIG. 23C depicts a modification of the bidirectional switch, and FIG. 23D depicts a modification in which the arrangement order of switches and diodes is reversed (the arrangement order of only one set of a switch and a diode may be reversed). In FIG. 23C, the case of switching on the switch S4' to cause a current to flow from the left to the right is assumed. In this case, the resistance of the switched on switch S4' and a forward voltage of the diode D4' connected in series to the switch S4' cause losses. According to the configuration of FIG. 23A, however, switching on the switch S4 together with the switch S4' reduces losses. Hence, in some cases, the modification of FIG. 23C causes greater losses than the modification of FIG. 23A does.

Figure 23E:
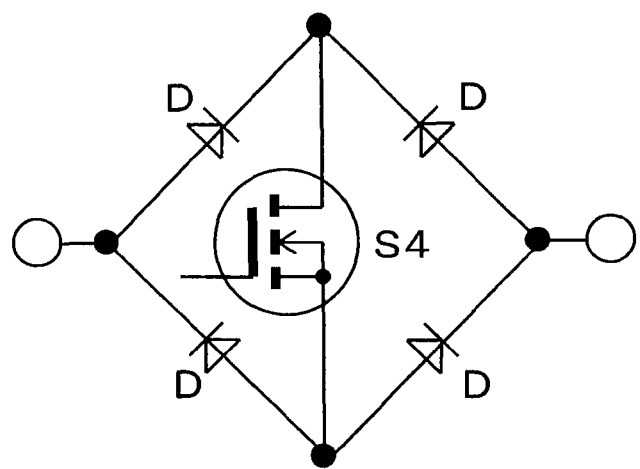

FIG. 23E is another modification of the bidirectional switch. This modification offers an advantage that only one switching element is required and that current is caused to flow in both directions by merely switching on that switching element. The modification, however, needs four diodes D, in which case a forward voltage loss caused by two diodes is added to both forward and reverse currents. A configuration of in FIG. 23E depicts the switch S4 that is an example of the above described fourth switching means. This configuration consists of a diode bridge and a unidirectional switching element. The unidirectional switching element is provided with four diodes D that consist of the diode bridge. In short, the unidirectional switching element is connected between a connection point to which anodes of two of the diodes are connected and a connection point to which cathodes of the other two diodes are connected. Such a configuration is also applicable to the switch S3 that is the third switching means.

Figure 23F:
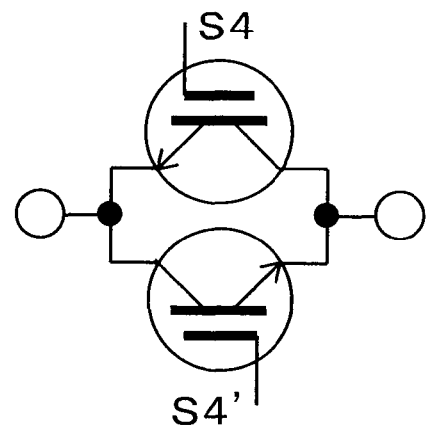

FIG. 23F depicts a modification that can be realized by using a special switching element having a sufficient reverse withstand voltage. For example, an IGBT (reverse blocking IGBT) having a reverse withstand voltage is known, which can be used in the configuration of FIG. 23F. This configuration does not require two switching elements to be connected in series in the same manner as depicted in FIGS. 23A and 23B, thus enabling a reduction of losses that are caused when the switching elements are on.

Figure 23G:
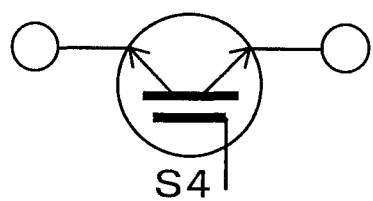

FIG. 23G is a modification of the bidirectional switching element. The switching element in FIG. 23G is represented by a symbol for a bidirectional IGBT, but may be provided as a bidirectional switching element composed of a combination of bipolar transistors, etc. In both cases, the switching element is a single element capable of bidirectional switching action. Unless a withstand voltage poses a problem, another type of switching element, such as MOS-FET, J-FET, bipolar transistor, and IGBT, may be used in the configuration of FIG. 23G.

Any type of an element and a configuration is applicable if they allow current to flow in both directions through switching. The above examples, therefore, do not limit the present invention.

Seventh Embodiment

A seventh embodiment discloses modifications of the circuit on the secondary side of the isolation transformer T in the half-wave rectification type (first embodiment).

FIGS. 24A to 24D depict examples of circuit configurations of the seventh embodiment. The seventh embodiment includes the following modifications.

(A) The number of switching elements is reduced by replacing some of the switching elements on the secondary side of the isolation transformer T with bidirectional switching elements. (This is the same modification as made in the fifth embodiment, and the modifications of the sixth embodiment are applicable to this case.)

(D) The positions and connection of the switching elements are modified on the secondary side of the isolation transformer T.

(E) The position and connection of the inductor L is modified.

Each of the modifications (D) and (E) may be adopted separately and independently. The circuit on the secondary side of the isolation transformer T is compared with that of the first embodiment (FIG. 1).

Figure 24A:
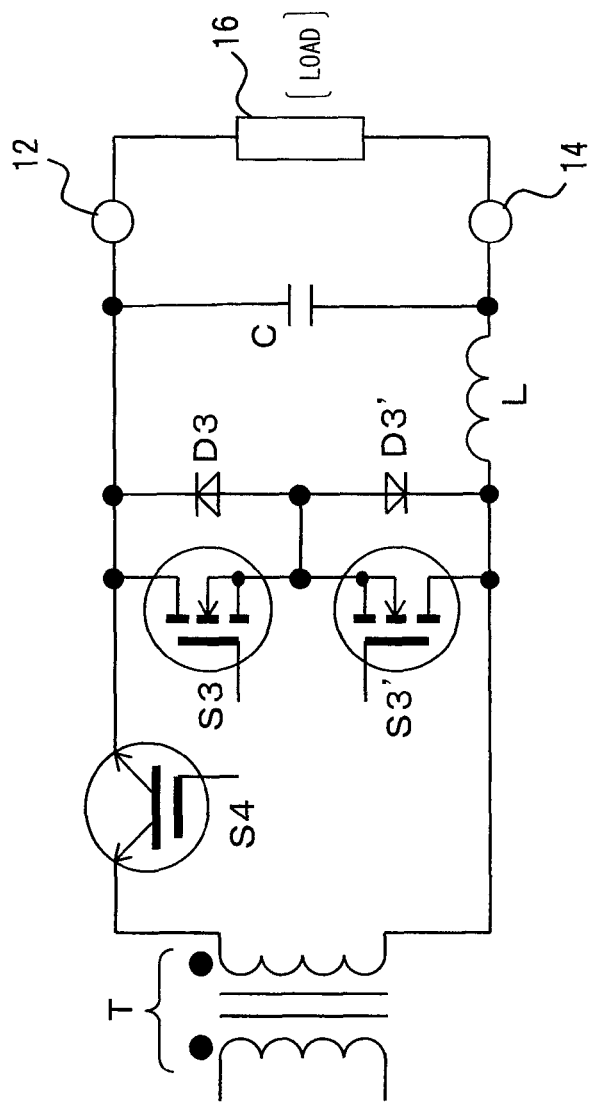
FIGS. 24A to 24D depict examples of an isolated power conversion apparatus according to a seventh embodiment.

In a configuration example of FIG. 24A, the switches S4 and S4' of FIG. 1 are replaced with a bidirectional switching element, which is a switch S4 [modification (A)]. In addition, the position of the inductor L is changed [modification (E)]. Each of these modifications may be adopted independently.

Figure 24B:
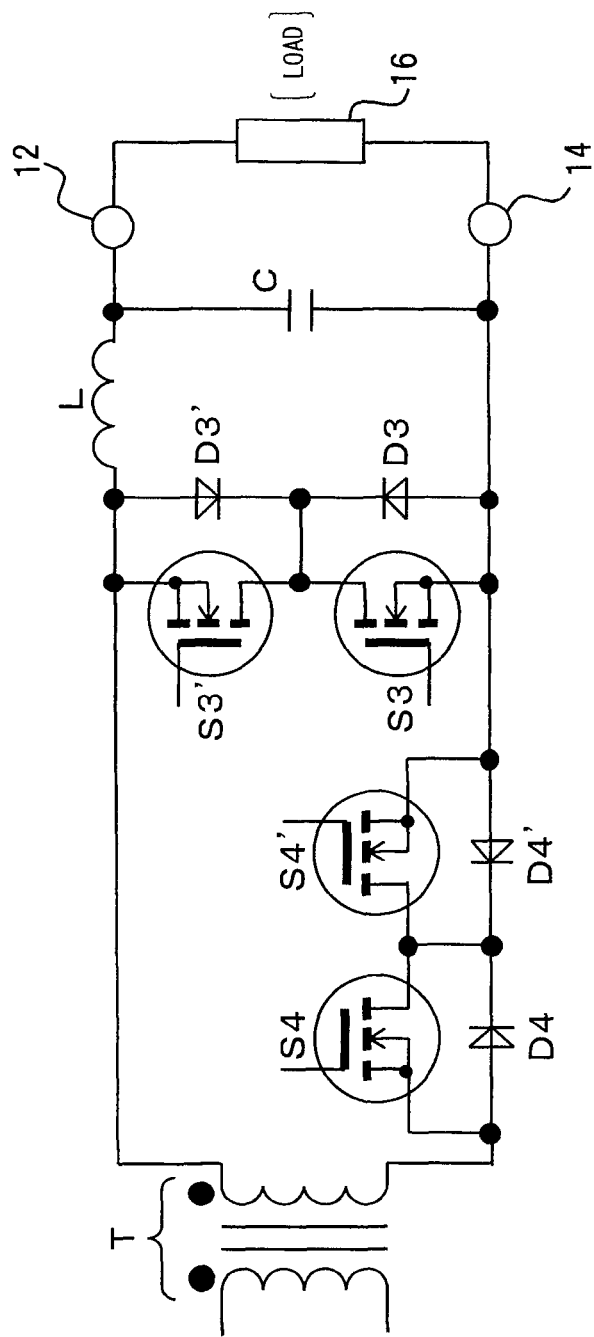

In a configuration example of FIG. 24B, the positions of switches S4 and S4' of FIG. 1 are changed [modification (D)]. It is possible to replace the switches S4 and S4' with one bidirectional switching element [modification (A)]. FIG. 24B also depicts an example in which the arrangement order of the switches S3 and S3' and that of the switches S4 and S4' are reversed [modification (D)].

Figure 24C:
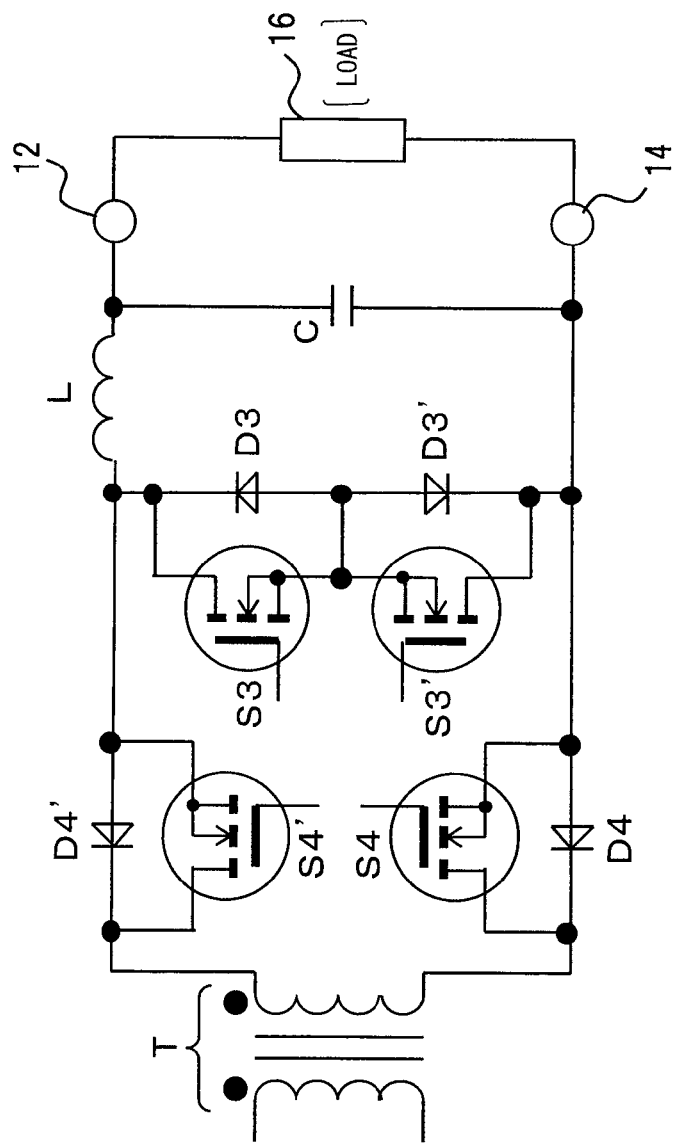

In a configuration example of FIG. 24C, out of the switches S4 and S4' of FIG. 1, only the switch S4 is shifted in its position. This configuration of FIG. 24C is further modified into a configuration of FIG. 24D, in which the switches S3 and S3' of FIG. 24C are replaced with one bidirectional switching element, the switches S4 and S4' are replaced with each other, and the inductor L is divided into two inductors [modification (D)].

Figure 24D:
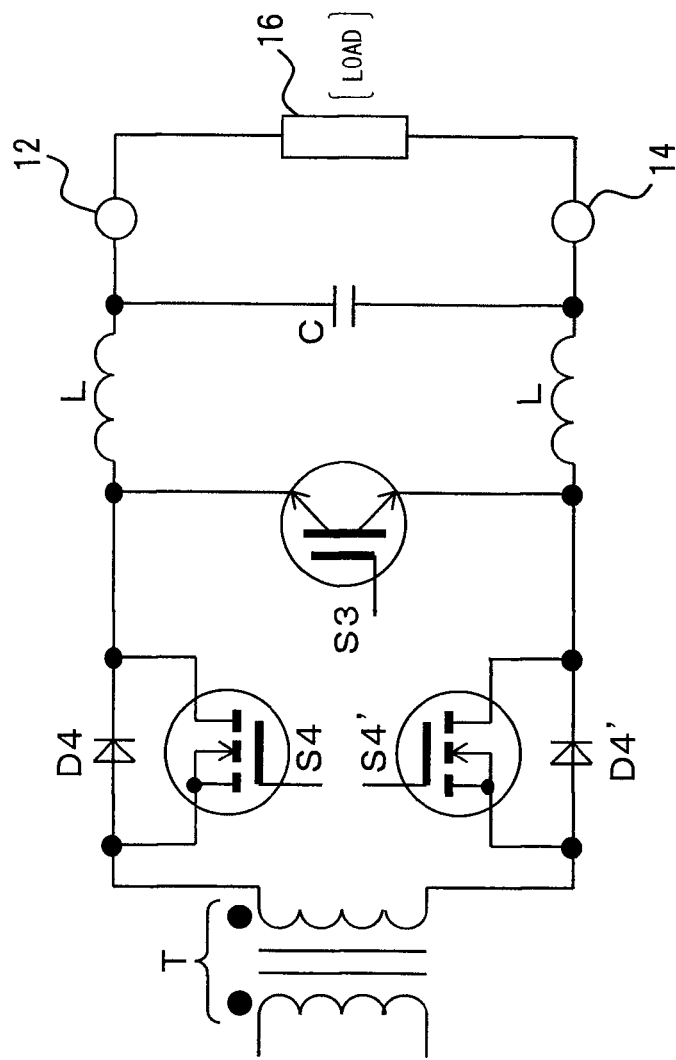

In the configurations of FIGS. 24C and 24D, the switches S4 and S4' cannot be replaced with one bidirectional switching element. If opposed two switches are connected separately from each other, a combination of the modification (D) with the modification (A) accompanies a restriction. Driving methods, etc., are the same as the driving methods for the configurations of FIGS. 1 and 17.

Eighth Embodiment

An eighth embodiment discloses modifications in which the modification (D) is applied to the full-wave rectification type (second embodiment). The full-wave rectification type allows adoption of other modifications described above, of which examples will be omitted in further description.

Figure 25A:
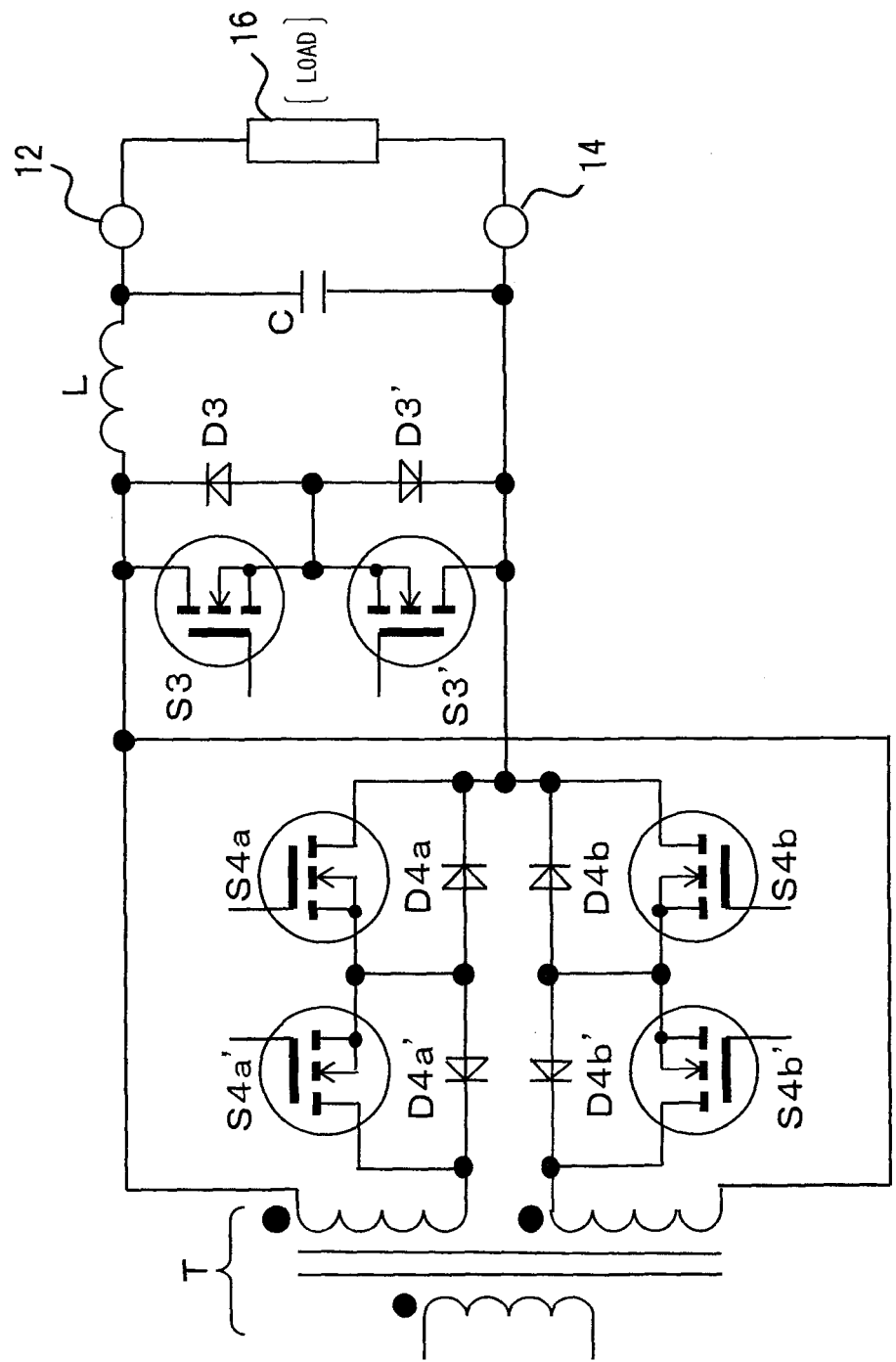
FIGS. 25A and 25B depict examples of an isolated power conversion apparatus according to an eighth embodiment.
Figure 25B:
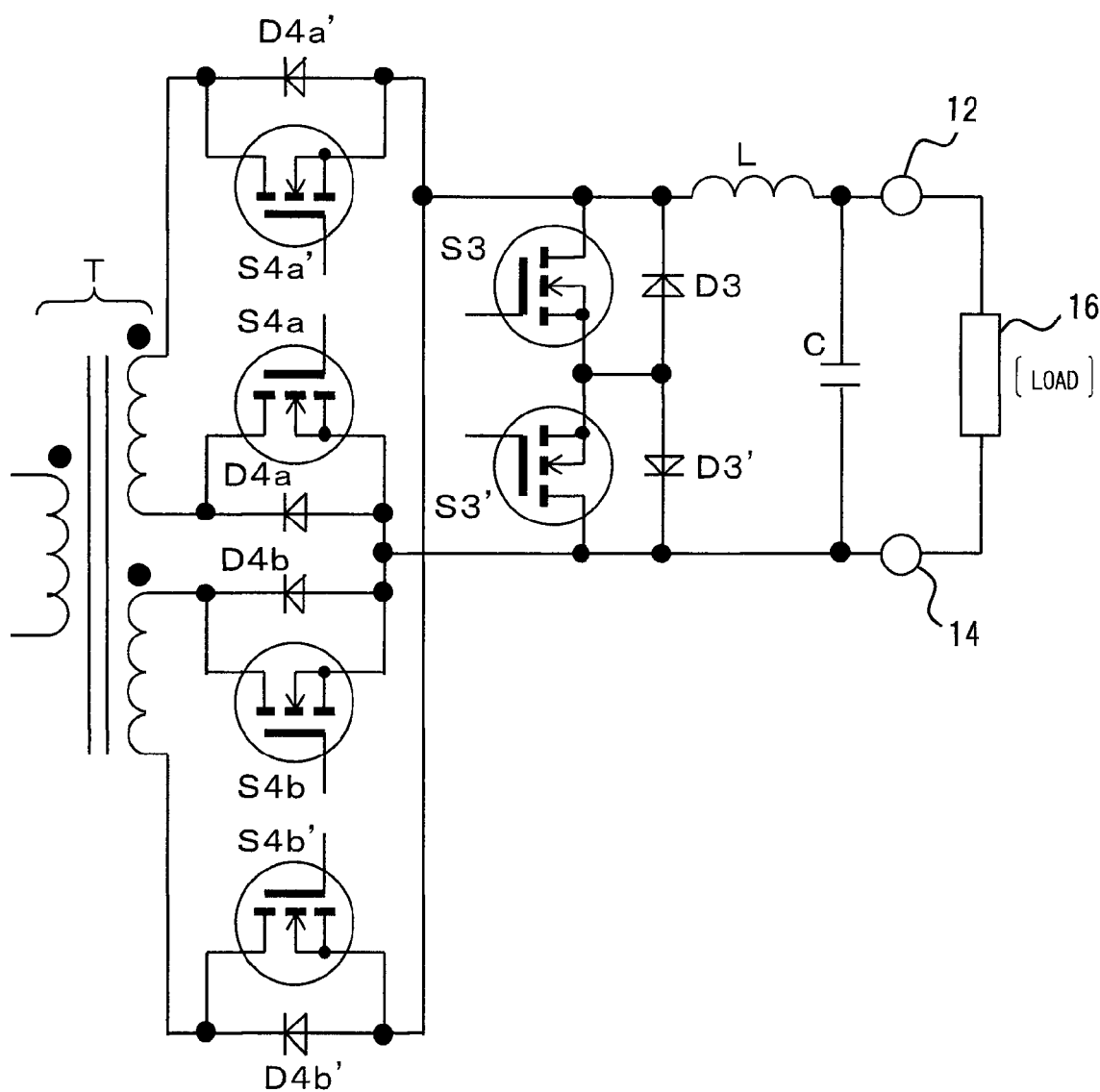

FIGS. 25A and 25B depict examples of circuit configurations of the eighth embodiment. These examples will be described through comparison with the secondary side of the isolation transformer T of the circuit of FIG. 9 according to the second embodiment.

In a configuration example of FIG. 25A, the positions of the switches S4a, S4a', S4b, and S4b' are all changed (this change is like the modification of FIG. 24B of the seventh embodiment). In this case, the switches S4a and S4a' may be replaced with one bidirectional switching element, and the switches S4b and S4b' may also be replaced with one bidirectional switching element [modification (A)].

In a configuration example of FIG. 25B, out of the switches S4a, S4a', S4b and S4b' of FIG. 9, only the switches S4a and S4b are shifted in their position (this shift is like the modification of FIG. 24C of the seventh embodiment). In this case, a set of the switches S4a and S4a' and a set of the switches S4b and S4b' cannot be replaced with one bidirectional switching element, respectively. Hence a combination of the modification (D) with the modification (A) accompanies a restriction. Driving methods, etc., are the same as the driving methods of FIG. 9.

Ninth Embodiment

A ninth embodiment discloses a configuration example of a two-phase DC/AC inverter. In the case where a plurality of phases each phase-isolated are required, the secondary coil of the isolation transformer T is divided into separate coils and an independent circuit for each phase are provided. In this manner, all of the embodiments and modifications are applicable to the ninth embodiment. A simpler and more effective example is indicated as an example of a two-phase output configuration in which the isolation transformer T has only one secondary coil, each phase is not isolated, and a common reference potential is used.

Figure 26:
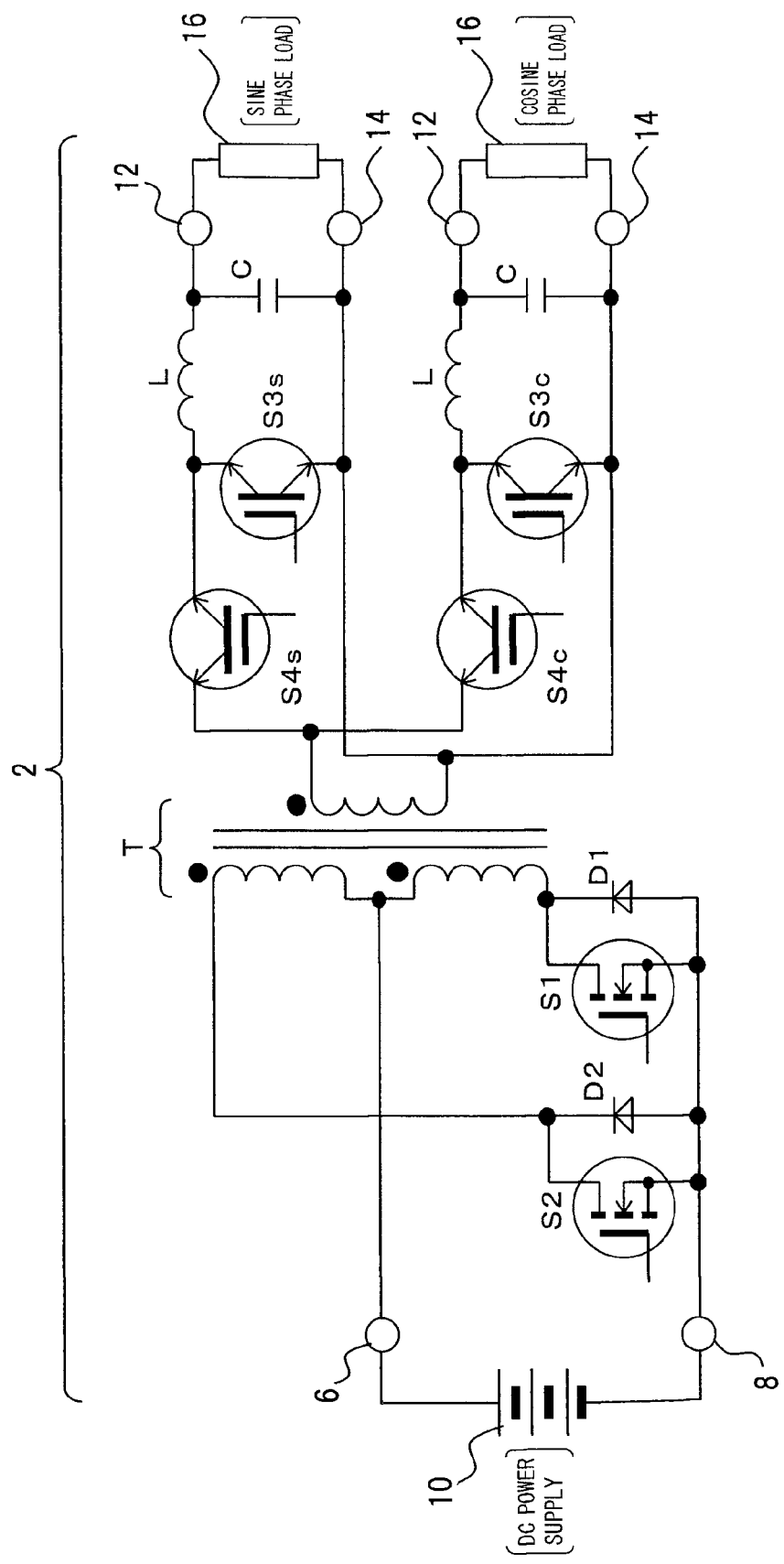
FIG. 26 depicts an example of an isolated power conversion apparatus according to a ninth embodiment.
Figure 27:
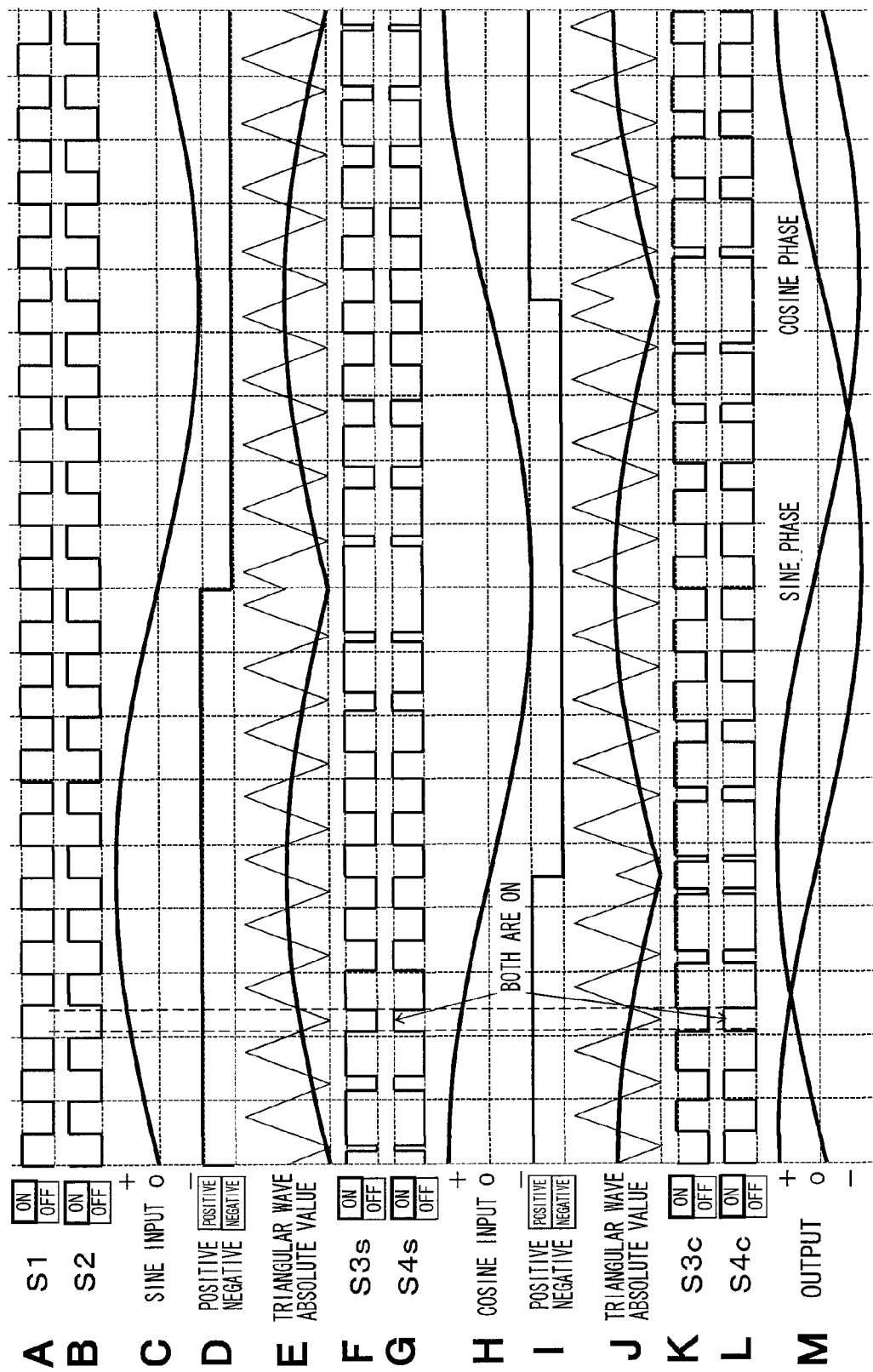
FIG. 27 depicts a two-phase DC/AC inverter operation.
Figure 28:
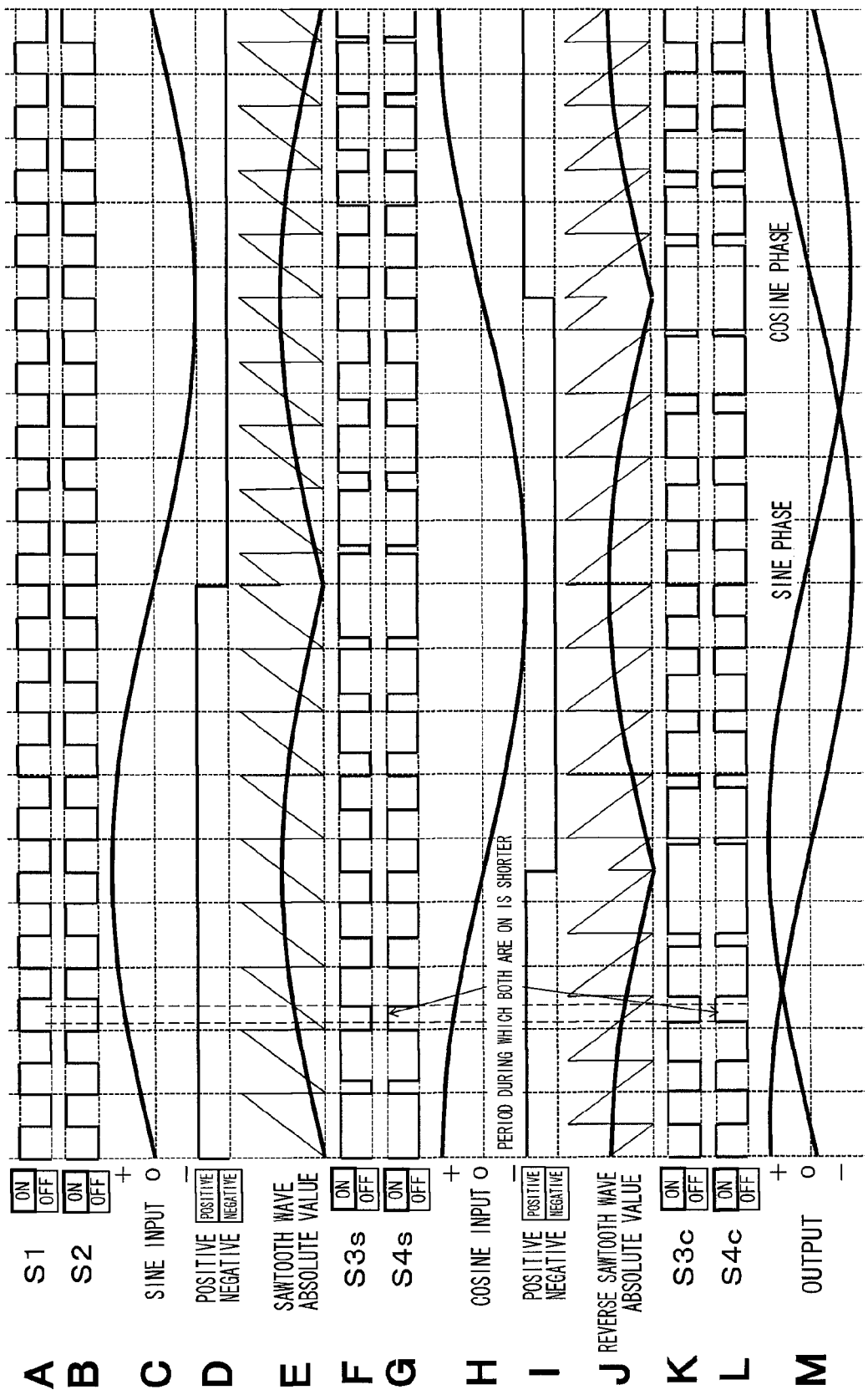
FIG. 28 depicts the two-phase DC/AC inverter operation and control therefor.

FIG. 26 depicts an example of a circuit configuration according to the ninth embodiment. FIGS. 27 and 28 depict examples of control and operations that are carried out in this circuit configuration. In these examples, a waveform is of a sine wave, whose cosine phase advances by 90 degrees against the sine phase. A phase relation, waveforms, the number of phases, etc., however, may be determined arbitrarily. The example, therefore, does not limit the present invention.

In FIG. 26, the circuit on the primary side of the isolation transformer T is indicated as a push-pull type circuit. The circuit on the secondary side of the isolation transformer T is provided with bidirectional switching elements, and is indicated as the half-wave rectification type.

In the example of operating waveforms of FIG. 27, the absolute value of an input waveform is compared with a triangular wave to generate a control signal for each of the switches on the secondary side of the isolation transformer T, and the phase of the triangular wave is switched at 180 degrees depending on the positive or negative of the input signal.

In FIG. 28, the absolute value of the input waveform is compared with a sawtooth wave at the sine phase and the absolute value of the input waveform is compared with a reverse sawtooth wave at the cosine phase, to generate a control signal for each of the switches on the secondary side of the isolation transformer T. The phases of the sawtooth wave and reverse sawtooth wave are switched at 180 degrees depending on the positive or negative of the input signal in the same manner as dose in the operating waveform example of FIG. 27.

In FIG. 27, it is found out by observing the third switching on of the switch S1 that both switch S4s and switch S4c switch on and off at almost the same timing in this period. In FIG. 28, in contrast, it is found out that the switch S4s and the switch S1 rise at the same timing as the switch S4c and the switch S1 fall at the same timing, which means that switching timing of the switch S4s and that of S4c are shifted forward and backward. Hence, in FIG. 28, a period during which both switches S4s and S4c are on is shorter than the same period in FIG. 27. This devised method improves the use efficiency of the coil of the isolation transformer T, thus enabling a reduction in the size and weight of the isolation transformer T. Such a configuration is applicable to the power conversion apparatus used as a DC/AC inverter and also to the power conversion apparatus used as a dual-output DC/DC converter.

It is observed in FIGS. 27 and 28 that the switches S1 and S2 switch on and off by turns to each other, but completely keeping the duty ratio of each of the switches S1 and S2 at 50% is difficult. Practically, a little downtime is needed to be interposed between the switches' on-period and off-period.

Tenth Embodiment

A tenth embodiment discloses a configuration example of a three-phase DC/AC inverter with Y connection.

Figure 29:
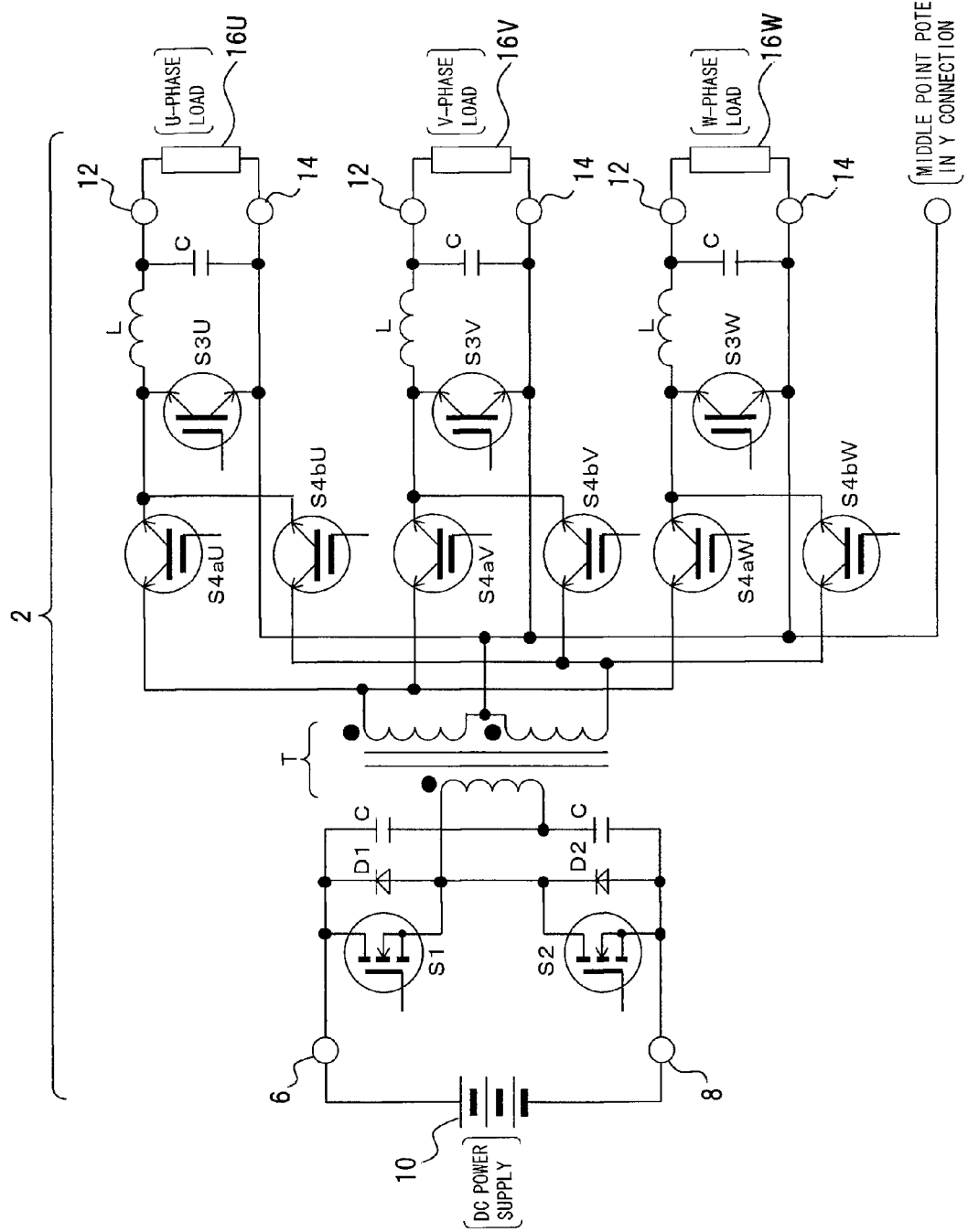
FIG. 29 depicts an example of an isolated power conversion apparatus according to a tenth embodiment.
Figure 30:
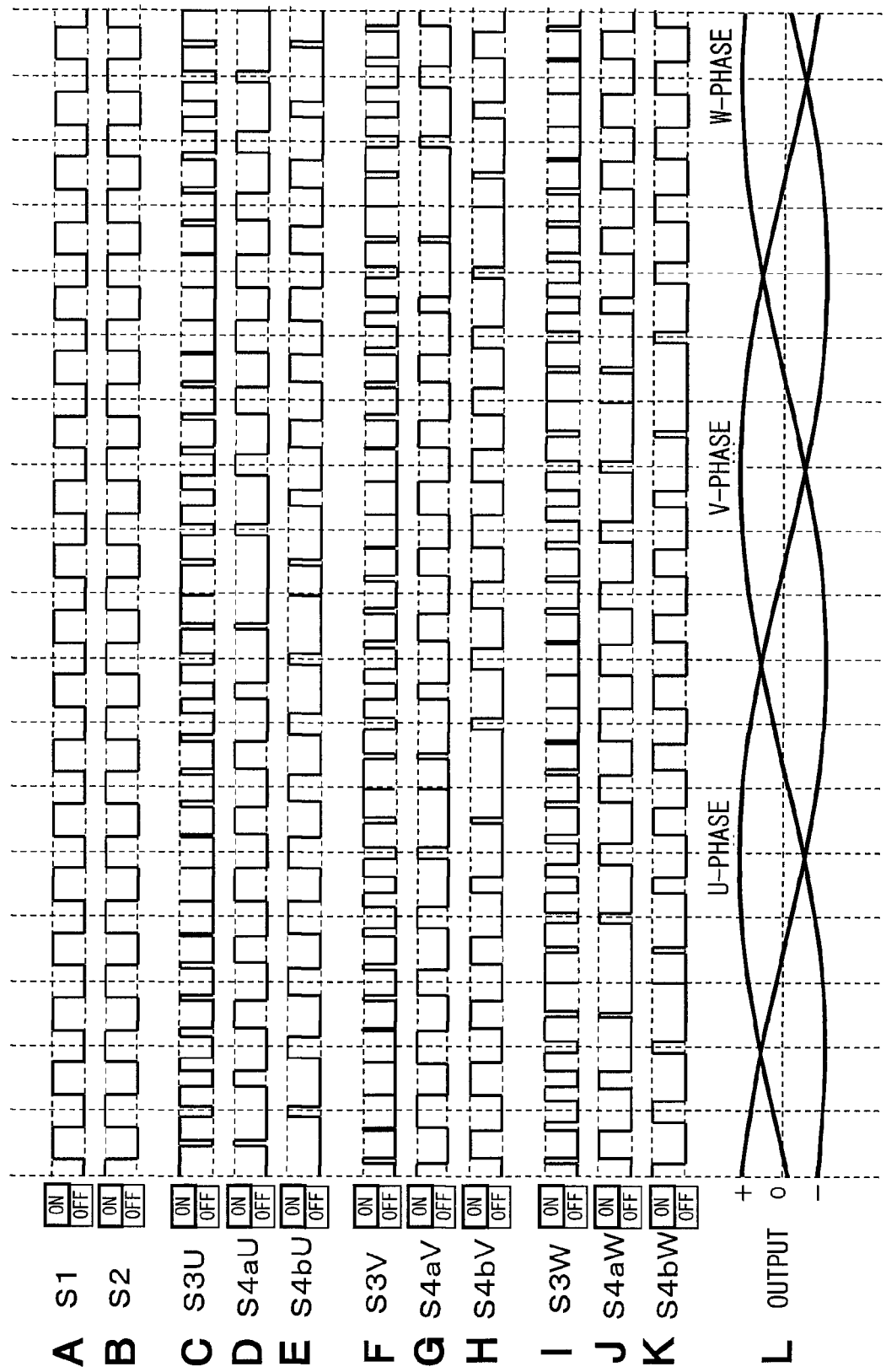
FIG. 30 depicts a three-phase DC/AC inverter operation.

FIG. 29 depicts an example of a circuit configuration according to the tenth embodiment, and FIG. 30 depicts an example of an operation of the circuit. In this example, a waveform is of a sine wave, whose U-phase, V-phase, and W-phase are shifted from each other by 120 degrees. A phase relation, waveforms, the number of phases, etc., however, may be determined arbitrarily. The example, therefore, does not limit the present invention.

In the configuration example of FIG. 29, the circuit on the primary side of the isolation transformer T is indicated as the half-bridge type circuit. The circuit on the secondary side of the isolation transformer T is provided with switching elements, all of which are bidirectional switching elements, and is indicated as the full-wave rectification type.

In Y connection, a middle point potential serves as a reference potential common to three phases. In the case of the three-phase configuration, however, the isolation transformer T has two secondary coils as in the case of the single-phase configuration.

In FIG. 30, because of the characteristics of the half-bridge type circuit, the duty ratio of each of the switches S1 and S2 does not have to be completely 50%, so that a downtime between the on-period and the off-period is not necessary.

In the configuration example of FIG. 30, an input signal at each phase is compared with a triangular wave to generate a control signal for each of the switches on the secondary side of the isolation transformer T. For example, by a method of using a triangular wave for the U-phase, a sawtooth wave for the V-phase, and a reversed sawtooth wave for the W-phase, switching timing of each switch is shifted forward and backward to reduce periods in which a plurality of switches switch on simultaneously. This improves the use efficiency of the coil of the isolation transformer T, thus enabling a reduction in the size and weight of the isolation transformer T. Such a devised method is applicable to the power conversion apparatus used as a DC/AC inverter and also to the power conversion apparatus used as a triple-output DC/DC converter with a common reference voltage.

Eleventh Embodiment

An eleventh embodiment discloses another configuration example of the isolated bipolar bidirectional DC/DC converter and the isolated bipolar bidirectional DC/AC inverter.

Figure 31:
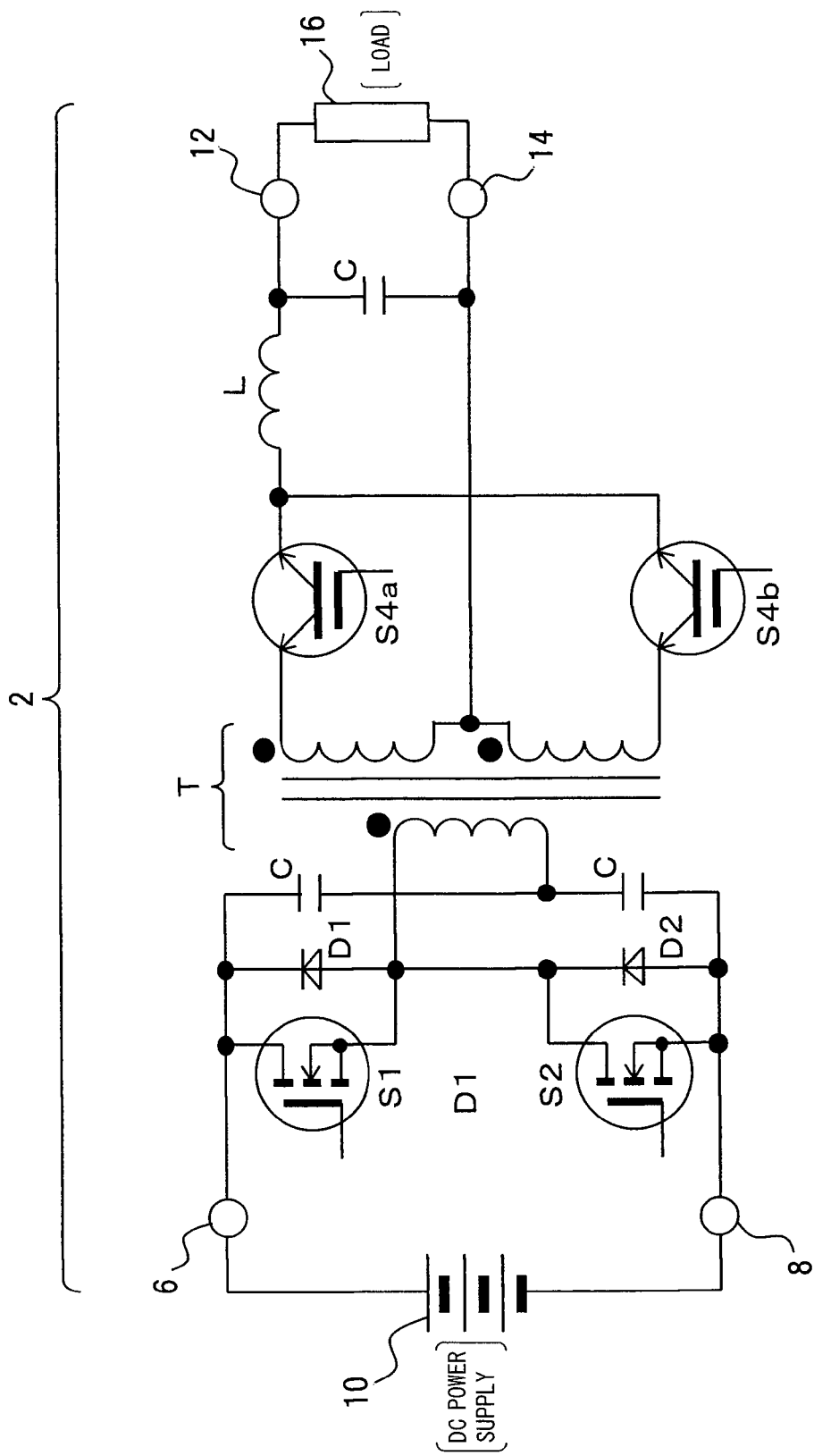
FIG. 31 depicts an example of an isolated power conversion apparatus according to the eleventh embodiment.

FIG. 31 depicts a configuration example of a basic circuit according to the eleventh embodiment. As depicted in FIG. 31, the circuit on the secondary side of the isolation transformer T has a full-wave rectification type configuration of the second embodiment from which the switches S3 and S3' are omitted. Without having the switches S3 and S3', the circuit does not carry out the operation of supplying energy accumulated in the inductor L to the load 16 via the switches S3 and S3'.

The drive circuit on the primary side of the isolation transformer T is indicated as the half-bridge type circuit. The primary-side circuit, however, may be configured as not only a circuit of the push-pull type, half-bridge type (third embodiment), or full-bridge type (fourth embodiment) but also as any type of a circuit if the circuit is capable of forward drive and reverse drive on the primary side of the isolation transformer T. The switches S4a and S4b are indicated as bidirectional switching elements, but may be provided as any types of elements or components if they are capable of causing current to flow in both directions by switching on and off (fifth embodiment). Other modifications, such as the modification of the positions and connection of the switching elements described in the eighth embodiment [modification (D)] and modification of the position and connection of the inductor L described in the seventh embodiment [modification (E)], can be applied properly to the secondary-side circuit.

[Output Operation]

An operation in the case where no energy has been accumulated in the inductor L will be described with reference to FIGS. 32A to 32D. A situation where the switches S1 and S4a are on (FIG. 32A) is assumed. A current flows through the primary coil of the isolation transformer T in an arrowed direction in FIG. 32A, thus creating a counter electromotive force, which then generates an induced electromotive force in the secondary coils of the isolation transformer T. This applies a positive voltage through the switch S4a to the front end (closer to the switches S4a and S4b) of the inductor L. As a result, energy is accumulated in the inductor L in an arrowed direction.

A situation where the switches S1 and S4b are on (FIG. 32B) is assumed. A current flows through the primary coil of the isolation transformer T in an arrowed direction in FIG. 32B, thus creating a counter electromotive force, which then generates an induced electromotive force in the secondary coils of the isolation transformer T. This applies a negative voltage through the switch S4b to the front end of the inductor L. As a result, energy is accumulated in the inductor L in an arrowed direction.

Figure 32B:
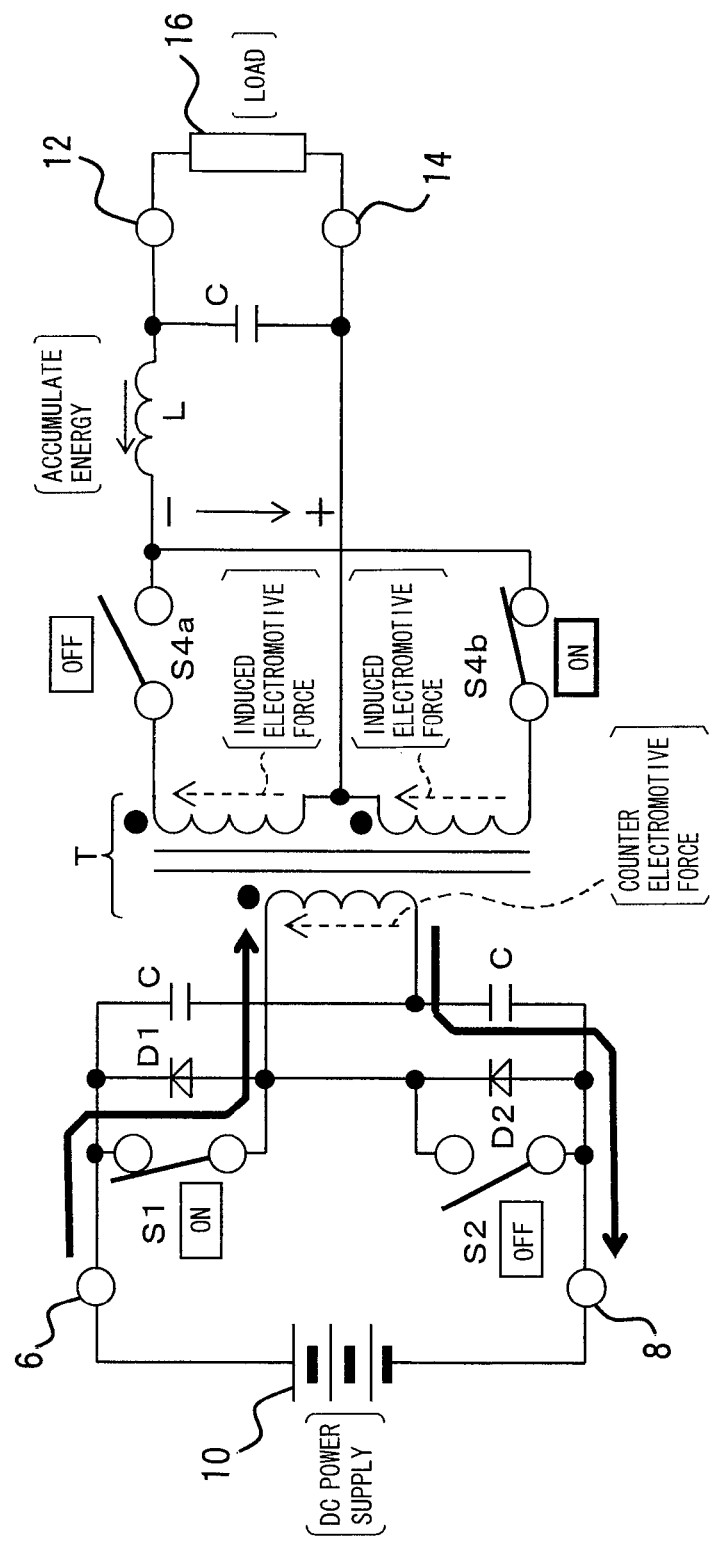
FIGS. 32A to 32D, 32A' and 32B' depict output operations.
Figure 32C:
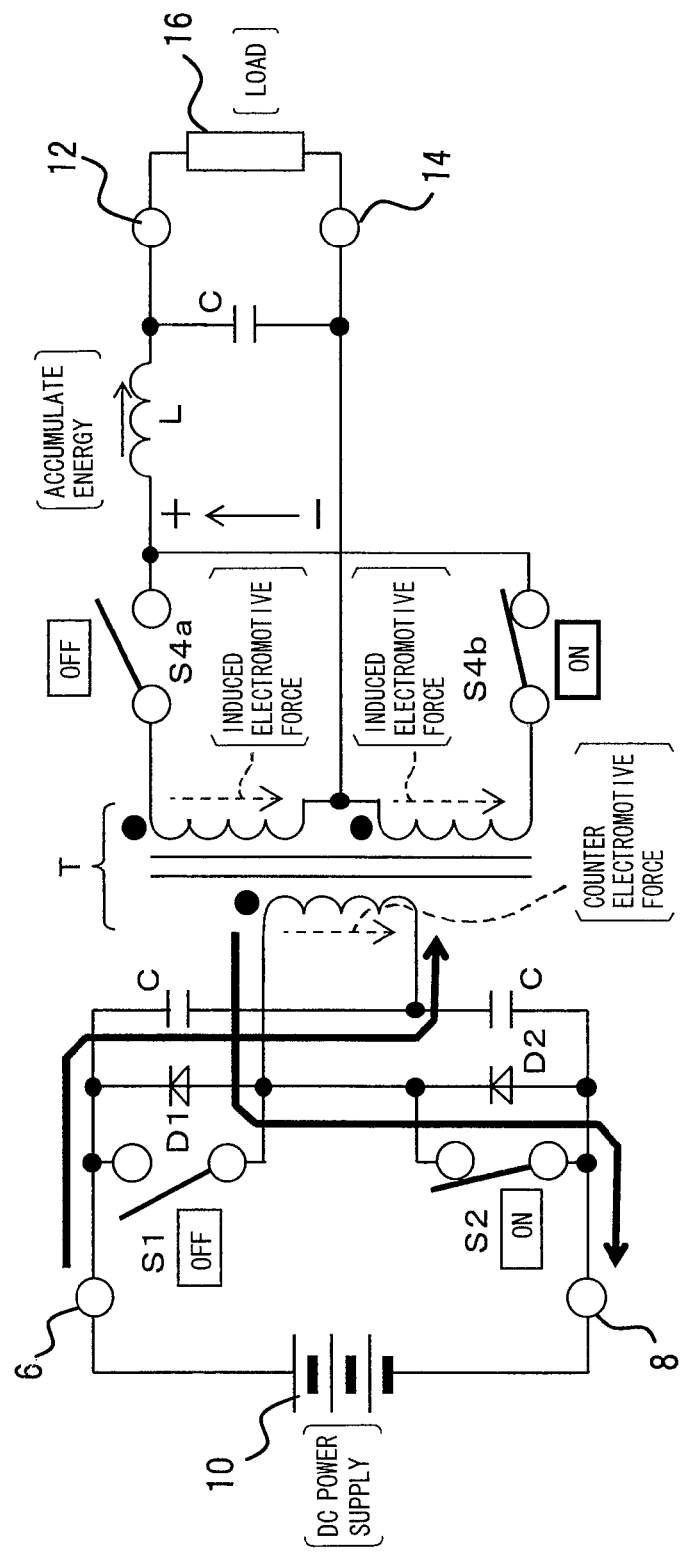
Figure 32D:
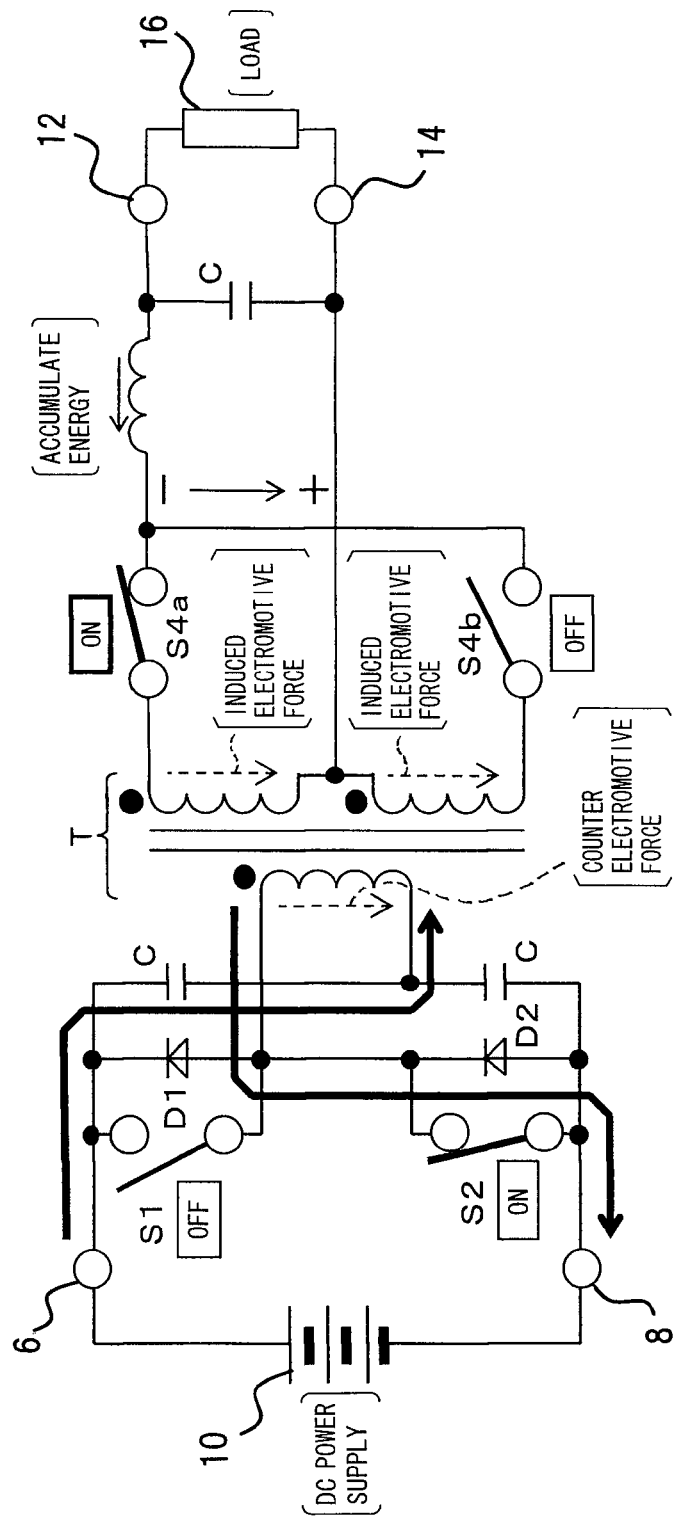

An operation that is carried out when the switches S2 and S4b are on (FIG. 32C) is the same as the operation that is carried out when the switches S1 and S4a are on (FIG. 32A), and an operation that is carried out when the switches S2 and S4a are on (FIG. 32D) is the same as the operation that is carried out when the switches S1 and S4b are on (FIG. 32B). Both operations of FIGS. 32C and 32D are therefore omitted in further description. These operations of FIGS. 32A to 32D are carried out in the case where no energy has been accumulated in the inductor L.

Figure 32A:
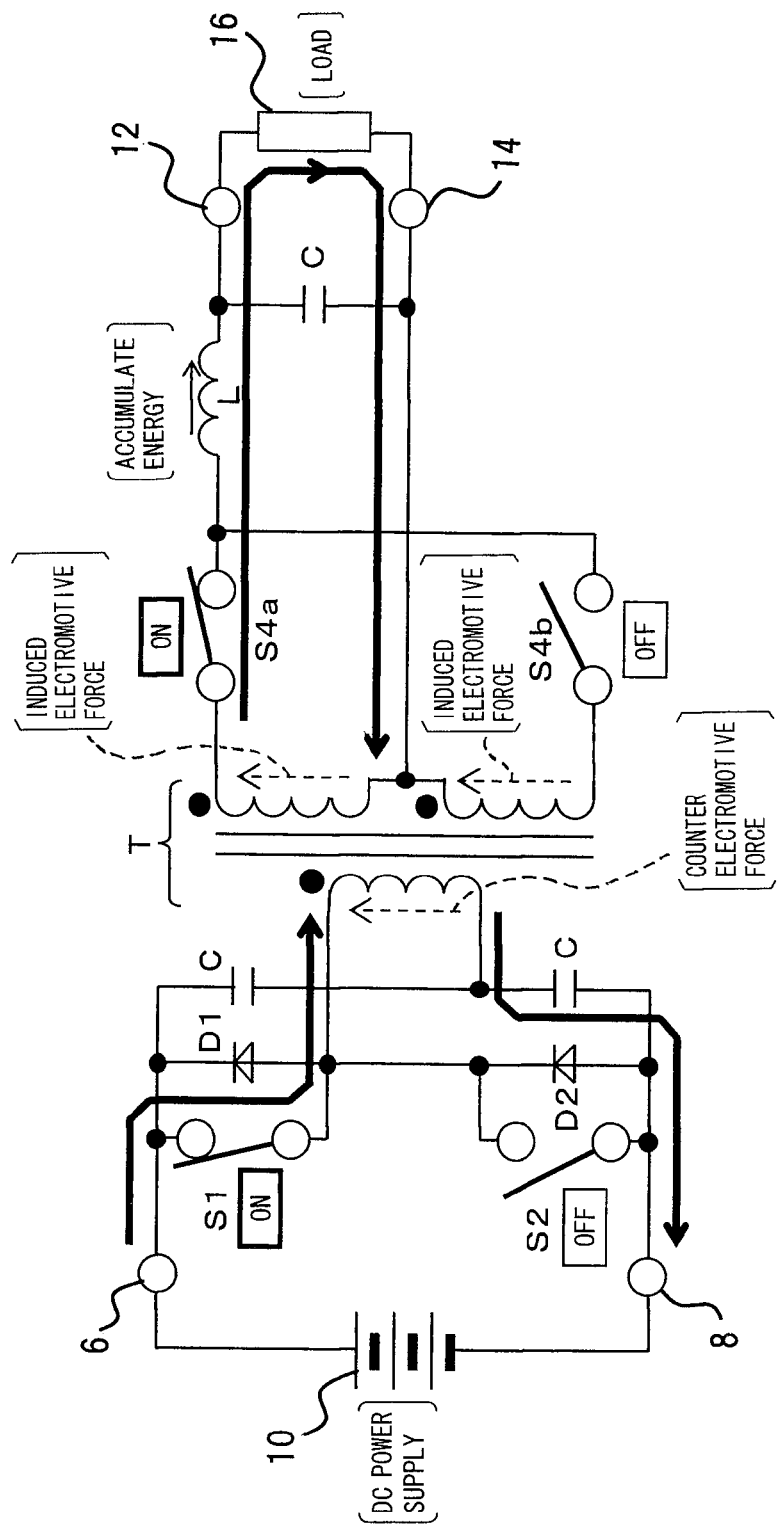
Figure 32B:
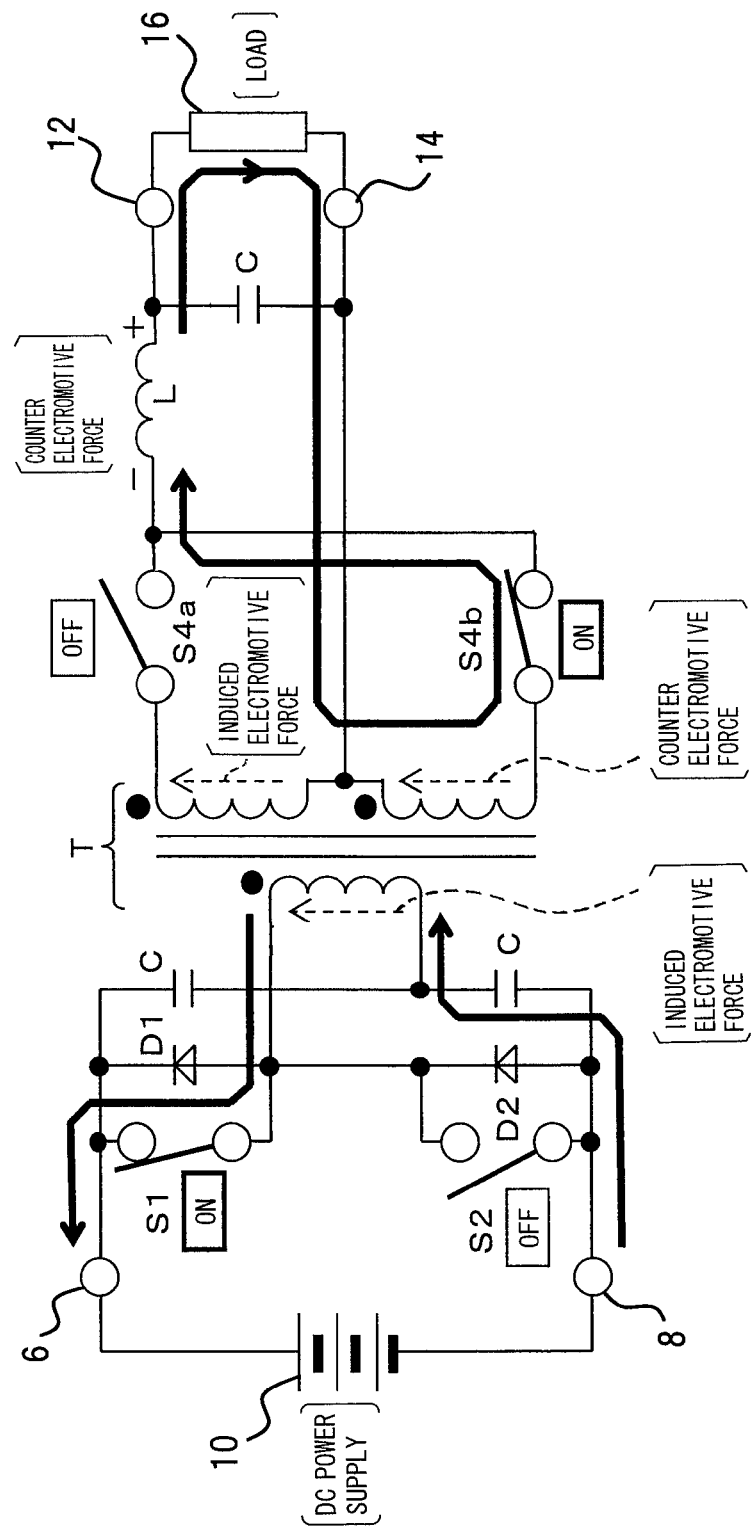

Accumulation and release of energy by the inductor L will then be described. FIGS. 32A' and 32B' depict the case where energy is accumulated in the inductor L when the switches S1 and S4a are on (FIG. 32A), and then the accumulated energy is released from the inductor L when the switches S1 and S4b are on (FIG. 32B).

FIG. 32A' depicts the same case as that of FIG. 32A. A current from the DC power supply 10 flows through the primary coil of the isolation transformer T in an arrowed direction in FIG. 32A', thus creating a counter electromotive force, which then generates an induced electromotive force in the secondary coils of the isolation transformer T. This causes a current to flow through the switch S4a, the inductor L, and the load in an arrowed direction, resulting in accumulation of energy in the inductor L in an arrowed direction.

In the case of FIG. 32B', energy accumulated in the inductor L creates a counter electromotive force, which causes a current to flow through the load, one of the secondary coils of the isolation transformer T, and the switch S4b. A counter electromotive force is thus generated in one of the secondary coils of the isolation transformer T, which then induces an induced electromotive force in the other of the secondary coils of the isolation transformer T and in the primary coil of the isolation transformer T. As a result, a current flows through the primary coil of the isolation transformer T in an arrowed direction in FIG. 32B' and returns to the DC power supply 10.

In the case where a period of the switch condition of FIG. 32A is long and a period of the switch condition of FIG. 32B is short, energy is accumulated in the inductor L in the condition of FIG. 32A' and energy accumulated in the inductor L is released in the condition of FIG. 32B' (The same phenomenon happens for the case of FIGS. 32C and 32D.). Contrary to that, if the period of the switch condition of FIG. 32A is short and the period of the switch condition of FIG. 32B is long, energy accumulated in the inductor L is released when the switches S1 and S4a are on (FIG. 32A) and energy is accumulated in the inductor L when the switches S1 and S4b are on (FIG. 32B).

If the periods of the switch conditions of FIGS. 32A and 32B are the same, energy accumulated in the inductor L is released in the first half of the period, and energy is accumulated in the inductor L in the reverse direction in the latter half of the period.

[Control of Output Voltage]

In the case where only the switching on of the switches S1 and S4a (FIG. 32A) and switching on of the switches S2 and S4b (FIG. 32C) are repeated, a positive voltage is constantly applied to the front end of the inductor L. Hence the maximum positive voltage is applied to the load.

If switching is repeated in such a way that the on-period of the switches S1 and S4a (FIG. 32A) is set longer as the on-period of the switches S1 and S4b (FIG. 32B) is set shorter and that the on-period of the switches S2 and S4b (FIG. 32C) is set longer as the on-period of the switches S2 and S4a (FIG. 32D) is set shorter, a positive voltage of a longer time period and a negative voltage of a shorter time period are applied alternately to the front end of the inductor L. This applied voltage is smoothed by the inductor L (and by the capacitor C if it is present). As a result, a positive voltage lower than the maximum voltage is applied to the load.

If switching on of the switches S1 and S4a (FIG. 32A), switching on of the switches S1 and S4b (FIG. 32B), switching on of the switches S2 and S4b (FIG. 32C), and switching on of the switches S2 and S4a (FIG. 32D) are repeated at equal intervals, a positive voltage and a negative voltage are applied alternately at equal intervals to the front end of the inductor L. This applied voltage is smoothed by the inductor L (and by the capacitor C if it is present). As a result, no voltage is applied to the load. Consequently, if loss in the circuit is ignored, energy accumulated in the inductor L becomes equal to energy released from the inductor L in the form of a counter electromotive force. Hence, as a result of energy exchange via the isolation transformer T, a current flowing out of the DC power supply 10 on the primary side of the isolation transformer T becomes equal in volume with a current flowing into the DC power supply 10.

If switching is repeated in such a way that the on-period of the switches S1 and S4a (FIG. 32A) is set shorter as the on-period of the switches S1 and S4b (FIG. 32B) is set longer and that the on-period of the switches S2 and S4b (FIG. 32C) is set shorter as the on-period of the switches S2 and S4a (FIG. 32D) is set longer, a positive voltage of a shorter time period and a negative voltage of a longer time period are applied alternately to the front end of the inductor L. This applied voltage is smoothed by the inductor L (and by the capacitor C if it is present). As a result, a negative voltage lower than the maximum voltage is applied to the load.

In the case where only the switching on of the switches S1 and S4b (FIG. 32B) and switching on of the switches S2 and S4a (FIG. 32D) are repeated, a negative voltage is constantly applied to the front end of the inductor L. Hence the maximum negative voltage is applied to the load.

These relations are depicted in a timing chart of FIG. 33, in which the switches S1 and S2 switch on by turns to each other and the switches S4a and S4b switch on by turns to each other. In the timing chart, positive signs in waveforms indicate that a positive voltage is applied to the front end of the inductor L, while negative signs indicate that a negative voltage is applied to the front end of the inductor L.

At "+maximum output" in FIG. 33, only the switching on of the switches S1 and S4a (FIG. 32A) and switching on of the switches S2 and S4b (FIG. 32C) are repeated. As a result, the maximum positive voltage is applied to the load, as described above. In this case, the switches S1 and S4a and the switches S2 and S4b are at the same phase.

At "+½ output" in FIG. 33, switching is repeated in such a way that the on-period of the switches S1 and S4a (FIG. 32A) is set longer as the on-period of the switches S1 and S4b (FIG. 32B) is set shorter and that the on-period of the switches S2 and S4b (FIG. 32C) is set longer as the on-period of the switches S2 and S4a (FIG. 32D) is set shorter. As a result, a positive voltage half as large as the maximum voltage is applied to the load. In this case, the switch S4*a* and the switch S4*b* have phase lead of 45 degrees against the switch S1 and the switch S2, respectively.

At "zero output" in FIG. 33, switching on of the switches S1 and S4*a* (FIG. 32A), switching on of the switches S1 and S4*b* (FIG. 32B), switching on of the switches S2 and S4*b* (FIG. 32C), and switching on of the switches S2 and S4*a* (FIG. 32D) are repeated at equal intervals. As a result, no voltage is applied to the load, as described above. In this case, the switch S4*a* and the switch S4*b* have phase lead of 90 degrees against the switch S1 and the switch S2, respectively.

At "−½ output" in FIG. 33, switching is repeated in such a way that the on-period of the switches S1 and S4*a* (FIG. 32A) is set shorter as the on-period of the switches S1 and S4*b* (FIG. 32B) is set longer and that the on-period of the switches S2 and S4*b* (FIG. 32C) is set shorter as the on-period of the switches S2 and S4*a* (FIG. 32D) is set longer. As a result, a negative voltage half as large as the maximum voltage is applied to the load. In this case, the switch S4*a* and the switch S4*b* have phase lead of 135 degrees against the switch S1 and the switch S2, respectively.

At "−maximum output" in FIG. 33, only the switching on of the switches S1 and S4*b* (FIG. 32B) and switching on of the switches S2 and S4*a* (FIG. 32D) are repeated. As a result, the maximum negative voltage is applied to the load, as described above. In this case, the switch S4*a* and the switch S4*b* have phase lead of 180 degrees against the switch S1 and the switch S2, respectively, which means the switches S4*a* and S4*b* become reverse in phase to the switches S1 and S2.

In this manner, an output voltage can be determined by the "phase relation" of waveforms that drive the switches S1 and S2 and the switches S4*a* and S4*b*. Hence the circuit operates as a bipolar DC/DC converter. While the example of controlling an output voltage by the phase relation of drive waveforms is described, it is easy to devise other driving methods for controlling an output voltage by referring to other embodiments described above. Description of other driving methods is, therefore, omitted.

It is obvious that as well as the above described other embodiments, controlling an output voltage in both positive and negative directions freely enables the operation as a DC/AC inverter, of which description is therefore omitted.

[Operation Comparison with Isolated DC/DC Converter for Comparison]

Figure 34:
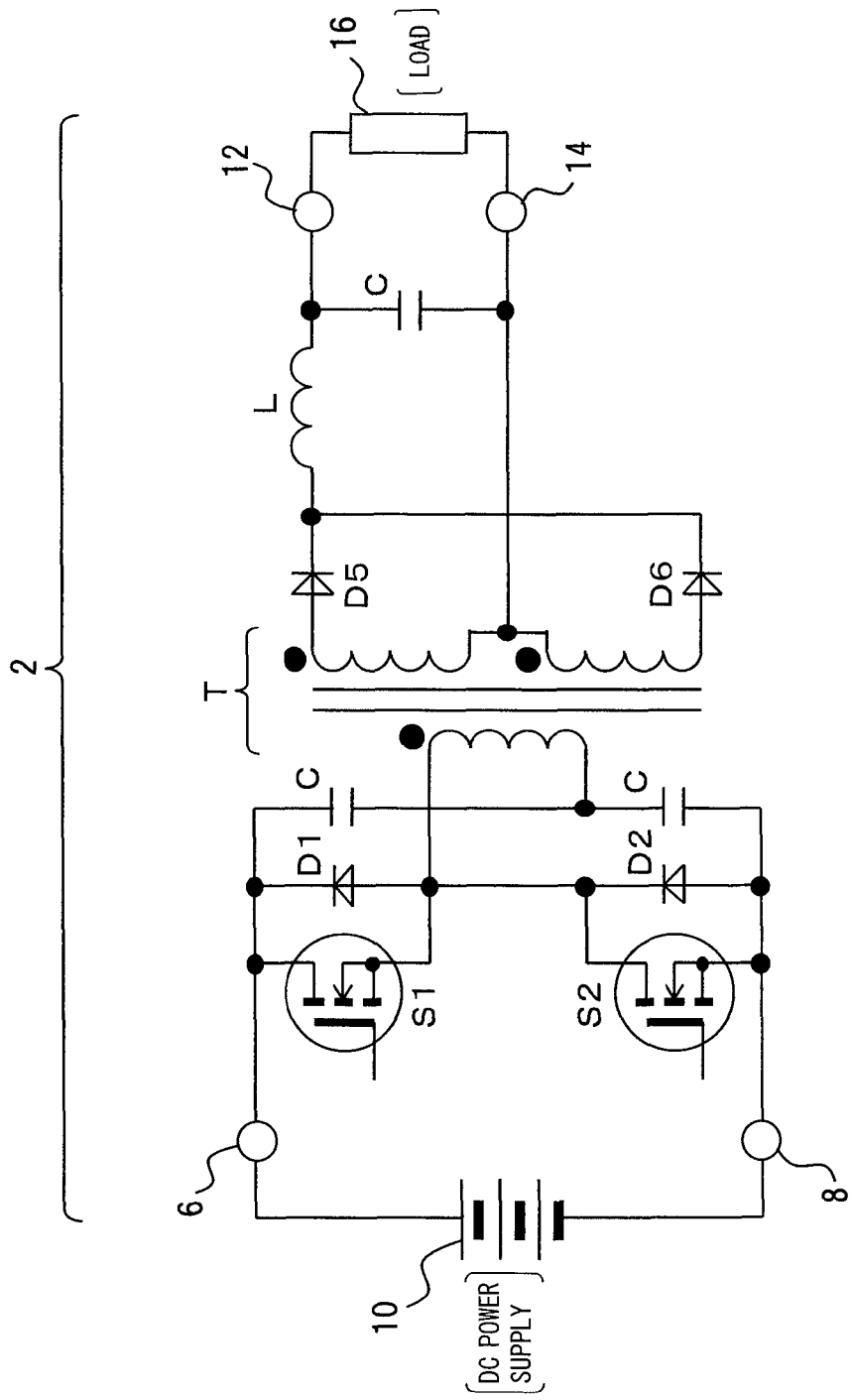
FIG. 34 is a diagram for comparison with an isolated DC/DC converter.

The operation of the DC/DC converter of FIG. 31 is described through comparison with an operation of an isolated DC/DC converter for comparison as depicted in FIG. 34. The operations of the isolated DC/DC converter of FIG. 34 will be described with reference to FIGS. 35A and 35B.

When the switch S1 is on (FIG. 35A), a counter electromotive force is generated on the primary side of the isolation transformer T, which induces an induced electromotive force on the secondary side. As a result, a current passes through the diode D5, which results in application of a positive voltage to the front end of the inductor L.

When the switch S2 is on (FIG. 35B), a reversely directed counter electromotive force is generated on the primary side of the isolation transformer T, which induces a reversely directed induced electromotive force on the secondary side of the isolation transformer T. As a result, a current passes through the diode D6, which results in application of a positive voltage to the front end of the inductor L as does in the above case. If switching on of the switch S1 (FIG. 35A) and switching on of the switch S2 (FIG. 35B) are repeated by turns, the maximum positive voltage is applied to the load, which is the operation same as the operation at "+maximum output" of FIG. 33.

Figure 35A:
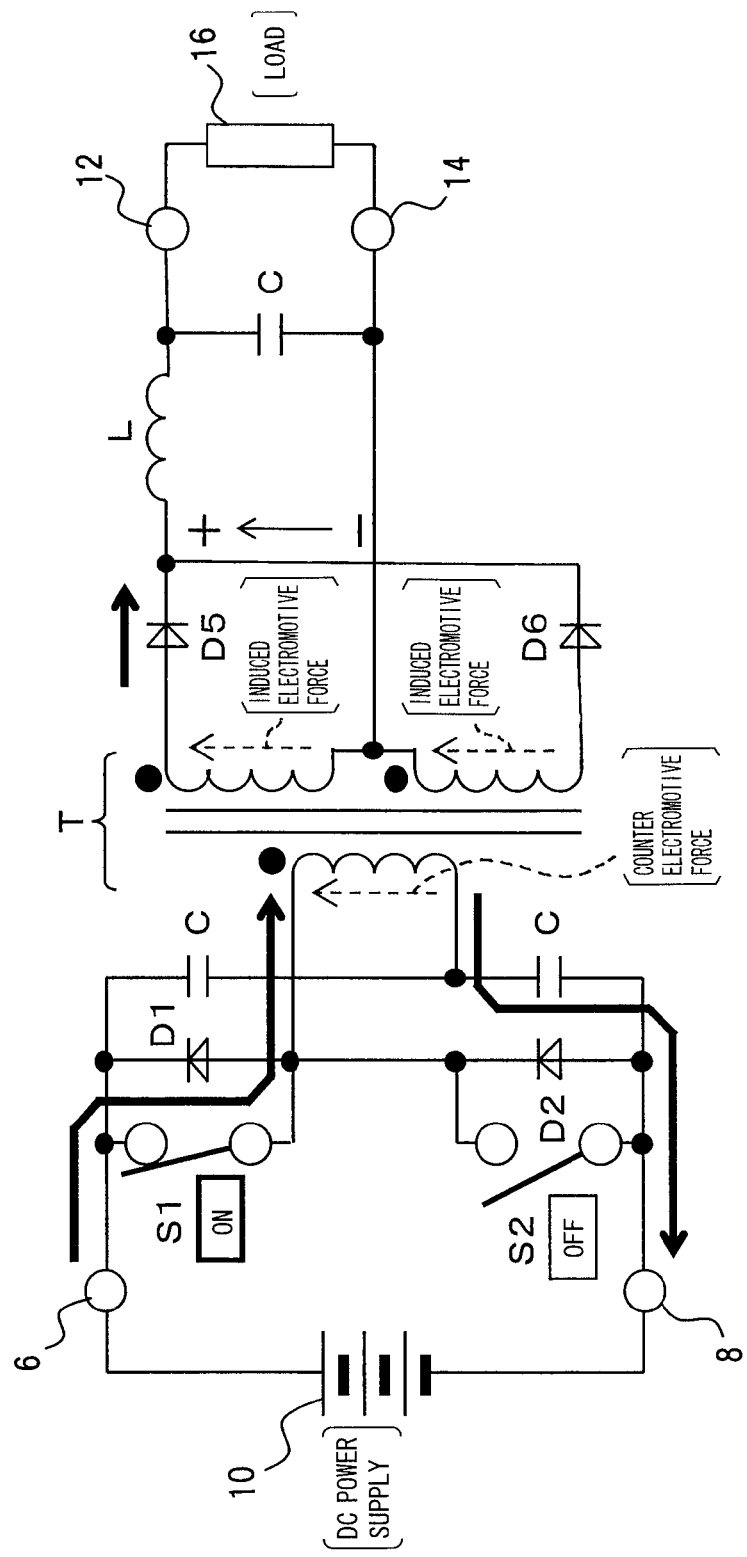
FIGS. 35A and 35B are diagrams for explaining operations in comparison with operations by the isolated DC/DC converter.
Figure 35B:
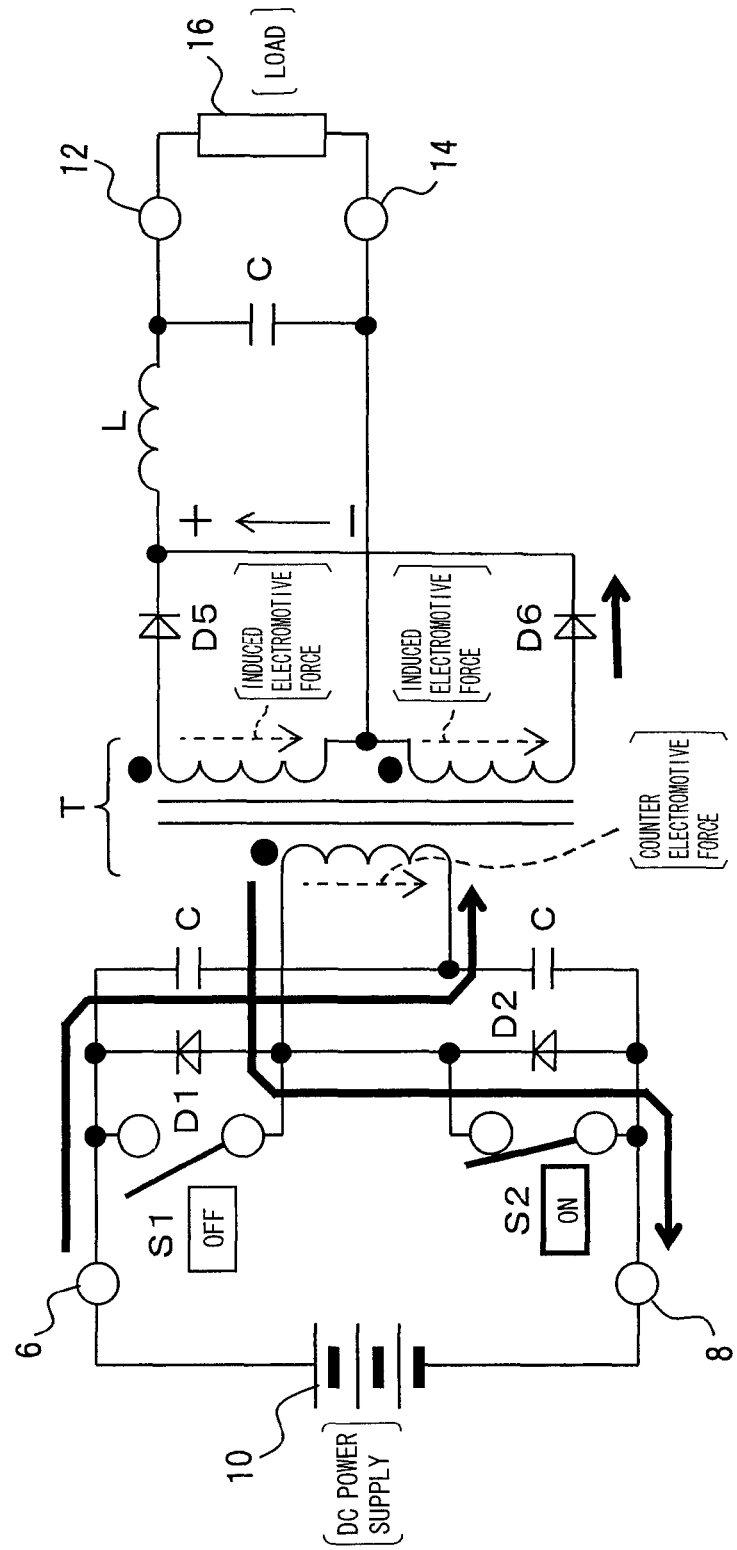

If a period of switching off both switches S1 and S2 is interposed between the operations of FIG. 35A and FIG. 35B, no positive voltage is applied to the front end of the inductor L during the period. In such a case, as a result of smoothing by the inductor L and the capacitor C, a lower voltage is applied to the load. This means that the DC/DC converter of FIG. 34 is capable of changing a voltage applied to the load, depending on the duty ratios of the switches S1 and S2. The DC/DC converter of FIG. 34, however, uses diodes on the secondary side of the isolation transformer T, where the diodes cannot cause a current to flow in both directions at proper timing as bidirectional switching elements can. Hence only the voltage in one direction in polarity (positive voltage in FIG. 34) is generated, and power cannot be regenerated from the secondary side to the primary side of the isolation transformer T.

[Regenerating Operation]

A circuit of FIGS. 36A' and 36B' in which a positive DC voltage source is connected in place of the load will be described for explaining a regenerating operation of the DC/DC converter and DC/AC inverter of FIG. 31.

Figure 36A:
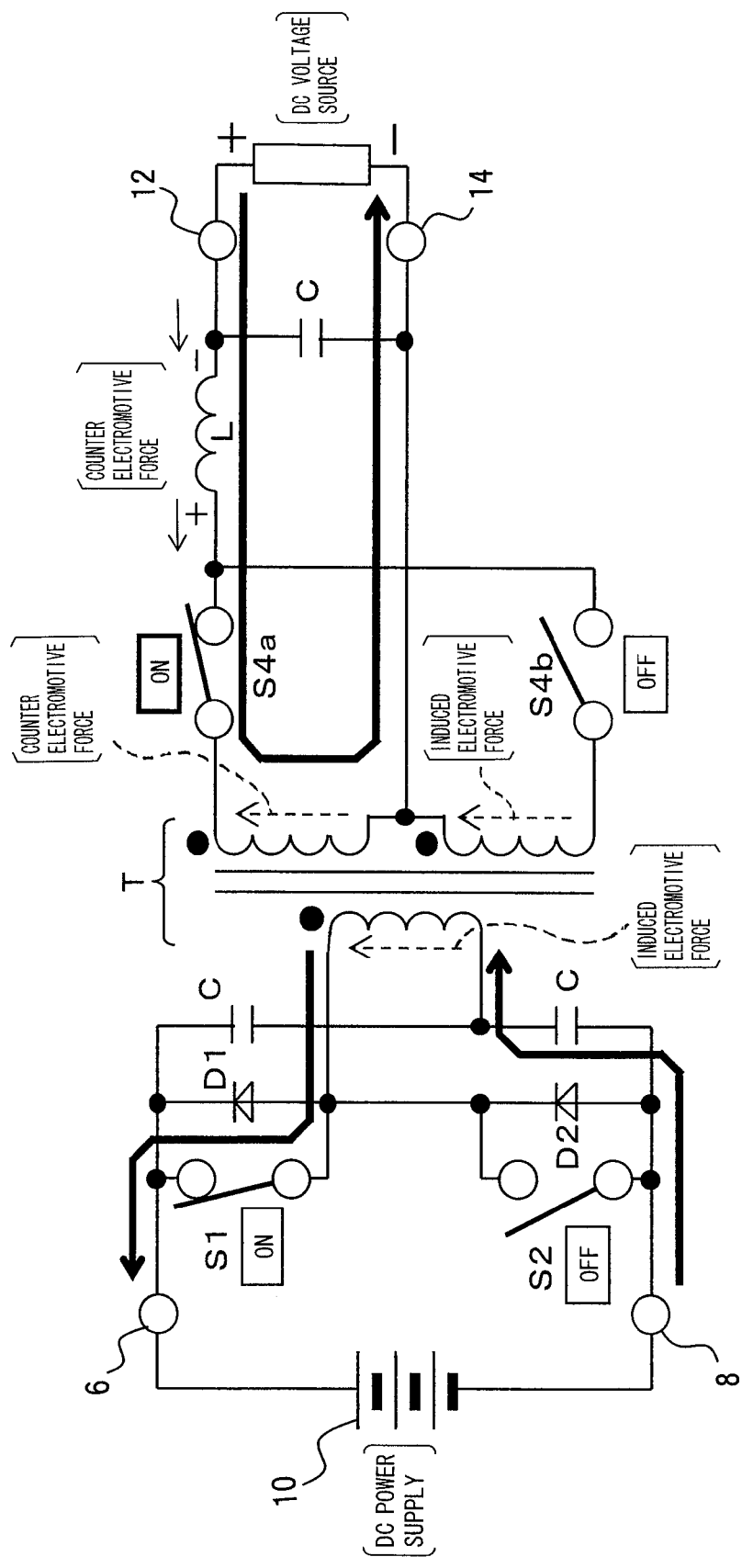
FIGS. 36A' and 36B' depict regenerating operations.

In FIG. 36A', energy accumulated in the inductor L is released to create a counter electromotive force at the inductor L, and a voltage generated by the counter electromotive force is added to a voltage from the DC voltage source and is applied to one of the secondary coils of the isolation transformer T, where a counter electromotive force is generated. As a result, an induced electromotive force is generated in the other of the secondary coils of the isolation transformer T and in the primary coil of the isolation transformer T. Hence a current flows through the primary coil of the isolation transformer T in an arrowed direction in FIG. 36A', thus supplying regenerated power to the DC power supply 10. The direction of this operation and current is reverse to the operation and current of FIG. 32A'.

Figure 36B:
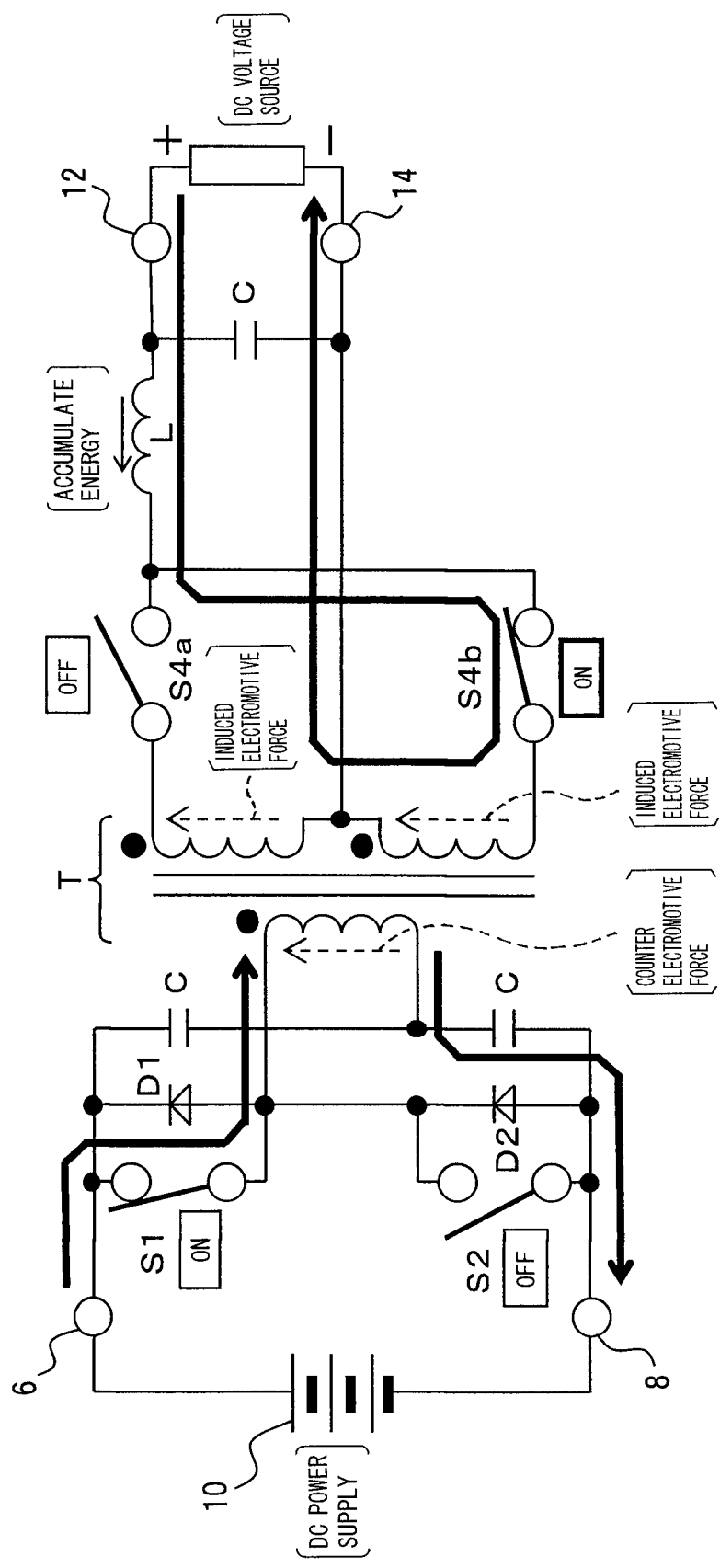

In FIG. 36B', a current flows from the DC power supply 10 into the primary coil of the isolation transformer T in an arrowed direction in FIG. 36B', thus creating a counter electromotive force, which induces an induced electromotive force in a secondary coil of the isolation transformer T. A voltage generated by the induced electromotive force is added to a voltage from the DC voltage source, which causes a current in an arrowed direction to flow through the switch S4*b* into the inductor L, where energy in an arrowed direction is accumulated. The direction of this operation and current is reverse to the operation and current of FIG. 32B'.

In the case where a period of the switch condition of FIG. 32A is long and a period of the switch condition of FIG. 32B is short, energy accumulated in the inductor L is released in the condition of FIG. 36A' and energy is accumulated in the inductor L in the condition of FIG. 36B'. The same phenomenon happens for the case of FIGS. 32C and 32D, where energy accumulated in the inductor L is released in the switch condition of FIG. 32C and energy is accumulated in the inductor L in the switch condition of FIG. 32D.

Contrary to that, if the period of the switch condition of FIG. 32A is short and the period of the switch condition of FIG. 32B is long, which means a regenerating operation under control for outputting a negative voltage, energy is accumulated in the inductor L when the switches S1 and S4*a* are on (FIG. 32A), and energy accumulated in the inductor L is released when the switches S1 and S4*b* are on (FIG. 32B) (The same phenomenon happens for the cases of FIG. 32C and FIG. 32D.).

Other Embodiments (1) In the above embodiments, it is possible to cause the circuit of each embodiment to operate to achieve a more precise actual output voltage by monitoring the actual output voltage at a voltage detecting unit and supplying feedback to the control circuit 18 via an isolated transmitting unit. However, the circuit is operable even if it has no voltage detecting unit and isolated transmitting unit. In this case, constant current output, constant impedance output, constant power output, etc., may be carried out or an overcurrent protector (current fold back type, constant current limiting type, etc.) may be added to the circuit, depending on the configuration and operation of the control circuit 18 if a current detecting unit is further provided.

(2) In the above embodiments, the control circuit 18 is depicted in each of the circuits of FIGS. 1 and 9. The circuits of the other embodiments are also each provided with the control circuit 18.

(3) While the DC/DC converter operation and the DC/AC inverter operation are described in the above embodiments, the isolated power conversion apparatus of the present invention is applicable not only to a configuration for both types of operations but also to a configuration for one type of operation.

The present invention offers any of the following effects.

(1) In the case where the isolated power conversion apparatus is used as an isolated DC/DC converter, it achieves both positive output and negative output.

(2) In the case where the isolated power conversion apparatus is used as the isolated DC/DC converter, it is able to regenerate output-side DC power to a DC power supply.

(3) In the case where the isolated power conversion apparatus is used as an isolated DC/AC inverter, it is able to output AC power by causing an isolated DC/DC converter to continuously change its positive/negative output. Hence the DC/AC inverter has a simpler configuration, smaller size, and less weight, and requires lower cost.

(4) In the case where the isolated power conversion apparatus is used as the isolated DC/AC inverter, it is able to regenerate output-side power to the input power supply without additional configuration, and is therefore available to many applications.

(5) In contrast to the isolated DC/AC inverter of Japanese Laid-Open Patent Publication No. 2004-135408, the isolated power conversion apparatus uses readily acquirable unidirectional switching elements as switching elements on the secondary side, thus enabling a cost reduction. The isolated power conversion apparatus requires fewer bidirectional switching elements even if using them, thus realizing a reduction in size, weight, and cost.

(6) The isolated power conversion apparatus is able to operate as the isolated DC/DC converter or as the isolated DC/AC inverter without changing the configuration of the power conversion apparatus.

While the detailed description of the invention has been described above, the above description is not intended to limit the present invention. It is apparent that various modifications or alterations of the embodiments may be made by those who skilled in art, based on the substance of the invention that is described in claims or disclosed in Detailed Description of the Invention. It is also obvious that such modifications or alterations are included in the scope of the present invention.

The present invention is usable and helpful to a wide range of applications described below.

(1) The isolated power conversion apparatus of the present invention can be used as an isolated DC/DC converter, thus enabling a use as a DC power supply apparatus capable of both positive and negative output. For example, the isolated power conversion apparatus can be used for an application such that a DC motor's direction of rotation is controlled by the positive and negative of an output voltage and the DC motor's rotating speed is controlled by the absolute value of the output voltage. In this case, the isolated power conversion apparatus is also applicable to regeneration of surplus power resulting from the inertia of the DC motor and to regeneration of regenerative braking power for using the DC motor as a dynamo.

(2) The isolated power conversion apparatus can be used as an isolated bidirectional DC/AC inverter, thus resulting in a use for generating AC power from a battery and for charging a battery with AC power through bidirectional operation.

(2-1) The isolated power conversion apparatus combined with a power storage device, such as a large-capacity battery and a flywheel, can be used as a power consumption leveling apparatus for the commercial power supply (When power from the commercial power supply is insufficient, the isolated power conversion apparatus works as a DC/AC inverter, and is used as a grid connection inverter for supplying power from the battery to the commercial power supply. When power from commercial power supply is in excess, the isolated power conversion apparatus works as an AC/DC converter, and is used for charging the power storage device with power from the commercial power supply.).

(2-2) The isolated power conversion apparatus combined with a stationary battery can be used as an emergency power supply used at power failure that serves also as a battery charger (In a power failure situation, the isolated power conversion apparatus works as a DC/AC inverter, and is used as an emergency power supply. In a normal situation, the isolated power conversion apparatus works as an AC/DC converter, and is used for charging the battery with power from the commercial power supply.).

(2-3) The isolated power conversion apparatus combined with a battery of a plug-in hybrid car, electric car, etc., can be used as an emergency power supply, etc., (grid connection inverter) used at commercial power supply failure that serves also as a battery charger charging with commercial power. Although the isolated power conversion apparatus of the present invention may serve both as a stationary unit and an in-vehicle unit, it offers a greater advantage when used as an in-vehicle unit since it has features of being constructed as an isolated type and having a simple circuit configuration that facilitates size and weight reduction.

(2-4) The isolated power conversion apparatus can be used in a hybrid car, electric car, etc., for operations such that at the time of acceleration, AC power having an arbitrary voltage and frequency is supplied from a battery to an AC motor and at the time of power-regenerative braking, the AC motor is used as a dynamo to supply regenerated DC power to the battery to charge it.

(3) The isolated power conversion apparatus can be used as an isolated DC/AC inverter, and thus used as a grid connection inverter or power conditioner for wind power generation, fuel cell power generation, and solar power generation (It is also possible that the isolated power conversion apparatus is combined with a battery, etc., to make good use of its power regenerating function for charging the battery when generated power is in excess and supplying power from the battery when power is in short supply.).

What is claimed is:

1. An isolated power conversion apparatus having an isolation transformer, the apparatus comprising:
   a primary coil, a first secondary coil and one or a plurality of second secondary coil(s) that are provided for the isolation transformer;
   a first switching means disposed between a DC power supply and the primary coil, the first switching means driving the primary coil in a forward direction;
   a second switching means disposed between the DC power supply and the primary coil, the second switching means driving the primary coil in a reverse direction;
   a series circuit including a load and an inductor connected in series with each other, the series circuit being disposed in a side of the first secondary coil;
   one or a plurality of third switching means disposed in parallel with the series circuit, the third switching means being bidirectional;
   one or a plurality of fourth switching means disposed between the series circuit and the first secondary coil, the fourth switching means being disposed in series with the series circuit, the fourth switching means being bidirectional;
   a rectifying means and a smoothing means provided for each of the second secondary coil(s); and
   a control circuit driving each of the switching means, wherein
   the isolated power conversion apparatus sends out power from the DC power supply toward the load as either DC power or AC power of an arbitrary polarity, or regenerates and supplies either the DC power or AC power from the load to the DC power supply,
   each of the second secondary coil(s), the rectifying means and the smoothing means serve as an isolated DC source, and
   when a duty ratio of a control signal for driving the first or second switching means changes, the control circuit drives the first switching means and the second switching means so that a sum of the duty ratio of the control signal for driving the first switching means and the duty ratio of the control signal for driving the second switching means is constant as well as 50% or less so as to make an output voltage from the isolated DC source constant.

2. The isolated power conversion apparatus of claim 1, wherein
   the primary coil has a first and a second primary coils connected in series with each other, the first primary coil being connected to one end of the first switching means and the second primary coil being connected to one end of the second switching means, another end of each of the first switching means and the second switching means being connected to a common connection point.

3. The isolated power conversion apparatus of claim 1, wherein
   one or each of the first switching means and the second switching means is a field-effect transistor (MOS-FET), a junction field-effect transistor (J-FET), a bipolar transistor, or an insulated gate bipolar transistor (IGBT).

4. The isolated power conversion apparatus of claim 1, wherein
   one or some of the first switching means, the second switching means, the third switching means and the fourth switching means has/have a diode in parallel, the diode being a diode element connected to the switching means, a diode built in the switching means, or a parasitic diode.

5. The isolated power conversion apparatus of claim 1, wherein
   one or each of the third switching means and the fourth switching means includes two unidirectional switching elements connected in directions opposite to each other.

6. The isolated power conversion apparatus of claim 1, wherein
   one or each of the third switching means and the fourth switching means includes:
   a diode bridge; and
   a unidirectional switching element connected between a connection point, to which anodes of diodes making up the diode bridge are connected, and a connection point, to which cathodes of the diodes making up the diode bridge are connected.

7. The isolated power conversion apparatus of claim 1, wherein
   one or each of the third switching means and the fourth switching means includes any of a MOS-FET, a J-FET, a bipolar transistor, an IGBT, and a bidirectional switching element.

8. The isolated power conversion apparatus of claim 1, wherein
   the isolated DC source is used for driving at least the third switching means or the fourth switching means.

9. The isolated power conversion apparatus of claim 1, wherein
   the first switching means includes at least two switching elements,
   the second switching means includes at least two switching elements, and
   a bridge circuit is made up of the switching elements of the first switching means and the switching elements of the second switching means, the bridge circuit being connected to the primary coil.

10. The isolated power conversion apparatus of claim 1, wherein
    the isolated power conversion apparatus outputs power by multi-phase output, and
    wherein power is output at each phase in the multi-phase output from separate secondary coils of the isolation transformer for each phase or from the first secondary coil of the isolation transformer in common.

11. The isolated power conversion apparatus of claim 1, wherein
    the isolated power conversion apparatus outputs power by two-phase output,
    a waveform equivalent to a waveform generated by comparing an absolute value of an input waveform with a sawtooth wave is used as a drive waveform for the switching element at one phase in the two-phase output, and
    a waveform equivalent to a waveform generated by comparing the absolute value of the input waveform with a reverse sawtooth wave is used as a drive waveform for the switching element at the other phase in the two-phase output.

12. The isolated power conversion apparatus of claim 1, wherein
    the isolated power conversion apparatus outputs power by three-phase output,
    a waveform equivalent to a waveform generated by comparing an absolute value of an input waveform with a sawtooth wave is used as a drive waveform for the switching element at a first phase in the three-phase output, a waveform equivalent to a waveform generated by comparing the absolute value of the input waveform with a reverse sawtooth wave is used as a drive waveform for the switching element at a second phase different from the first phase in the three-phase output, and a waveform equivalent to a waveform generated by comparing the absolute value of the input waveform with a triangular wave is used as a drive waveform for the switching element at a third phase different from the first and second phases in the three-phase output.

* * * * *